US012764036B2

(12) United States Patent
Yao

(10) Patent No.: US 12,764,036 B2
(45) Date of Patent: Oct. 13, 2026

(54) NETWORK RESOURCE MODELS AND TECHNOLOGIES FOR ACTIONS EXECUTED ACCORDING TO MACHINE LEARNING INFERENCE REPORTS

(71) Applicant: Intel Corporation, Santa Clara, CA (US)

(72) Inventor: Yizhi Yao, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 10 days.

(21) Appl. No.: 18/935,367

(22) Filed: Nov. 1, 2024

(65) Prior Publication Data

US 2025/0062967 A1 Feb. 20, 2025

Related U.S. Application Data

(60) Provisional application No. 63/595,548, filed on Nov. 2, 2023.

(51) Int. Cl.
*H04L 41/16* (2022.01)
*H04L 41/5067* (2022.01)

(52) U.S. Cl.
CPC .......... *H04L 41/16* (2013.01); *H04L 41/5067* (2013.01)

(58) Field of Classification Search
CPC ...... H04L 41/16; H04L 41/5067; H04L 41/40
See application file for complete search history.

(56) References Cited

U.S. PATENT DOCUMENTS

| | | | | |
|---|---|---|---|---|
| 2020/0160690 | A1* | 5/2020 | Kurani | G08B 25/14 |
| 2020/0219007 | A1* | 7/2020 | Byers | G06F 9/50 |
| 2023/0370879 | A1* | 11/2023 | Chou | H04W 24/08 |
| 2023/0403190 | A1* | 12/2023 | Tang | H04W 24/04 |
| 2024/0129203 | A1* | 4/2024 | Mwanje | H04W 24/02 |
| 2024/0137297 | A1* | 4/2024 | Gautam | H04L 41/0233 |

* cited by examiner

*Primary Examiner* — El Hadji M Sall
(74) *Attorney, Agent, or Firm* — Gray Ice Higdon, PLLC

(57) ABSTRACT

This disclosure describes systems, methods, and devices related to optimized resource technologies. A device may create a Managed Object Instance (MOI) representing actions executed based on artificial intelligence or machine learning (AI/ML) inference function. The device may notify a management and network service (MnS) consumer about the creation of the MOI. The device may execute actions by a network or management function acting as the consumer of the inference output. The device may manage performance of the AI/ML inference function.

20 Claims, 19 Drawing Sheets

FIG. 13
MLT MnS consumer
MLT training request
Response
Training result
ML training Function: MLT MnS producer
ML training
ML entity

NETWORK RESOURCE MODELS AND TECHNOLOGIES FOR ACTIONS EXECUTED ACCORDING TO MACHINE LEARNING INFERENCE REPORTS

CROSS-REFERENCE TO RELATED PATENT APPLICATION(S)

This application claims the benefit of U.S. Provisional Application No. 63/595,548, filed Nov. 2, 2023, the disclosure of which is incorporated herein by reference as if set forth in full.

TECHNICAL FIELD

This disclosure generally relates to systems and methods for wireless communications and, more particularly, to network resource models and technologies for actions executed according to machine learning inference reports.

BACKGROUND

Artificial intelligence and machine learning (AI/ML) are now widely adopted across industries, proving successful in fields like telecommunications, including mobile networks. While AI/ML techniques are mature, new complementary methods are constantly emerging.

DETAILED DESCRIPTION

Figure 1A:
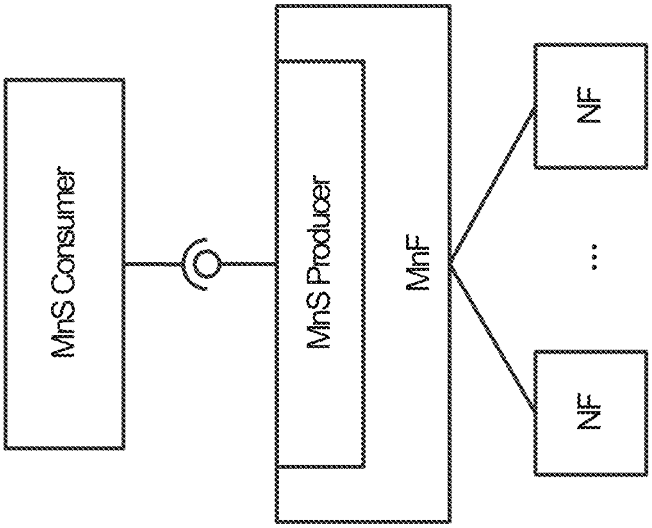
FIGS. 1A and 1B depict illustrative schematic diagram for optimized resource technologies, in accordance with one or more example embodiments of the present disclosure.

The following description and the drawings sufficiently illustrate specific embodiments to enable those skilled in the art to practice them. Other embodiments may incorporate structural, logical, electrical, process, algorithm, and other changes. Portions and features of some embodiments may be included in, or substituted for, those of other embodiments. Embodiments set forth in the claims encompass all available equivalents of those claims.

The present disclosure is generally related to wireless communication, cellular networks, cloud computing, edge computing, cloud computing, data centers, network topologies, communication system implementations, network convergence, artificial intelligence (AI)/machine learning (ML) technologies, AI/ML management capabilities and services for 5GS where AI/ML is used including management and orchestration and/or MDA 5G networks (e.g., NWDAF 462 of FIG. 4) and NG-RAN (e.g., RAN intelligence; see e.g., FIGS. 11-12), and in particular, to technologies and network resource models (NRMs) for actions executed according to the AI/ML inference reports.

In some cases, a consumer (e.g., a network function (NF), management function (MnF), and/or the like) of an inference report may or may not take actions according to the AI/ML inference output provided by the AI/ML inference function (see e.g., section 3.1.3.1.1, infra). If the actions are taken accordingly, the network performance is expected to be optimized. To evaluate the performance of the inference function, an MnS-C needs to know whether and what actions have been taken according to the inference output.

Example embodiments of the present disclosure relate to systems, methods, and devices for network resource models and technologies for actions executed according to machine learning inference reports.

The present disclosure provides modeling for various actions executed according to AI/ML inference output. In particular, the present disclosure provides modeling and reporting for actions executed according to AI/ML inferences, as well as performance monitoring aspects of such actions and/or inferences. This performance evaluation can be used for defining, designing, and/or refining/tuning responsible and safe AI, in addition to improving functionality and resource usage of AI systems.

AI/ML inference performance can be used to control the AI/ML aspects in the 5GS. In some implementations, an AnLF 462*a* is an AI/ML inference function contained by NWDAF 462. As discussed in more detail infra, an AnLF 462*a* can be modelled by NRM for AI/ML inference management.

In one or more embodiments, an optimized resource technologies system may include an MnS producer supported by one or more processors that may be configured to create an MOI representing actions executed according to the AI/ML inference output, and may notify the MnS consumer about the creation of the MOI.

In one or more embodiments, the actions may be executed by a network function acting as a consumer of the inference output from an inference function, or alternatively, by a management function acting as a consumer of the inference output from an inference function.

In one or more embodiments, the MnS producer and MnS consumer may be configured for performance management of the AI/ML inference function, where the AI/ML inference function may include, for example, AnLF, an MDAF, RAN intelligence Energy Saving function, RAN intelligence MRO function, or RAN intelligence MLB function.

In one or more embodiments, AnLF may be represented by an MOI, where the MOI representing AnLF may include attributes indicating supported analytics ID(s).

In one or more embodiments, the MOI representing the actions executed according to the AI/ML inference output may contain at least one of the following attributes: an identifier of the inference output, the actions executed, and a timestamp indicating when the actions were completed.

In one or more embodiments, the MnS consumer may be configured to take actions based on the executed actions and resulting performance, where the actions taken by the MnS consumer may include deactivating the AI/ML inference function, requesting re-training of the ML model for the AI/ML inference function, or utilizing a different ML model to support the AI/ML inference function.

The above descriptions are for purposes of illustration and are not meant to be limiting. Numerous other examples, configurations, processes, algorithms, etc., may exist, some of which are described in greater detail below. Example embodiments will now be described with reference to the accompanying figures.

Figure 1B:
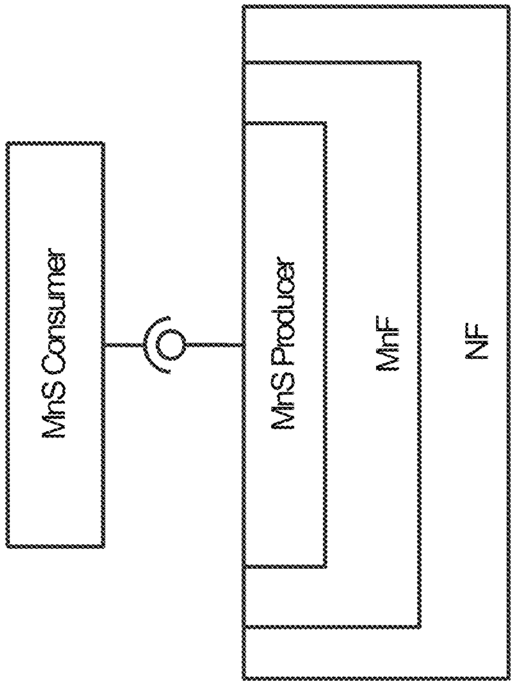

FIGS. 1A and 1B depict illustrative schematic diagrams for optimized resource technologies, in accordance with one or more example embodiments of the present disclosure.

Management Service (MnS) Framework for reporting actions executed according to AI/ML inference output(s) generated by AI/ML function(s):

Example management service (MnS) frameworks for reporting actions executed according to AI/ML inferences output, generated, or otherwise produced by AI/ML function (see e.g., FIGS. 11-12) are illustrated by FIGS. 1A and 1B that represent the options of standalone Management Function (MnF) and embedded MnF, respectively. In particular, FIG. 1A shows an example standalone MnS framework for action reporting (also referred to as an "sMnF framework" and/or the like); and FIG. 1B shows an example embedded MnS framework for action reporting (also referred to as an "eMnF framework" and/or the like).

FIGS. 1A and 1B include an MnS consumer (MnS-C), an MnS producer (MnS-P), an MnF, and one or more NFs. The MnS-C interacts with the MnS-P for reporting the actions executed according to AI/ML inference(s) that is/are output, generated, or otherwise produced by one or more AI/ML functions. The MnS-C can be any entity/element discussed herein. As examples, the MnS-C can be or include one or more NWDAFs (e.g., NWDAF 462 of FIG. 4, an NWDAF containing an AnLF 462*a*, an NWDAF containing an MTLF 462*b*, and/or the like), one or more MDAFs (see e.g., FIGS. 9-10), one or more MLFs (see e.g., FIGS. 11-12), one or more RANs 404, one or more NANs 414, and/or some other entity/element, including any of those discussed herein. Additional aspects of MnS-Cs are discussed infra with respect to (w.r.t) FIGS. 9-10.

In various implementations, the modeling of actions executed according to AI/ML inferences are managed as MOI(s) by the operations and notifications defined for generic provisioning MnS (see e.g., [TS28532] § 11.1.1). In particular, the MnS-C can use the CreateMOI, getMOIAttributes, modifyMOIAttributes, deleteMOI to manage (e.g., create, modify, delete, get attributes of, and the like) the MOI representing the actions executed according to the AI/ML inference output b, and receive the corresponding notifications (e.g., notifyMOICreation, notifyMOIDeletion, notifyMOIAttribute ValueChanges, notifyMOIChanges, notifyEvent).

In some examples, an actor (e.g., actor 1120 of FIG. 11, such as an NF, MnF, and/or the like) consumes inference reports from AI/ML inference functions (e.g., model inference function 1115, model inference function 1245, and/or the like) and executes one or more actions according to the AI/ML inference output contained in the inference report. The actor reports the executed actions via the MnS-P to the MnS-C who manages the performance of AI/ML inference function, by creating and notifying the MOI representing the executed actions.

The MnS-C for managing the performance of AI/ML inference function may take some actions to control or optimize the AI/ML inference function based on the reported executed actions and the resulted performance. For example, the MnS-C may deactivate the AI/ML function, use a different ML entity/model to support the AI/ML inference function, or request to re-train the ML model.

The MnS-C and/or the MnS-P can be any entity/element discussed herein. As examples, the MnS-C and/or the MnS-P can be or include one or more NWDAFs (e.g., NWDAF 462 of FIG. 4, an NWDAF containing an AnLF 462*a*, an NWDAF containing an MTLF 462*b*, and/or the like), one or more MDAFs (see e.g., FIGS. 9-10), one or more MLFs (see e.g., FIGS. 11-12), one or more RANs 404, one or more NANs 414, one or more UEs 402, yy02, yr02, and/or some other entity/element, including any of those discussed herein. Additional aspects of MnS-Ps and MnS-Cs are discussed infra with respect to (w.r.t) FIGS. 9-10.

Example Information Models:

It should be noted that the names/labels of the Information Object Classes (IOCs) and the attributes mentioned herein are examples, and the IOCs and attributes mentioned herein can have different names/labels than those used herein. Additionally or alternatively, the IOCs mentioned herein can be applied to, or used as enhancements to existing IOCs.

Figure 2A:
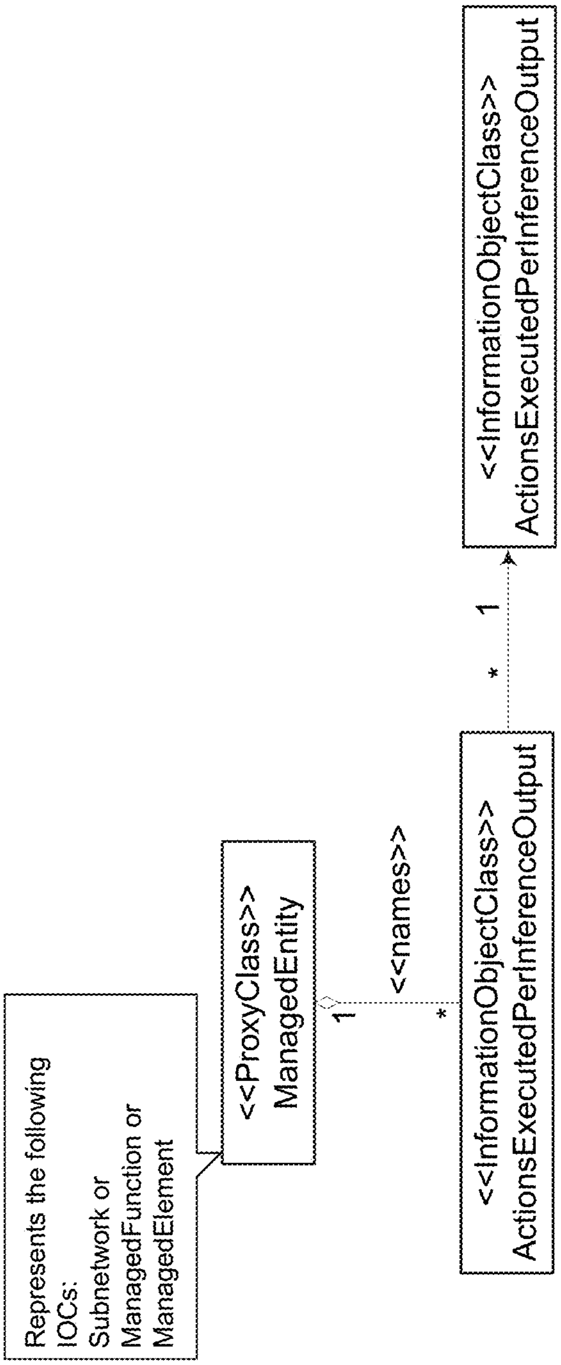
FIGS. 2A and 2B depict illustrative schematic diagram for optimized resource technologies, in accordance with one or more example embodiments of the present disclosure.
Figure 2B:
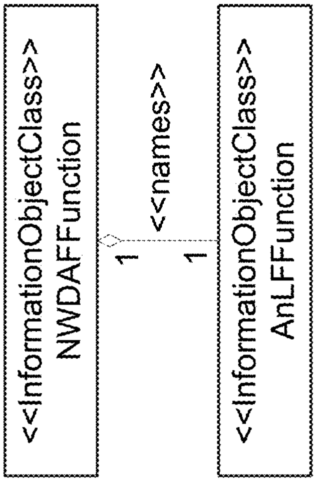

Class Diagrams:
Relationships:

This clause depicts/discusses the set of classes (e.g., IOCs) that encapsulates the information relevant to actions executed according to AI/ML inferences. FIGS. 2A-2B show an example NRM fragment for actions executed according to inference output. For the UML semantics see 3GPP TS 32.156.

Figure 3A:
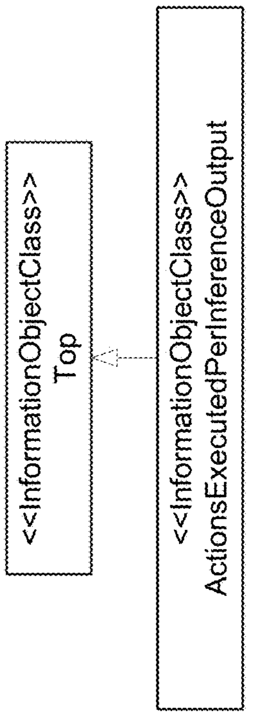
FIGS. 3A and 3B depict illustrative schematic diagram for optimized resource technologies, in accordance with one or more example embodiments of the present disclosure.
Figure 3B:
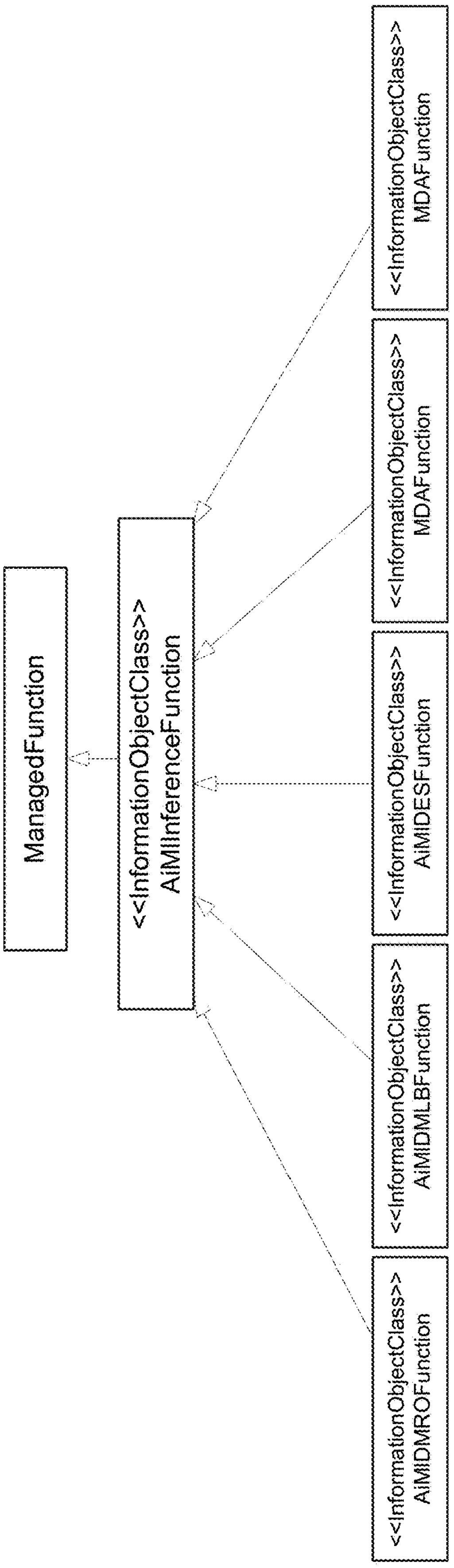

Inheritance:

This clause depicts the inheritance relationships. FIGS. 3A-3B show example inheritance hierarchy for actions executed according to AI/ML inference output.

Class Definitions:
ActionsExecutedPerInferenceOutput:

Definition

This IOC represents the actions executed by the actor/consumer (e.g., NF, MnF, and/or the like) of the inference report according to the according to the AI/ML inference output.

Attributes Table:

| | Support Qualifier | isReadable | isWritable | isInvariant | isNotifyable |
|---|---|---|---|---|---|
| Attribute name | | | | | |
| inferenceOutputId | M | T | F | F | T |
| actionsExecuted | M | T | F | F | T |
| timeStampActionsExecuted | M | T | F | F | T |
| Attribute related to role | | | | | |
| AiMlInferenceFunctionRef | M | T | F | F | T |

AnLF Function:

Definition

This IOC represents the Analytics logical function (AnLF) contained by NWDAF, such as the AnLF 462*a* discussed infra.

The AnLF may be supported by AI/ML, and in this case, the AnLF is a type of AI/ML inference function.

Attributes:

This IOC includes attributes inherited from ManagedFunction and the following attributes Table:

| Attribute name | S | isReadable | isWritable | isInvariant | isNotifyable |
|---|---|---|---|---|---|
| supportedAnalyticIDs | M | T | F | F | T |

Attribute Definitions:
Attribute Properties:

| Attribute Name | Documentation and Allowed Values | Properties |
|---|---|---|
| inferenceReportId | It is the identifier of the inference report. It could be the mDAReportID (see e.g., [TS28104]), the event identifier of the notification for notifying the analytics report by NWDAF (see e.g., 3GPP TS 29.520), or the DN of the InferenceReport MOI for the inference report provided by the RAN intelligence function.<br>allowed Values: N/A | Type: string<br>multiplicity: 1<br>isOrdered: False<br>isUnique: True<br>defaultValue: None<br>isNullable: True |
| actionsExecuted | It specifies the actions executed according to the inference output.<br>The actions could be operations, control signalling or other behaviors depending on the inference output.<br>allowedValues: DN | Type: String<br>multiplicity: *<br>isOrdered: False<br>isUnique: True<br>defaultValue: None<br>isNullable: True |
| timeStampActionsExecuted | It specifies the time stamp when the actions have been completed according to the inference output.<br>allowedValues: N/A | Type: DateTime (see e.g., 3GPP TS 32.156 ("[TS32156]"))<br>multiplicity: 1<br>isOrdered: False<br>isUnique: True<br>defaultValue: None<br>isNullable: True |

-continued

| Attribute Name | Documentation and Allowed Values | Properties |
|---|---|---|
| AiMlInferenceFunctionRef | It identifies the DN of the AI/ML inference function whose inference output has been executed. allowedValues: DN | Type: DN (see e.g. [TS32156]) multiplicity: 1 isOrdered: False isUnique: True defaultValue: None isNullable: True |
| supportedAnalyticIDs | It provides the list of analytics IDs supported by the AnLF. allowed Values: N/A | Type: String multiplicity: * isOrdered: False isUnique: True defaultValue: None isNullable: True |

NOTE:
When the performanceScore is to indicate the performance score for ML training, the data set is the training data set. When the performanceScore is to indicate the performance score for ML validation, the data set is the validation data set. When the performanceScore is to indicate the performance score for ML testing, the data set is the testing data set.

The network architecture 400 is designed to support current and future mobile networks, including both LTE and 5G/NR systems, along with other advanced networks that may benefit from the principles described here. At the heart of this network is User Equipment (UE) 402, any device designed to communicate wirelessly, such as a smartphone or IoT device. The UE 402 connects to the Radio Access Network (RAN) 404 through the UU interface, applicable to both LTE and 5G/NR systems. UEs include a broad range of devices, including smartphones, tablets, wearables, drones, and other IoT devices. This versatility ensures network support for applications across industries, enhancing the utility of 400. The network 400 supports direct device-to-device communication, allowing UEs 402 to connect over sidelink (SL) interfaces like ProSc, PC5, and others. This feature bypasses network nodes, improving communication efficiency, particularly for IoT and vehicular systems. Sidelink interfaces (SL), comprising channels such as SBCCH, SCCH, and STCH, and physical channels like PSSCH, PSCCH, PSFCH, PSBCH, enable devices to communicate control and data signals directly. Additionally, UEs can connect to an Access Point (AP) 406, which manages WLAN connections, enabling offloading of some traffic from the RAN 404. This function leverages IEEE 802.11 protocols and cellular-WLAN standards like LWA/LWIP. The RAN 404 encompasses multiple Network Access Nodes (NANs) 414, which provide access to the air interface through protocols like RRC, PDCP, RLC, MAC, and PHY, supporting connectivity for UEs 402. NANs range from macrocells to femtocells and picocells, each providing various coverage capacities tailored to different user densities, ensuring the RAN's flexibility. The NANs 414 take various forms, such as cNodeBs (ENBs) 412, gNodeBs (GNBs) 416, and ng-cNodeBs (ng-eNBs) 418, each playing specific roles in handling radio signals and maintaining UE connectivity. The Central Unit (CU) and Distributed Unit (DU) split structure within NANs 414 allows the CU to handle control while the DU manages radio connections, enhancing network flexibility and scalability. This CU/DU structure enables NANs 414 to deliver distributed processing capabilities, optimizing the network for scenarios requiring high data throughput and reliability. NANs connect through the X2 interface in LTE RAN (E-UTRAN 410) or the XN interface in NG-RAN 414 configurations, facilitating data exchange, mobility, handovers, and load management. The RAN 404 allows for multi-cell connections, where UEs 402 can connect to multiple cells through carrier aggregation, enabling the use of multiple frequencies and improving data throughput. Dual connectivity allows UE 402 to connect to a primary and secondary node, increasing data rate and resilience by distributing traffic dynamically across network resources. The RAN 404 uses both licensed and unlicensed spectrum, incorporating mechanisms like Listen-Before-Talk (LBT) to manage unlicensed band traffic, thus optimizing spectrum usage. UEs 402 share real-time measurement data with NANs 414 or edge compute nodes, providing insight into metrics like signal quality and interference for network optimization. The network's edge computing capabilities enable low-latency data processing, ideal for applications like industrial automation and autonomous vehicles. The Core Network (CN) 420 supports UEs by hosting various Network Functions (NFs), each providing specific roles like session management, authentication, and data routing, ensuring efficient network operation. The Access and Mobility Management Function (AMF) 444 manages UE registration, connection management, and mobility across the network, handling both user and control planes. The Session Management Function (SMF) 446 establishes and manages sessions, including traffic control and Quality of Service (QOS), and coordinates with UPF 448 for data routing. The User Plane Function (UPF) 448 handles packet routing, filtering, and inspection on the user plane, playing a key role in enforcing policies and managing traffic across network paths. The Network Data Analytics Function (NWDAF) 462 collects and analyzes data from NFs and UEs, applying machine learning (ML) to detect patterns, forecast network demand, and improve network efficiency. Policy Control Function (PCF) 456 enforces policy rules, ensuring network operations align with operator-defined policies, and works with Unified Data Management (UDM) 458 for managing subscriber data. The Network Slice Selection Function (NSSF) 450 facilitates network slicing, creating isolated segments for different applications, each with dedicated resources and configurations tailored to specific needs. Network Exposure Function (NEF) 452 securely connects third-party applications with the network, managing access requests and enabling interoperability between external applications and network services. Multi-Access Edge Computing (MEC) and other virtualization technologies support distributed processing, reducing latency and improving response times for applications with high data demands. Edge compute nodes in 400 enhance data processing by providing close-to-source computation, reducing latency, and enabling faster processing for end users. Service-Based Interfaces (SBIs) in 5GC 440 allow NFs to communicate over APIs, supporting seamless interaction across network functions, particularly for control and user planes. Network Repository Function (NRF) 454 maintains NF profiles, including capabilities and services, which facilitates efficient NF discovery and supports dynamic adaptation to network conditions. NWDAF 462 leverages ML algorithms to analyze data patterns, providing predictive insights into network loads and enhancing resource allocation through data from NFs and UEs. MEC and O-RAN frameworks within the 400 architecture facilitate flexible, low-latency processing, future-proofing the network for new standards and technologies. Vehicle-to-Everything (V2X) communication supports autonomous driving and real-time traffic safety applications, with Roadside Units (RSUs) acting as part of the 400 infrastructure to support data exchanges with vehicles. Network slices in 450 enable prioritization of specific applications, dedicating resources to critical services like emergency communication or automated systems with strict performance requirements. The AMF 444 also provides mobility and registration management for UEs 402, supporting seamless handovers and session continuity as UEs move across the network. Unified Data Management (UDM) 458 stores subscriber information, such as authorization data, through the Unified Data Repository (UDR) 459, which facilitates efficient, consistent data access. Core network interfaces like N1 through N22 provide end-to-end connections across user and control planes, essential for continuous data flows and efficient service delivery. The service-based representation of NFs in 5GC 440 enables function-to-function access through SBIs, supporting flexible interactions across network services. NWDAF 462 in the core supports centralized and distributed analytics. NWDAFs can be configured to specialize in different analytics types, helping tailor insights to specific network areas. Edge Application Server Discovery Function (EASDF) 461 within the CN aids in locating and selecting application servers, essential for services needing real-time processing at the network edge. Data Collection Coordination Function (DCCF) 463 and Analytics Data Repository Function (ADRF) 466 support the collection and analysis of network data, feeding into advanced analytics functions and storage systems like NWDAF 462 for broader data insights.

Figure 5:
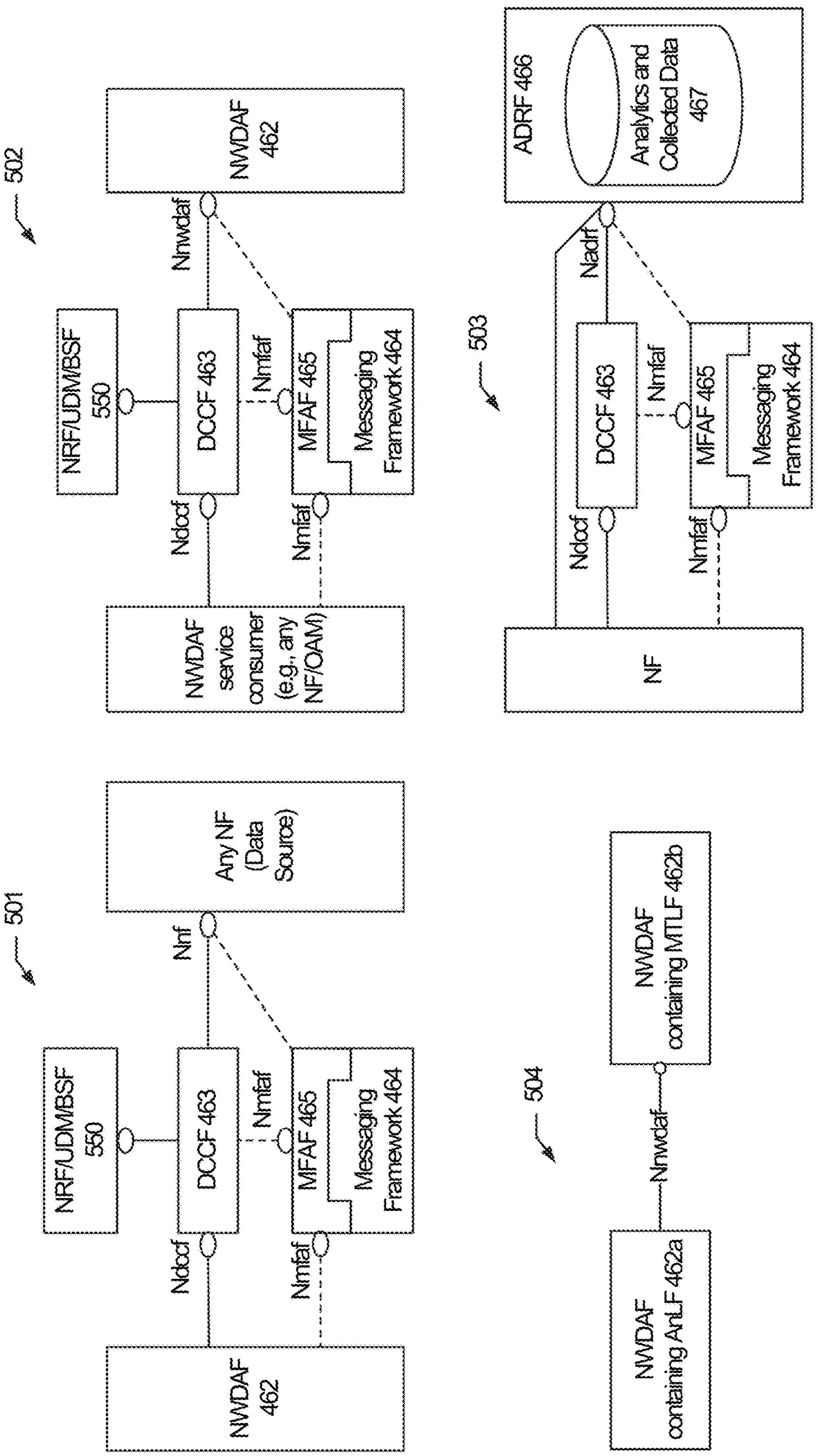
FIG. 5 depicts various illustrative NWDAF frameworks, beginning with the data collection architecture, in accordance with one or more example embodiments of the present disclosure.

FIG. 5 presents various example NWDAF frameworks, beginning with the data collection architecture 501. This setup includes the NWDAF 462, a Data Collection Coordination Function (DCCF) 463, a messaging framework 464 with a Messaging Framework Adaptor Function (MFAF) 465, and network nodes or NFs 550, which encompass elements such as the NRF 454, UDM 458, and/or a Binding Support Function (BSF). The DCCF 463 and MFAF 465 coordinate the data collection and delivery operations within this architecture, as outlined in clause 4 of [TS23288]. Specifically, the DCCF 463 supports data management and coordination for the NWDAF 462, ensuring data transfers are accurate and timely. As described, the Ndccf interface connects the NWDAF 462 to the DCCF 463, facilitating data subscription requests, delivery cancellations, and data report requests. When data is not immediately available, the DCCF 463 initiates its collection from source NFs through Nnf services over the Nnf interface, ensuring all requested data is obtained efficiently.

The collected data can then be transferred directly from the DCCF 463 to the NWDAF 462 using the Ndccf interface or relayed through the MFAF 465 within the messaging framework 464. This architectural setup allows a robust, adaptable framework for delivering data and analytics across multiple components. FIG. 5 also illustrates an analytics exposure architecture 502, using similar data collection coordination to provide essential network analytics services. This configuration relies on interfaces like Nnfdaf to enable request, subscription, and notification services for analytics consumers, defined under analytics subscription clauses in [TS23288] §§ 6.1.1.1 and 7.2. Additionally, for more real-time network adjustments, analytics can be delivered using subscribe/notify and request/response operations through the NWDAF 462, DCCF 463, and MFAF 465.

In scenarios where data consumers beyond NFs, such as the Charging Enablement Function (CEF) and OAM, require network analytics, the Nnwdaf services enable configuration of relevant data requests, as specified in [TS23288] §§ 6.1.3 and 7. This inclusion allows analytics access for broader network optimization purposes. The DCCF 463 and NWDAF 462 also facilitate access to historical analytics through ADRF 466, ensuring essential network data is available for both real-time and retrospective analyses. Likewise, the 5GS architecture permits the messaging framework 464 and MFAF 465 to retrieve historical data directly from NWDAF 462, supporting long-term analytics that predict and preempt network issues.

Furthermore, any NF in the system architecture may access NWDAF 462 for analytics through DCCF 463's Ndccf services, providing coordinated data request, modification, and cancellation capabilities. This coordination allows DCCF 463 to adapt and deliver specific analytics to subscribed NFs even if the data has not yet been collected. If necessary, data sourcing is managed directly or indirectly by DCCF 463, with messaging framework 464 acting as an intermediary. In this case, the DCCF 463 can either handle direct data transfers or use messaging relays within 464 for adaptive delivery.

The example data storage architecture 503, shown in FIG. 5, illustrates ADRF 466's role in securely storing analytics data in databases 467. The ADRF 466 supports storage and retrieval by other NFs, such as NWDAF 462, through Nadrf services. When a storage request, like Nadrf_DataManagement_StorageRequest, is submitted by a consumer, ADRF 466 responds with storage confirmation, validating data integrity. For retrieval, consumers use an Nadrf_DataManagement_RetrievalRequest, which prompts ADRF 466 to verify data availability and deliver it as requested. The ADRF 466 also manages ML model storage using Nadrf_MLModelManagement_StorageRequest for AI model maintenance, allowing comprehensive data analytics support within the network.

Direct and indirect data management interactions by DCCF 463 include interfacing with ADRF 466 to securely store and retrieve data as needed, with messaging framework 464 providing additional adaptors that align 3GPP protocols across the system. Whether directly via Nadrf or through Ndccf_DataManagement_Notify requests, the DCCF 463 verifies that data sent to ADRF 466 meets network authorization requirements based on [TS23501] clause 7.1.4.

DCCF 463 also coordinates data collection and analytics processing through NWDAF 462, allowing consumers to perform NF discovery using NRF 454 according to [TS23501] § 6.3.19. Depending on network design, consumers may choose to source data directly from NFs or through the DCCF 463, facilitating adaptability in data retrieval processes. Upon receiving data requests, DCCF 463 identifies appropriate NF data sources based on consumer specifications, optionally linking to ADRF 466 for efficient data retrieval, as specified in [TS23888]. DCCF 463 maintains active data collection status to avoid duplication and ensure real-time data availability, updating collection profiles as necessary to meet subscription demands.

The long-term data exposure capabilities of DCCF 463 are reinforced by event subscription functions for UDM 458, covering event notifications and NF life-cycle changes. These updates enable event-driven data continuity across network modifications. DCCF 463's adaptability is further reflected in its support for multiple data sources, message frameworks 464, and consumers within a given deployment, with configuration specifics often set by network demand.

AMF 444 and SMF 446 facilitate retrieval processes for general UE data requests within specified geographic areas by following data collection standards in [TS23888] § 6.2.2.1. The trained ML model provisioning architecture 504, another FIG. 5 illustration, features NWDAF 462's dual-function AnLF 462A and MTLF 462B setup. Whether containing only MTLF 462B, only AnLF 462A, or both, NWDAF 462 can utilize 5GS ML model provisioning services via the Nnwdaf interface. AnLF 462A generates predictive analytics and derives statistical insights for proactive network adjustments, using AI models supported by MTLF 462B.

For data consumers like NFs, AFs 460, and OAM entities, the analytics provided by NWDAF 462 can include historical, real-time, and predictive data analytics. These analytics align with [TS23288] guidelines, helping streamline network operations. NRF 454 allows discovery of suitable NWDAF 462 instances for consumer requirements, with each instance supporting time-sensitive analytics delivery as defined in [TS23288] clause 6.2.6.2. Multiple NWDAF 462 instances may support federated learning (FL) with compatible ML models and filters, allowing real-time insights and federated data analysis tailored to the network's evolving needs.

Figure 6:
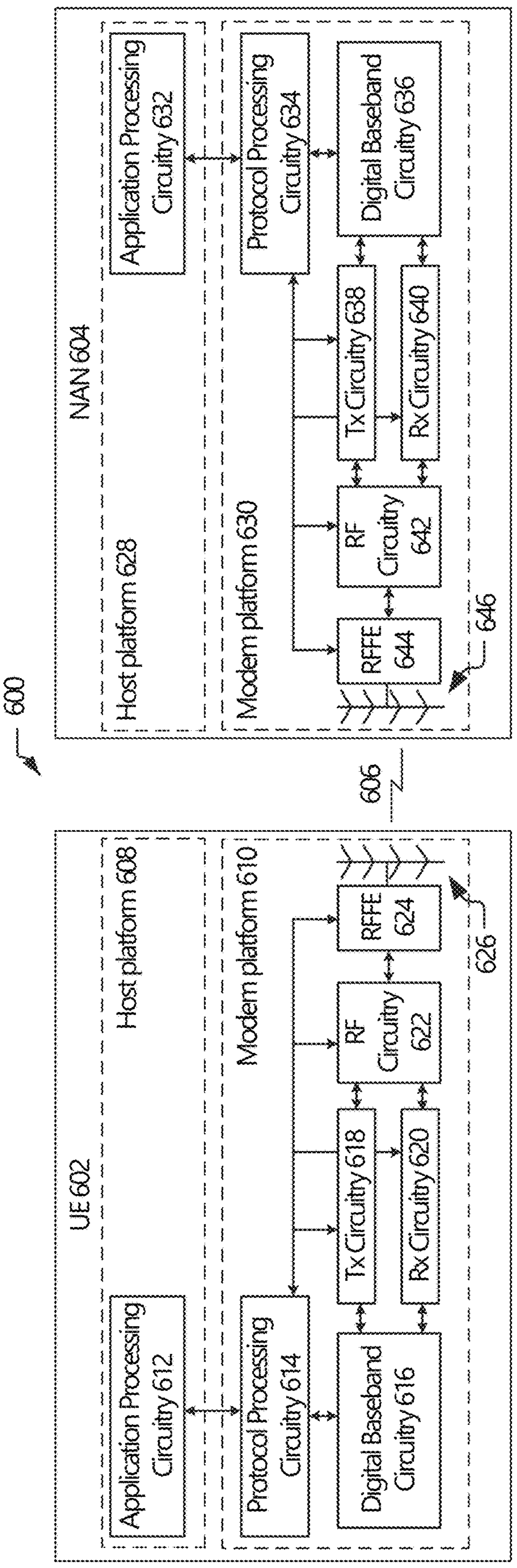
FIG. 6 illustrates an example wireless network architecture, in accordance with one or more example embodiments of the present disclosure.

FIG. 6 illustrates an example wireless network architecture 600, featuring a User Equipment (UE) 602 communicatively coupled with a Network Access Node (NAN) 604 through an air interface connection 606. The UE 602 and NAN 604 share functional similarities with the elements UE 402 and NAN 414, respectively, from prior architectures. The air interface connection 606 supports communication in line with cellular standards such as LTE and 5G/New Radio (NR), facilitating interactions over mmWave or sub-6 GHZ frequencies or according to other specified RATs. Within this setup, the UE 602 comprises a host platform 608 linked to a modem platform 610. The host platform 608 includes application processing circuitry 612, which interacts with the protocol processing circuitry 614 on the modem platform 610. The application processing circuitry 612 hosts various applications for sourcing and processing data, operating across transport layers (e.g., UDP, TCP, QUIC) and network layers (e.g., IP) to support data transmissions and receptions.

The protocol processing circuitry 614 on the UE's modem platform 610 manages essential networking layers, such as MAC, RLC, PDCP, RRC, and NAS. In parallel, the modem platform 610 itself incorporates digital baseband circuitry 616, which performs additional layer operations that support the connection 606 below the protocol processing circuitry in the stack. Digital baseband operations include handling PHY layer functions such as HARQ-ACK operations, scrambling/descrambling, encoding/decoding, and modulation symbol mapping. It also supports more advanced operations such as multi-antenna port precoding/decoding, which involves techniques like space-time, space-frequency, and spatial coding, alongside signal reference generation and decoding, preamble and synchronization sequence management, and blind decoding for control channels.

The UE 602 modem platform also includes transmit (Tx) circuitry 618, receive (Rx) circuitry 620, radio frequency (RF) circuitry 622, and RF front-end (RFFE) circuitry 624, all interconnected to one or more antenna panels 626. The Tx circuitry 618 comprises a digital-to-analog converter, mixers, and intermediate frequency components, while the Rx circuitry 620 integrates an analog-to-digital converter, mixers, and other intermediate frequency components. RF circuitry 622 includes a low-noise amplifier, a power amplifier, and power tracking components, while the RFFE 624 contains filters (e.g., surface or bulk acoustic wave filters), switches, antenna tuners, and beamforming components (such as phase-array antennas). Antenna panels 626, also called Tx/Rx components, house various antenna elements-PIFAs, monopole, dipole, loop, patch, Yagi, parabolic dish, and omni-directional antennas, among others. The choice and configuration of these components vary depending on specific operational requirements, such as the frequency range (mmWave or sub-6 GHZ) and transmission mode (TDM or FDM). Tx/Rx components are configured in parallel chains and may reside on different modules or chips, with control provided by circuitry within the protocol processing circuitry 614.

For UE 602 operations, signal reception is managed by the antenna panels 626, which receive transmissions from NAN 604 via the RFFE 624, RF circuitry 622, Rx circuitry 620, digital baseband circuitry 616, and protocol processing circuitry 614. The UE employs receive-beamforming techniques on the antenna panels 626, enabling targeted reception across specific antenna elements. Conversely, for signal transmission, data travels from the protocol processing circuitry 614 through digital baseband circuitry 616, Tx circuitry 618, RF circuitry 622, RFFE 624, and out through antenna panels 626. Tx components apply spatial filtering to transmitted data, generating directional beams emitted from antenna elements on the panels 626.

In parallel to UE 602, the NAN 604 also incorporates a host platform 628 coupled with a modem platform 630. The host platform 628 features application processing circuitry 632 connected to the modem platform's protocol processing circuitry 634. The NAN 604's modem platform 630 also includes components akin to the UE's digital baseband circuitry 636, Tx circuitry 638, Rx circuitry 640, RF circuitry 642, RFFE circuitry 644, and antenna panels 646. These components are substantially similar to those on the UE 602, allowing interchangeability and consistent performance across the network. NAN 604 components are also capable of performing key logical functions, including Radio Network Controller (RNC) responsibilities like radio bearer management, dynamic uplink and downlink resource allocation, and scheduling of data packet transmissions.

Figure 7:
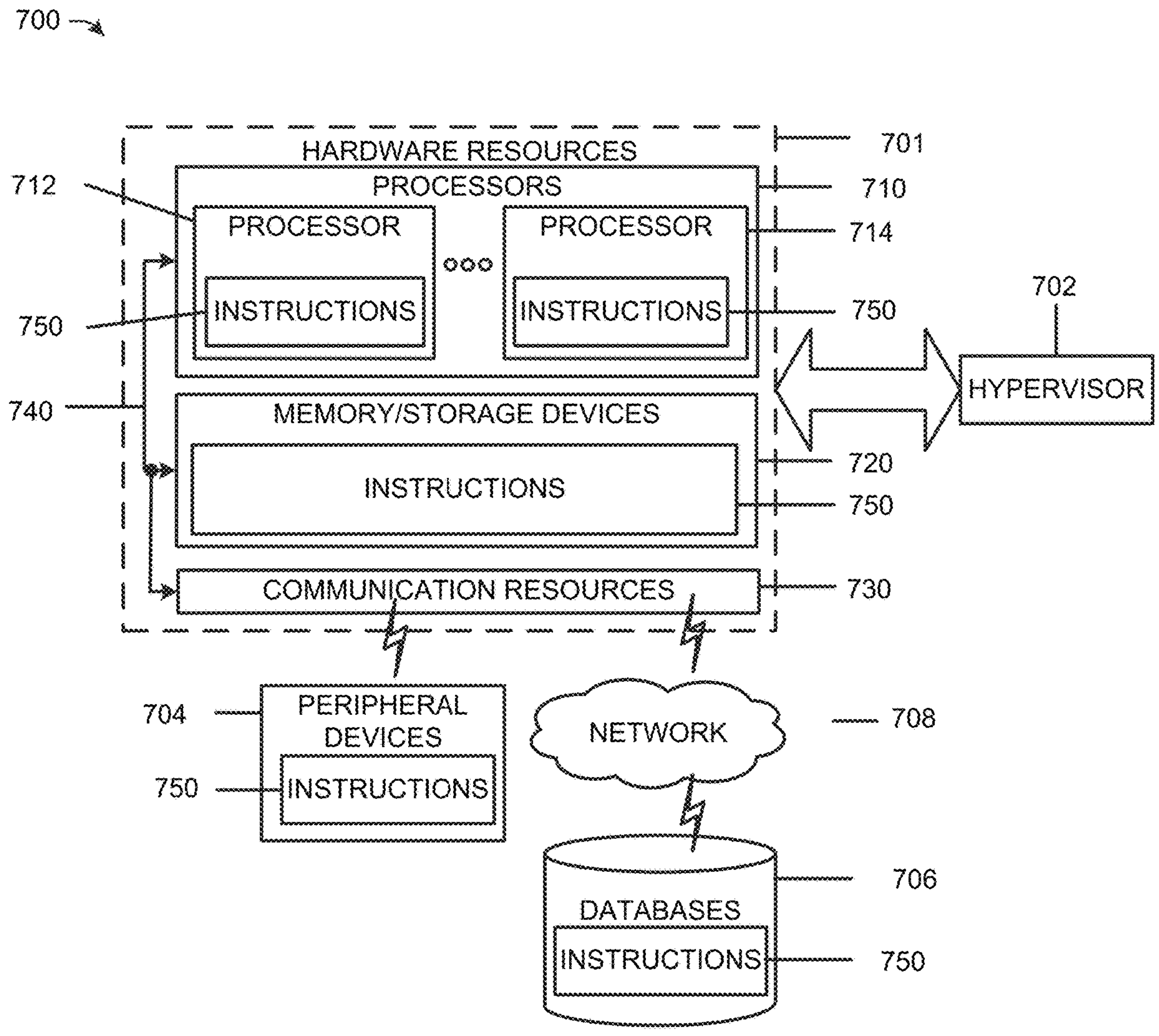
FIG. 7 illustrates components configured to read instructions from a machine-readable or computer-readable medium, such as a non-transitory machine-readable storage medium, in accordance with one or more example embodiments of the present disclosure.

FIG. 7 illustrates components designed to read instructions from a machine-readable or computer-readable medium, such as a non-transitory machine-readable storage medium, and perform one or more methodologies as discussed. Specifically, FIG. 7 displays hardware resources 700 that consist of one or more processors (or processor cores) 710, various memory/storage devices 720, and a range of communication resources 730, all of which may be communicatively linked via a bus 740 or alternative interface circuitry. In virtualized environments (e.g., NFV applications), a hypervisor 702 may be executed to provide an operational environment for network slices or sub-slices, enabling them to leverage the hardware resources 700 efficiently. In some scenarios, these hardware resources 700 may reside within a single compute node housed in an enclosure of variable form factors. In other configurations, the hardware resources 700 may span multiple compute nodes, potentially distributed across data centers or geographical regions.

The processors 710 include a range of processing options, such as processor 712 and processor 714, and may encompass various types including CPUs, RISC or CISC processors, GPUs, DSPs like baseband processors, ASICs, FPGAs, RFICs, and microprocessors or controllers. These processors 710 are capable of supporting a diverse array of computing tasks, from general-purpose to specialized processing, such as ultra-low voltage processing, multi-core and multithreaded computing, and networking functions with processors like DPUs, IPUs, NPUs, or any appropriate combination suited to the application.

Memory and storage devices 720 encompass main memory, disk storage, and other volatile, non-volatile, and semi-volatile memory types. Examples include RAM, SRAM, DRAM, MRAM, CB-RAM, PRAM, ROM, EEPROM, flash memory, and solid-state storage. Additionally, memory/storage devices 720 support technologies like NAND and NOR flash variants (SLC, MLC, QLC, TLC), PCM, NVM with chalcogenide glass, nanowire memory, FeTRAM, MRAM incorporating memristor technology, STT-MRAM, magnetic junction devices, MTJ, and DW/SOT devices, thyristor-based memory, and many others. These elements are essential for maintaining data integrity and providing rapid access for high-speed applications, adaptable for use with various databases, machine learning models, and data-heavy applications.

The communication resources 730 facilitate connections with peripheral devices 704, databases 706, and other network elements via network 708. This communication setup supports wired connections (USB, Ethernet), cellular technologies, NFC, Bluetooth®, Bluetooth® Low Energy, Wi-Fi®, and others, ensuring robust data exchange across devices. The peripheral devices 704 may serve as sensors or actuators, with sensors detecting and sending environmental or state-related data (sensor data) to other devices, modules, or subsystems. Examples of sensors include IMUs with accelerometers, gyroscopes, and magnetometers, MEMS or NEMS (3-axis accelerometers/gyroscopes), level sensors, flow and temperature sensors, pressure sensors, LiDAR, proximity sensors, depth sensors, and cameras. These sensors allow precise monitoring and feedback to compute nodes or platforms, enhancing interaction with their environments.

Peripheral devices 704 also function as actuators, enabling physical movement or control over machines, systems, or devices, converting energy into motion. Examples include soft actuators, hydraulic/pneumatic actuators, linear actuators, motors, piezoelectric actuators, EMAs, EMRs, SSRs, SMAs, polymer-based actuators, solenoids, impactive mechanisms like jaws or mechanical fingers, and propulsion mechanisms like wheels or axles. Actuators may also operate in virtualized configurations, permitting digital manipulation of system functions.

The instructions 750 encompass a broad range of executable code types-software, application code, firmware, machine code-designed to trigger specific processing tasks on the processors 710, including those within processor caches and memory/storage devices 720. These instructions may be transmitted from peripheral devices 704 or databases 706 to hardware resources 700 as necessary, stored in caches, memory/storage devices, and other machine-readable media. Depending on the setup, sensors can detect events, such as environmental changes, that trigger responses in other systems, whether exteroceptive (external states), proprioceptive (internal states), or exproprioceptive (linking internal and external data). For instance, peripheral devices may include image sensors, light sensors, ambient sensors, and acoustic sensors, collecting data that enables the processing units to interpret, analyze, and act upon the surrounding conditions.

Further supporting compute node functionality, the actuators may respond to stimuli by reconfiguring state, position, or orientation, executing tasks such as zoom, focus, or shutdown. In some cases, the actuators integrate with computing elements or controllers like PCHs, memory controllers, and interconnects, dynamically adapting based on operational requirements. These processes rely on instructions 750 from various sources to direct actuator behavior, ensuring the network's components operate within the designated parameters or as environmental changes dictate. Collectively, this configuration of memory, processing, communication, and sensor-actuator systems enables seamless interactions, data management, and robust automation across distributed computing environments.

Figure 8:
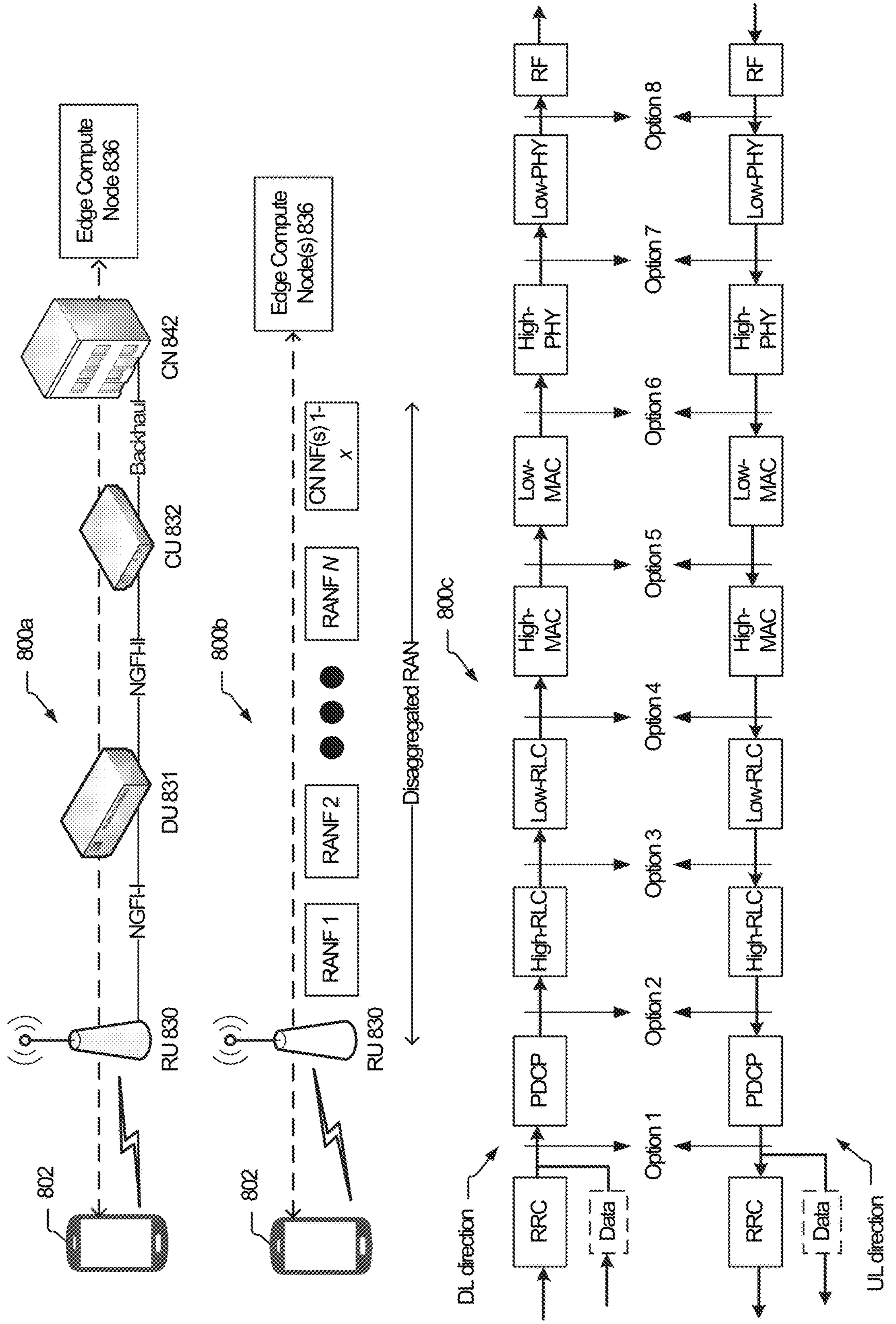
FIG. 8 depicts illustrative network deployments, including a next-generation fronthaul (NGF) deployment, in accordance with one or more example embodiments of the present disclosure.

FIG. 8 presents example network deployments, including a next-generation fronthaul (NGF) deployment 800*a*. In this setup, user equipment (UE) 802 connects to an RU 830, also known as a "remote radio unit 830" or a "remote radio head 830" (RRH 830), through an air interface. The RU 830 links to a Digital Unit (DU) 831 via an NGF interface (NGFI)-I, while the DU 831 connects to a Central Unit (CU) 832 via NGFI-II. Further, the CU 832 communicates with a core network (CN) 842 over a backhaul interface. In 3GPP NG-RAN deployments (e.g., [TS38401]), the DU 831 may be referred to as a distributed unit, with "DU" encompassing both digital and distributed units unless the context specifies otherwise. The UEs 802 may be identical or similar to UE 402, UE 602, hardware resources 700, MLF(s) 1202, 1204, or any other UE described within this context.

Depending on deployment, the NGF setup 800*a* might follow a distributed RAN (D-RAN) architecture, where the CU 832, DU 831, and RU 830 reside at the cell site, and the CN 842 is centralized. Alternatively, a centralized RAN (C-RAN) architecture is possible, centralizing processing of one or more baseband units (BBUs). In C-RAN deployments, the radio components split, allowing placement in various locations. For example, in some C-RAN setups, only the RU 830 remains at the cell site, while the DU 831, CU 832, and CN 842 are centralized. Other C-RAN configurations may position the RU 830 and DU 831 at the cell site and the CU 832 and CN 842 centrally, or place only the RU 830 at the cell site with the DU 831 and CU 832 at a RAN hub and the CN 842 centralized.

The CU 832 acts as a central controller, interfacing with multiple DUs 831 and RUs 830. As a network node hosting upper layers of a protocol split, the CU 832 supports the radio resource control (RRC), Service Data Adaptation Protocol (SDAP), and Packet Data Convergence Protocol (PDCP) layers within a next-generation NodeB (gNB) or in E-UTRA-NR gNB (en-gNB) implementations. The SDAP layer maps between QoS flows and data radio bearers (DRBs), marking QoS flow IDs (QFIs) in both downlink (DL) and uplink (UL) packets. The PDCP layer manages data transfers, header compression (e.g., ROHC, EHC protocols), encryption, integrity verification, sequence numbering, SDU discard, split bearer routing, duplicate detection, reordering, and orderly delivery. In multiple cases, CU 832 terminates F1 interfaces linked to DUs 831 (e.g., [TS38401]).

A CU 832 can further split into control plane (CP) and user plane (UP) entities, referred to as CU-CP 832 and CU-UP 832, respectively. The CU-CP 832 hosts the RRC and control plane PDCP layers, ending the E1 interface with CU-UP 832 and the F1-C interface with a DU 831. The CU-UP 832 hosts the user plane PDCP and SDAP layers, connecting to the CU-CP 832 via E1 and to a DU 831 via the F1-U interface.

The DU 831 controls radio resources and assigns resources to UEs in real-time. As a network node managing middle to lower layers of the network protocol split, the DU 831, in NG-RAN or O-RAN configurations, hosts the radio link control (RLC), medium access control (MAC), and high-PHY layers of gNB or en-gNB and operates partly under CU 832's supervision. The RLC sublayer supports Transparent, Unacknowledged, and Acknowledged Modes, managing sequence numbering, ARQ error correction, segmentation, reassembly, SDU discard, RLC re-establishment, and error detection. The MAC sublayer handles logical to transport channel mapping, multiplexing, HARQ error correction, scheduling, prioritization, padding, and logical channel management. In some cases, a DU 831 hosts a Backhaul Adaptation Protocol (BAP) layer (e.g., 3GPP TS 38.340) or F1 application protocol (FIAP) and serves as an Integrated Access and Backhaul (IAB) node. DU 831 terminates the F1 interface with CU 832, and may interface with multiple RRHs/RUs 830.

The RU 830, serving as a transmission/reception point, supports radiofrequency processing and may host lower PHY layer functions within NG-RAN and O-RAN frameworks. Its functions include FFT/iFFT, PRACH extraction, and various RF processes. Each CU 832, DU 831, and RU 830 connects via wireless or wired links (e.g., fiber or copper). In some cases, CU 832, DU 831, and RU 830 configurations may parallel RAN 404, NAN 414, AP 406, or other NANs as outlined in the documentation.

An optional fronthaul gateway (FHGW) may reside between DU 831 and RU 830. It links through Open Fronthaul interfaces (e.g., Option 7-2x) or others (e.g., Option 7 or 8) supporting or excluding Open Fronthaul protocols. In some models, a RAN controller connects with CU 832 or DU 831. The NGFI, or "xHaul", divides RRU 830-BBU connectivity into two levels: level I connecting RU 830 to DU 831 via NGFI-I, and level II connecting DU 831 to CU 832 via NGFI-II, supporting function splits to adjust latency demands and deployment flexibility. NGFI-based architectures include O-RAN 7.2x fronthaul, Enhanced Common Radio Interface (eCPRI), and ROE C-RAN fronthaul interfaces, with further specifications in IEEE1914.1 and related documentation.

In some NGF deployments 800*a*, a low-level split (LLS) runs between RU 830 and DU 831, deploying Open Fronthaul standards or similar protocols in 3GPP and Small Cell Forum standards. Some CU 832, DU 831, and RU 830 nodes operate as IAB nodes, enabling wireless relays across NG-RAN through a directed acyclic graph (DAG) topology managed by an IAB-donor. Although the NGF deployment 800*a* typically keeps CU 832, DU 831, RRH 830, and CN 842 distinct, certain implementations integrate these nodes to simplify architecture, combining interfaces like F1-C, F1-U, and E1. Variants include integrating CU 832 and DU 831 into a CU-DU, centralizing CU 832 with DU 831 and RRH 830, or fully integrating CU, DU, and RU with the CN 842.

FIG. 8 additionally highlights a RAN disaggregation setup 800*b*, where UE 802 connects to RRH 830, which interfaces with disaggregated RAN functions (RANFs) 1-N. Each RANF 1-N may be software elements across geographic segments, operated on physical compute nodes (e.g., COTS HW) with RF circuitry in RRH 830. Disaggregated networking separates SW from HW elements, with APIs facilitating SDN and NF virtualization, enabling modular RANF distribution for flexibility, lower cost, and optimized deployment.

Example RANF disaggregation implementations include RANFs on COTS infrastructure, control/user plane separation, and IEEE802 or O-RAN layers. Disaggregation enables real-time processing (e.g., signal processing algorithms) in lower RAN layers on DUs 831 or RRHs 830 using COTS or purpose-built HW. Functional split options 800*c* in FIG. 8 illustrate splitting between CU 832 and DU 831, separating non-RT functions like RRC/PDCP from RT layers like RLC, MAC, and PHY. The Option 2 split, placing RRC/PDCP in CU 832 and RLC/MAC/PHY in DU 831, centralizes CU 832 for efficient resource pooling across DUs 831. Other split options vary per deployment requirements and include multiple RANF splits per layer.

Figure 9:
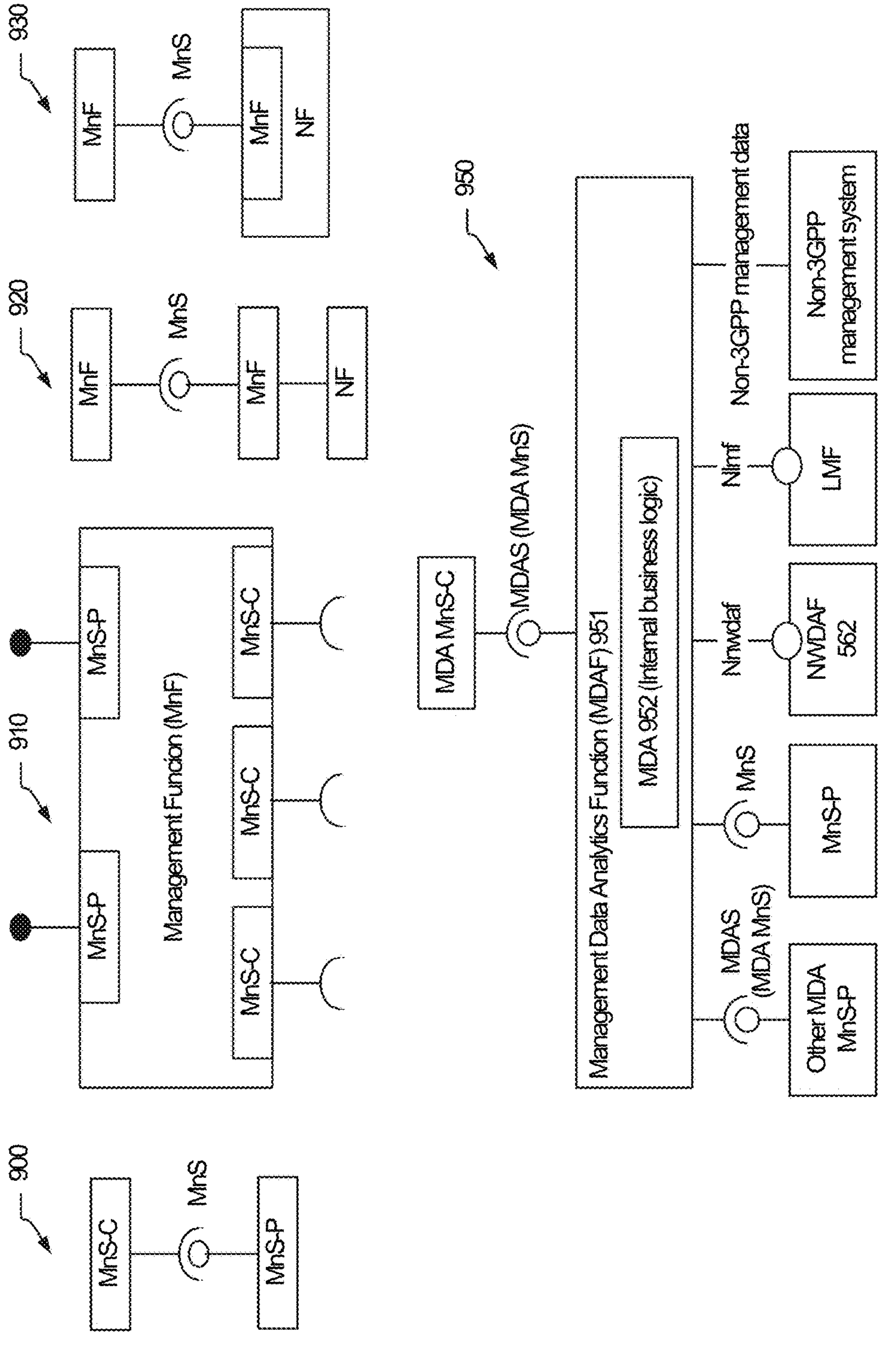
FIG. 9 depicts an example Management Services (MnS) deployment, utilizing a Service-Based Management Architecture (SBMA), in accordance with one or more example embodiments of the present disclosure.

FIG. 9 depicts an example Management Services (MnS) deployment, 900, utilizing a Service-Based Management Architecture (SBMA). Here, MnS represents a set of management capabilities like network and service orchestration (MANO). MnS producers (MnS-P) offer services consumed by authorized entities (MnS-Cs) through standardized interfaces composed of specified MnS components. Each MnS includes at least two component types: A, B, and C. Component type A consists of general operations and notifications, agnostic to specific network details, such as create, read, update, and delete actions. Component type B, or Network Resource Model (NRM), includes data models for managed entities (e.g., [TS28622]). Component type C provides performance and fault data, covering alarm information (e.g., [TS28532]) and performance metrics ([TS28552], [TS28554]).

The MnS-P profile describes metadata for supported MnS components and optional features. FIG. 9 also illustrates an example management function (MnF) deployment, 910, where an MnF serves as both MnS-P and MnS-C. This MnF deployment supports exposure governance management, allowing multiple consumers to utilize MnS from MnF 910. MnFs can be standalone or embedded in a network function (NF), as shown in scenarios 920 and 930. MnFs may interact with other MnFs by consuming MnS produced externally.

Another example, MDA service (MDAS or MDA MnS) deployment, 950, illustrates how management data analytics (MDA) underpins automation and intelligence for network management. MDA processes data, including performance, KPIs, QoE, alarms, and network/service experience data (e.g., AFs 460), to generate analytics like statistics, predictions, and recommendations. MDAS results, consumed by entities like MnFs, NFs, NWDAF 462, SON functions, or human operators, support proactive operations and resource planning. The MDAS leverages SBMA for flexible, authorized analytics requests, aiding consumers like MDAF (MDA MnS-P or MDA MnS-C) and non-3GPP systems in their analytics tasks.

MDA operations analyze current and historical data (e.g., KPIs per [TS28554], MDT per [TS32422], and QoE data per [TS28405]) alongside external sources like web-based data (AF 460). Outputs, stored as historical reports, serve future analytics. MDAF, acting as a cross-domain MDA MnS-P, may coordinate with entities such as NWDAF 462 and NANs 414 for broader insights ([TS28104]). MDA MnS-Ps offer contextual analytics (e.g., load predictions under various NAN 414 statuses), allowing consumers (MnS-Cs) to integrate this data with network status details for refined decision-making. Due to diverse context needs, MnS-Cs independently gather required network context (see [TS28531]).

MDA processes often use AI/ML functions, and an MDAF may be deployed with AI/ML inferences based on related MDA capabilities. Training for MDA ML entities aligns with [TS28105], supporting AI-enhanced MDA MnS outputs that adapt analytics per network-specific conditions.

Figure 10:
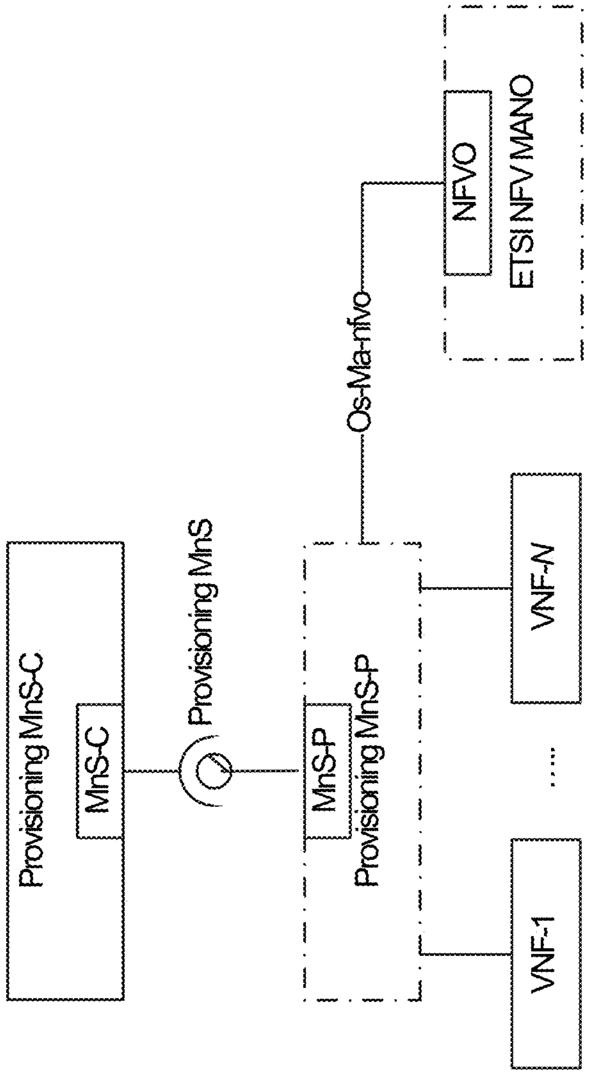
FIG. 10 illustrates an example provisioning MnS designed to support LifeCycle Management (LCM), in accordance with one or more example embodiments of the present disclosure.

FIG. 10 depicts an example of provisioning MnS to support LifeCycle Management (LCM). The 3GPP management system is also capable to consume NFV MANO interface (e.g., Os-Ma-nfvo, Ve-Vnfm-em, and Ve-Vnfm-vnf reference points). An MnS-P can consume management interfaces provided by NFV MANO for at least the following purposes: network service LCM; and VNF LCM, PM, FM, CM on resources supporting VNF. FIG. 10 shows an example framework of provisioning MnS where an MnS-P interfaces to an ETSI NFV MANO to support the lifecycle management of VNFs.

Figure 4:
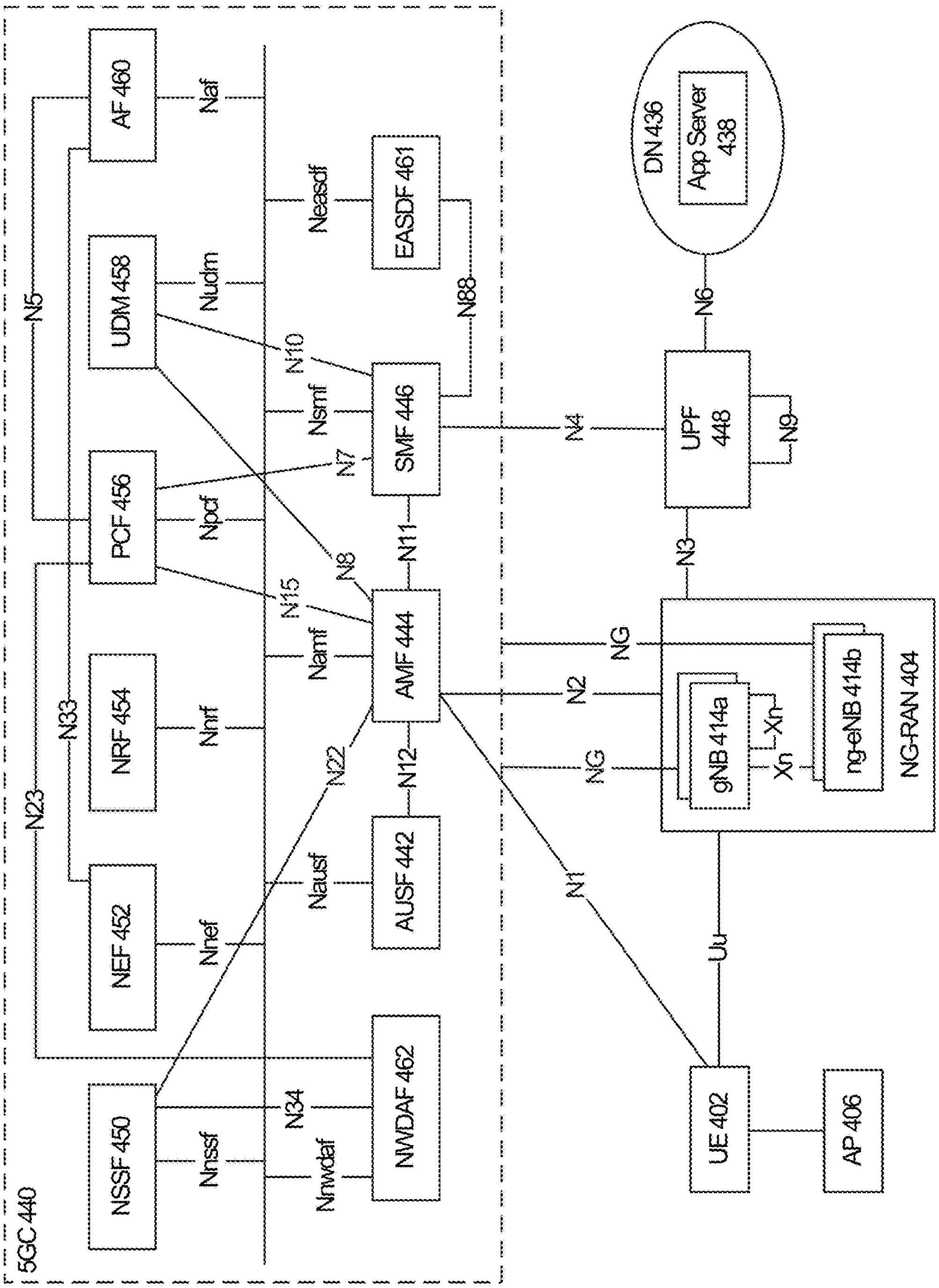
FIG. 4 depicts an illustrative network architecture designed to support current and future mobile networks, including both LTE and 5G/NR systems, in accordance with one or more example embodiments of the present disclosure.

Artificial Intelligence and Machine Learning Aspects:

AI/ML is widely used in fifth generation (5G) systems (5GS), including 5G core (5GC) (e.g., Network Data Analytics Function (NWDAF) 462 in FIG. 4), next generation radio access networks (NG-RANs) 404 (e.g., RAN intelligence functions; see e.g., [TS38300] and [TS38401]), and management system (e.g., management data analytics service (MDAS); see e.g., [TS28104], [TS28105], [TR28908], [TS28533], [TS28535], [TS28536], and [TS28550]). Aspects of AI/ML being used in the 5GS are discussed infra.

Figure 11:
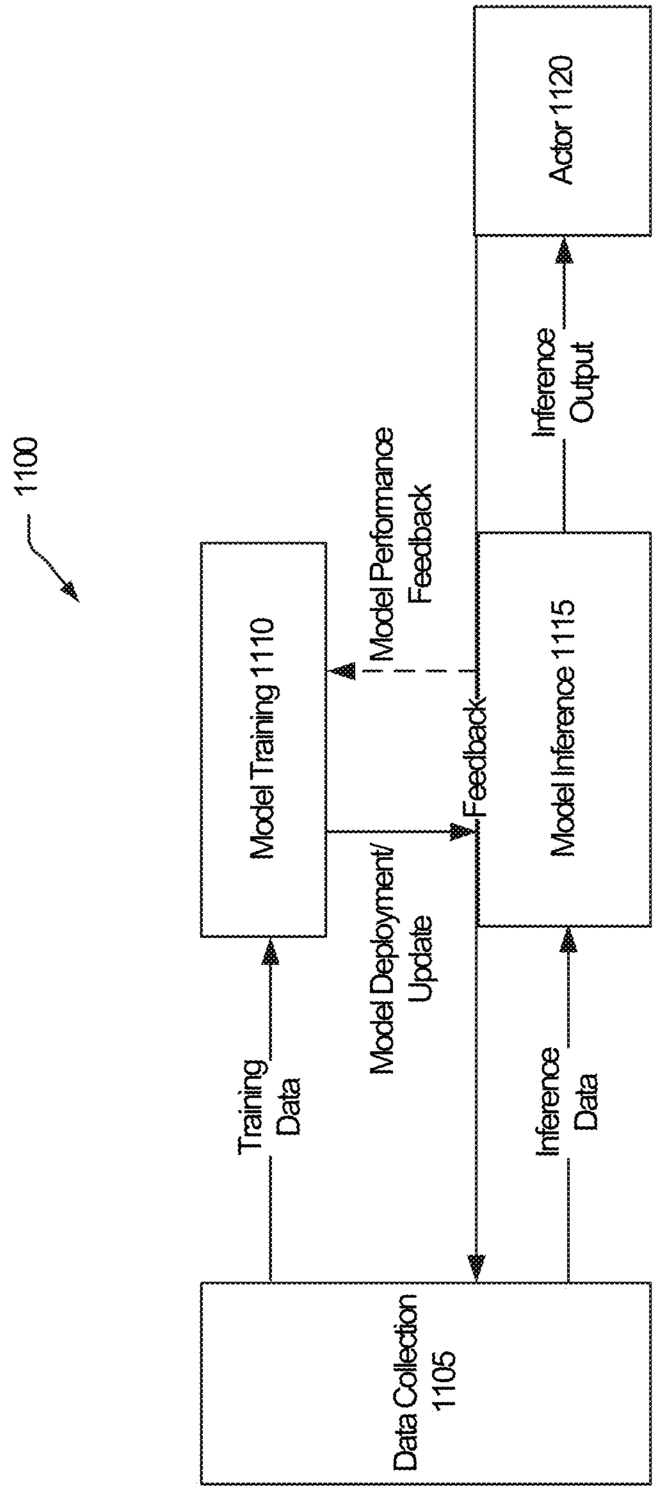
FIG. 11 depicts an example functional framework for ML and/or RAN intelligence, in accordance with one or more example embodiments of the present disclosure.

FIG. 11 depicts an example functional framework 1100 for ML and/or RAN intelligence. The functional framework 1100 includes a data collection function 1105, which is a function that provides input data to the model training function 1110 and model inference function 1115. AI/ML algorithm-specific data preparation (e.g., data pre-processing and cleaning, formatting, and transformation) may or may not be carried out in the data collection function 1105. Examples of input data may include measurements from UEs 1302, RAN nodes 1314, and/or additional or alternative network entities; feedback from actor 1120; and/or output(s) from AI/ML model(s). The input data fed to the model training function 1110 is training data, and the input data fed to the model inference function 1115 is inference data.

The model training function 1110 is a function that performs the AI/ML model training, validation, and testing. The model training function 1110 may generate model performance metrics as part of the model testing procedure and/or as part of the model validation procedure. Examples of the model performance metrics are discussed infra. The model training function 1110 may also be responsible for data preparation (e.g., data pre-processing and cleaning, formatting, and transformation) based on training data delivered by the data collection function 1105, if required.

The model training function 1110 performs model deployment/updates, wherein the model training function 1110 initially deploys a trained, validated, and tested AI/ML model to the model inference function 1115, and/or delivers updated model(s) to the model inference function 1115. Examples of the model deployments and updates are discussed infra.

The model inference function 1115 is a function that provides AI/ML model inference output (e.g., statistical inferences, predictions, decisions, probabilities and/or probability distributions, actions, configurations, policies, data analytics, outcomes, optimizations, and/or the like). The model inference function 1115 may provide model performance feedback to the model training function 1110 when applicable. The model performance feedback may include various performance metrics (e.g., any of those discussed herein) related to producing inferences. The model performance feedback may be used for monitoring the performance of the AI/ML model, when available. The model inference function 1115 may also be responsible for data preparation (e.g., data pre-processing and cleaning, formatting, and transformation) based on inference data delivered by the data collection function 1105, if required.

The model inference function 1115 produces an inference output, which is the inferences generated or otherwise produced when the model inference function 1115 operates the AI/ML model using the inference data. The model inference function 1115 provides the inference output to the actor 1120. Details of inference output are use case specific and may be based on the specific type of AI/ML model being used.

The actor 1120 is a function that receives the inference output from the model inference function 1115, and triggers or otherwise performs corresponding actions based on the inference output. The actor 1120 may trigger actions directed to other entities and/or to itself. In some examples, the actor 1120 is an NES function, a mobility optimization function, and/or a load balancing function. Additionally or alternatively, the inference output is related to NES, mobility optimization, and/or load balancing, and the actor 1120 is one or more RAN nodes 1314 that perform various NES operations, mobility optimization operations, and/or load balancing operations based on the inferences.

The actor 1120 may also provide feedback to the data collection function 1105 for storage. The feedback includes information related to the actions performed by the actor 1120. The feedback may include any information that may be needed to derive training data (and/or testing data and/or validation data), inference data, and/or data to monitor the performance of the AI/ML model and its impact to the network through updating of KPIs, performance counters, and the like.

Figure 12:
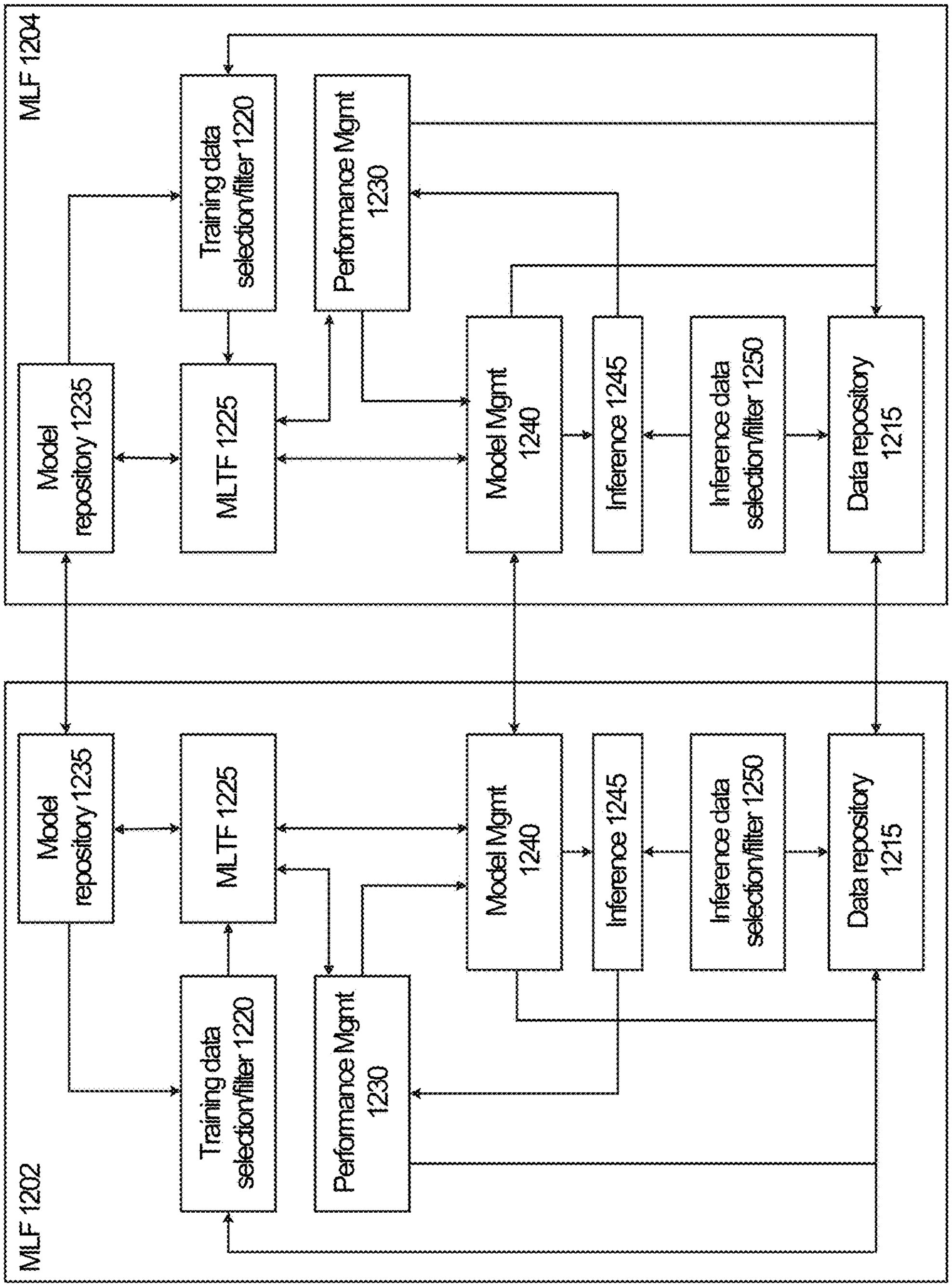
FIG. 12 presents an illustrative AI/ML-assisted network deployment, showing communication between machine learning functions MLF, in accordance with one or more example embodiments of the present disclosure.

FIG. 12 presents an AI/ML-assisted network deployment, showing communication between an ML Function (MLF) 1202 and an MLF 1204. AI/ML models enhance over-the-air or wired communication between these MLFs, compatible with 5G/6G standards per 3GPP specifications. Communication mechanisms may integrate with or overlap the components in FIGS. 4, 6, 8, 9, 10, and other specified deployments. In various examples, MLFs 1202 and 1204 may represent MnFs, MnS-Ps, NWDAF service consumers, UEs (e.g., 402, 602), RANs, or individual NFs, and may function independently or share components/entities between them.

Key elements include the Data Repository 1215, which stores collected data (e.g., RAN configurations, KPIs, ML model parameters) and supplies training and inference data. The Training Data Selection/Filter 1220 prepares datasets for ML training, while the ML Training Function (MLTF) 1225 is responsible for model training, validation, and updates, storing results in the Model Repository 1235. Model Management (Mgmt) Function 1240 oversees deployment, monitoring, and model performance based on trained models. The Inference Engine 1245 executes inferences based on input data, providing outcomes like predictions and optimizations. Outputs support network functions such as NES, MRO, and LBO, with performance feedback given to mgmt functions as needed.

Performance Measurement Function 1230 tracks metrics (e.g., accuracy, latency, memory utilization) for deployed models, assessing both model-based metrics (e.g., MAE, recall) and platform-based metrics (e.g., FLOPS, throughput) relevant to the AI/ML model's application across hardware platforms and use cases.

Figure 13:
FIG. 13 illustrates an ML training request, in accordance with one or more example embodiments of the present disclosure.

Referring to FIG. 13, there is shown anML training requested by MLT MnS-C.

AI/ML Management Aspects:

Each operational step in the workflow (see e.g., [TS28105] § 5.0) is supported by one or more AI/ML management capabilities as depicted below for each of the operational phases.

Management capabilities for ML training include ML training management, ML validation, and ML testing management.

ML training management: allowing the MnS-C to request the ML entity training, consume and control the producer-initiated training, and manage the ML entity training/retraining process. The training management capability may include training performance management and setting a policy for the producer-initiated ML entity training.

ML validation: ML training capability also includes validation to evaluate the performance of the ML entity when performing on the validation data, and to identify the variance of the performance on the training and validation data. If the variance is not acceptable, the ML entity would need to be tuned (re-trained) before being made available for the next step in the operational workflow (e.g., ML entity testing).

ML testing management: allowing the MnS-C to request the ML entity testing, and to receive the testing results for a trained ML entity. It may also include capabilities for selecting the specific performance metrics to be used or reported by the ML testing function. MnS-C may also be allowed to trigger ML entity re-training based on the ML entity testing performance requirements.

Management capabilities for ML emulation phase: for future study (FFS) and/or to be determined (TBD)

Management capabilities for ML entity deployment phase: ML entity loading management: allowing the MnS-C to trigger, control and/or monitor the ML entity loading process.

Management capabilities for AI/ML inference phase: AI/ML inference management;

and/or the inference aspects discussed herein.

The use cases and corresponding requirements for AI/ML management capabilities are specified in the following clauses for each phase of the operational workflow.

ML Training Phase:

ML Model Training:

In operational environment before the ML entity is deployed to conduct inference, the ML model associated with the ML entity needs to be trained (e.g. by ML training function which may be a separate or an external entity to the AI/ML inference function). The ML model training can be initial training or re-training of an already trained ML entity.

The ML model is trained by the ML training (MLT) MnS-P, and the training can be triggered by request(s) from one or more MLT MnS-C(s), or initiated by the MLT MnS-P (e.g., as a result of model performance evaluation).

ML Model Training Requested by Consumer:

The ML training capabilities are provided by an MLT MnS-P to one or more consumer(s).

The ML training may be triggered by the request(s) from one or more MLT MnS-C(s). The consumer may be for example a network function, a management function, an operator, or another functional differentiation.

To trigger an initial ML training, the MnS-C needs to specify in the ML training request the inference type which indicates the function or purpose of the ML entity, e.g. CoverageProblemAnalysis. The MLT MnS-P can perform the initial training according to the designated inference type. To trigger an ML re-training, the MnS-C needs to specify in the ML training request the identifier of the ML entity to be re-trained.

The consumer may provide the data source(s) that contain(s) the training data which are considered as inputs candidates for training. To obtain the valid training outcomes, consumers may also designate their requirements for model performance (e.g. accuracy, precision, and/or the like) in the training request.

The performance of the ML entity depends on the degree of commonality between the distribution of the data used for training and the distribution of the data used for inference. As time progresses, the distribution of the input data used for inference might change as compared to the distribution of the data used for training. In such a scenario, the performance of the ML entity degrades over time. The MLT MnS-P may re-train the ML model associated to the entity if the inference performance of the ML entity falls below a certain threshold, which needs to be configurable by the MnS-C.

Following the ML training request by the MLT MnS-C, the MLT MnS-P provides a response to the consumer indicating whether the request was accepted.

If the request is accepted, the MLT MnS-P decides when to start the ML training with consideration of the request(s) from the consumer(s). Once the training is decided, the producer performs the following: selects the training data, with consideration of the consumer provided candidate training data. Since the training data directly influences the algorithm and performance of the trained ML Entity, the MLT MnS-P may examine the consumer's provided training data and decide to select none, some or all of them. In addition, the MLT MnS-P may select some other training data that are available; trains the ML model using the selected training data; and/or provides the training results (including the identifier of the ML entity generated from the initially trained ML model or the version number of the ML entity associated with the re-trained model, training performance results, and/or the like) to the MLT MnS-C(s).

ML Training Initiated by Producer:

The ML training may be initiated by the MLT MnS-P, for instance as a result of performance evaluation of the ML model, based on feedback or new training data received from the consumer, or when new training data which are not from the consumer describing the new network status/events become available.

When the MLT MnS-P decides to start the ML training, the producer performs the following: selects the training data; trains the ML model using the selected training data; provides the training results (including the identifier of the ML entity generated from the initially trained ML model or the version number of the ML entity associated with the re-trained model, training performance, and/or the like) to the MLT MnS-C(s) who have subscribed to receive the ML training results.

ML Model and ML Entity Selection:

For a given machine learning-based use case, different entities that apply the respective ML model or AI/ML inference function may have different inference requirements and capabilities. For example, one consumer with specific responsibility and wish to have an AI/ML inference function supported by an ML model or entity trained for city central business district where mobile users move at speeds not exceeding 30 km/hr. On the other hand, another consumer, for the same use case may support a rural environment and as such wishes to have an ML model and AI/ML inference function fitting that type of environment. The different consumers need to know the available versions of ML entities, with the variants of trained ML models or entities and to select the appropriate one for their respective conditions.

Besides, there is no guarantee that the available ML models/entities have been trained according to the characteristics that the consumers expect. As such the consumers need to know the conditions for which the ML models or ML entities have been trained to then enable them to select the models that are best fit to their conditions and needs.

The models that have been trained may differ in terms of complexity and performance. For example, a generic comprehensive and complex model may have been trained in a cloud-like environment but such a model cannot be used in the gNB and instead, a less complex model, trained as a derivative of this generic model, could be a better candidate. Moreover, multiple less complex models could be trained with different levels of complexity and performance which would then allow different relevant models to be delivered to different network functions depending on operating conditions and performance requirements. The network functions need to know the alternative models available and interactively request and replace them when needed and depending on the observed inference-related constraints and performance requirements.

Managing ML Training Processes:

This machine learning capability relates to means for managing and controlling ML model training processes.

To achieve the desired outcomes of any machine learning relevant use-case, the ML model applied for such analytics, needs to be trained with the appropriate data. The training may be undertaken in a managed function or in a management function.

In either case, the network (or the OAM system thereof) not only needs to have the required training capabilities but needs to also have the means to manage the training of the ML models. The consumers need to be able to interact with the training process, e.g., to suspend or restart the process; and also need to manage and control the requests related to any such training process.

Figure 14:
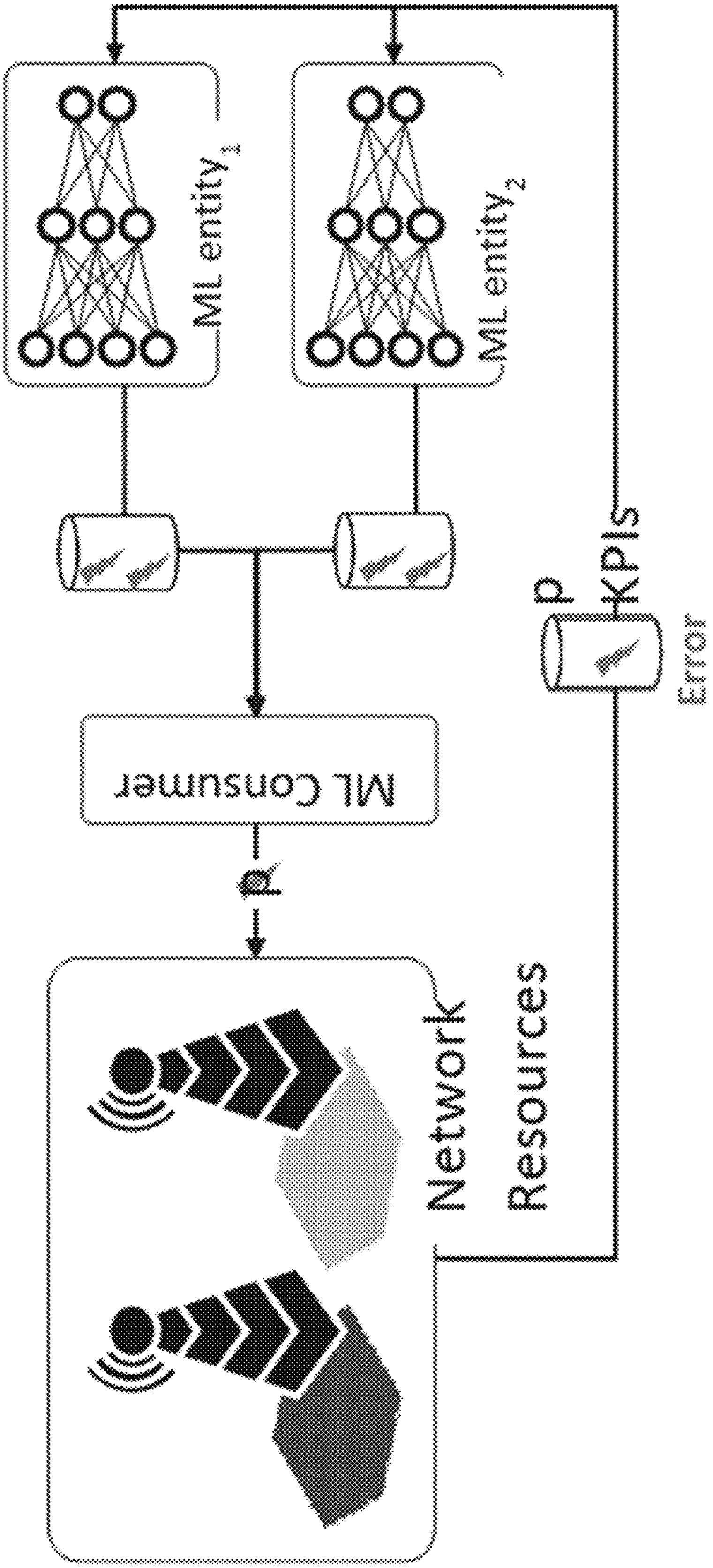
FIG. 14 illustrates a propagation of erroneous information, in accordance with one or more example embodiments of the present disclosure.

Referring to FIG. 14, there is shown a propagation of erroneous information.

Handling Errors in Data and ML Decisions:

Traditionally, the ML models/entities are trained on good quality data, i.e. data that were collected correctly and reflected the real network status to represent the expected context in which the ML entity is meant to operate. Good quality data is void of errors, such as: imprecise measurements, with added noise (e.g., RSRP, RSRQ, SNR, SINR, QoE estimations, and/or the like); missing values or entire records, for example, because of communication link failures); and/or records which are communicated with a significant delay (in case of online measurements).

Without errors, an ML entity can depend on a few precise inputs, and does not need to exploit the redundancy present in the training data. However, during inference, the ML entity is very likely to come across these inconsistencies. When this happens, the ML entity shows high error in the inference outputs, even if redundant and uncorrupted data are available from other sources.

As such the system needs to account for errors and inconsistencies in the input data and the consumers should deal with decisions that are made based on such erroneous and inconsistent data. The system should:

1) enable functions to undertake the training in a way that prepares the ML entities to deal with the errors in the training data, i.e., to identify the errors in the data during training;
2) enable the MLT MnS-Cs to be aware of the possibility of erroneous input data that are used by the ML entity.

ML Entity Joint Training:

Each ML entity supports a specific type of inference. An AI/ML inference function may use one or more ML entities to perform the inference(s). When multiple ML entities are employed, these ML entities may operate together in a coordinated way, such as in a sequence, or even a more complicated structure. In this case, any change in the performance of one ML entity may impact another, and consequently impact the overall performance of the whole AI/ML inference function.

There are different ways in which the group of ML entities may coordinate. An example is the case where the output of one ML entity can be used as input to another ML entity forming a sequence of interlinked ML entities. Another example is the case where multiple ML entities provide the output in parallel (either the same output type where outputs may be merged (e.g., using weights), or their outputs are needed in parallel as input to another ML entity. The group of ML entities needs to be employed in a coordinated way to support an AI/ML inference function.

Therefore, it is desirable that the ML models associated with these coordinated ML entities can be trained or re-trained jointly, so that the group of these ML entities can complete a more complex task jointly with better performance.

The ML entity joint training may be initiated by the MLT MnS-P or the MLT MnS-C, with the grouping of the ML entities shared by the MLT MnS-P with the MLT MnS-C.

ML Entity Validation Performance Reporting:

During the ML training process, the generated ML entity needs to be validated. The purpose of ML validation is to evaluate the performance of the ML entity when performing on the validation data, and to identify the variance of the performance on the training data and the validation data. The training data and validation data are of the same pattern as they normally split from the same data set with a certain ratio in terms of quantity of the data samples.

In the ML training, the ML entity is generated based on the learning from the training data, and validated using the validation data. The performance of the ML entity has tight dependency on the data (i.e., training data) from which the ML entity is generated. Therefore, an ML entity performing well on the training data may not necessarily perform well on other data e.g., while conducting inference. If the performance of ML entity is not good enough according to the result of ML validation, the ML entity will be tuned (the model associated with it be re-trained) and validated again. The process of ML entity tuning and validation is repeated by the ML training function, until the performance of the ML entity meets the expectation on both training data and validation data. The MnS-P subsequently selects one or more ML entities with the best level of performance on both training data and validation data as the result of the ML training, and reports accordingly to the consumer. The performance of each selected ML entity on both training data and validation data also needs to be reported.

The performance result of the validation may also be impacted by the ratio of the training data and the validation data. MnS-C needs to be aware of the ratio of training data and the validation data, coupled with the performance score on each data set, in order to be confident about the performance of ML entity.

Requirements for ML Training:

TABLE 1

| Requirement label | Description | Related use case(s) |
|---|---|---|
| REQ-ML_TRAIN-FUN-01 | The MLT MnS-P shall have a capability allowing an authorized MLT MnS-C to request ML training. | ML training requested by consumer (see e.g., [TS28105] § 6.2.1.2.1) |
| REQ- ML_TRAIN-FUN-02 | The MLT MnS-P shall have a capability allowing the authorized MLT MnS-C to specify the data sources containing the candidate training data for ML training. | ML training requested by consumer (see e.g., [TS28105] § 6.2.1.2.1) |
| REQ- ML_TRAIN-FUN-03 | The MLT MnS-P shall have a capability allowing the authorized MLT MnS-C to specify the inference type of the ML entity to be trained. | ML training requested by consumer (see e.g., [TS28105] § 6.2.1.2.1) |
| REQ- ML_TRAIN-FUN-04 | The MLT MnS-P shall have a capability to provide the training result to the MLT MnS-C. | ML training requested by consumer (see e.g., [TS28105] § 6.2.1.2.1), ML training initiated by producer (see e.g., [TS28105] § 6.2.1.2.2) |
| REQ- ML_TRAIN-FUN-05 | The MLT MnS-P shall have a capability allowing an authorized MLT MnS-C to configure the thresholds of the performance measurements and/or KPIs to trigger the re-training of an ML entity. (See Note) | ML training initiated by producer (see e.g., [TS28105] § 6.2.1.2.2) |
| REQ- ML_TRAIN-FUN-06 | The MLT MnS-P shall have a capability to provide the version number of the ML entity and the time when it is generated by ML re-training to the authorized MLT MnS-C. | ML training requested by consumer (clause 6.2.1.2.1), /ML training initiated by producer (see e.g., [TS28105] § 6.2.1.2.2) |
| REQ- ML_TRAIN-FUN-07 | The MLT MnS-P shall have a capability allowing an authorized MLT MnS-C to manage the training process, including starting, suspending, or resuming the training process, and configuring the ML context for ML training. | ML training requested by consumer (clause 6.2.1.2.1), ML training initiated by producer (clause 6.2.1.2.2), ML entity joint training (see e.g., [TS28105] § 6.2.1.2.6) |
| REQ- ML_TRAIN-FUN-08 | The MLT MnS-P should have a capability to provide the grouping of ML entities to an authorized MLT MnS-C to enable coordinated inference. | ML entity joint training (see e.g., [TS28105] § 6.2.1.2.6) |
| REQ- ML_TRAIN-FUN-09 | The MLT MnS-P should have a capability to allow an authorized MLT MnS-C to request joint training of a group of ML entities. | ML entity joint training (see e.g., [TS28105] § 6.2.1.2.6) |
| REQ- ML_TRAIN-FUN-10 | The MLT MnS-P should have a capability to jointly train a group of ML entities and provide the training results to an authorized consumer. | ML entity joint training (see e.g., [TS28105] § 6.2.1.2.6) |
| REQ-ML_SELECT-01 | 3GPP management system shall have a capability to enable an authorized MLT MnS-C to discover the characteristics of available ML entitiesincluding the contexts under which each of the models associated with the entities were trained. | ML model and ML entity selection (see e.g., [TS28105] § 6.2.2.3) |
| REQ-ML_SELECT-02 | 3GPP management system shall have a capability to enable an authorized MLT MnS-C to select an ML entity. | ML models and ML entity selection (see e.g., [TS28105] § 6.2.2.3) |
| REQ-ML_SELECT-03 | The MLT MnS-P shall have a capability to enable an authorized MLT MnS-C to request for a model to be trained to satisfy the consumer's expectations. | ML training requested by consumer (see e.g., [TS28105] § 6.2.2.1), ML model and ML entity selection (see e.g., [TS28105] § 6.2.2.3) |
| REQ-ML_SELECT-04 | 3GPP management system shall have a capability to enable an authorized MLT MnS-C to request for information and be informed about the available alternative ML entities of differing complexity and performance. | ML model and ML entity selection (see e.g., [TS28105] § 6.2.2.3) |
| REQ-ML_SELECT-05 | 3GPP management system shall have a capability to enable an authorized MLT MnS-C to request one of the known or available alternative models of differing complexity and performance to be used for inference. | ML model and ML entity selection (see e.g., [TS28105] § 6.2.2.3) |
| REQ-ML_SELECT-06 | The 3GPP management system shall have a capability to provide a selected ML entity to the authorized MLT MnS-C. | ML model and ML entity selection (see e.g., [TS28105] § 6.2.2.3) |

TABLE 1-continued

| Requirement label | Description | Related use case(s) |
|---|---|---|
| REQ-ML_TRAIN- MGT-01 | The MLT MnS-P shall have a capability allowing an authorized consumer to manage and configure one or more requests for the specific ML training, e.g. to modify the characteristics of the request or to delete a request. | ML training requested by consumer (see e.g., [TS28105] § 6.2.2.1), Managing ML Training Processes (see e.g., [TS28105] § 6.2.2.4) |
| REQ-ML_TRAIN- MGT-02 | The MLT MnS-P shall have a capability allowing an authorized MLT MnS-C to manage and configure one or more training processes, e.g. to start, suspend or restart the training; or to adjust the training conditions and/or characteristics. | ML training requested by consumer (see e.g., [TS28105] § 6.2.2.1), Managing ML training processes (see e.g., [TS28105] § 6.2.2.4) |
| REQ-ML_TRAIN- MGT-03 | 3GPP management system shall have a capability to enable an authorized MLT MnS-C (e.g. the function/entity different from the function that generated a request for ML training) to request for a report on the outcomes of a specific training instance. | Managing ML training processes (see e.g., [TS28105] § 6.2.2.4) |
| REQ-ML_TRAIN- MGT-04 | 3GPP management system shall have a capability to enable an authorized MLT MnS-C to define the reporting characteristics related to a specific training request or training instance. | Managing ML training processes (see e.g., [TS28105] § 6.2.2.4) |
| REQ-ML_TRAIN- MGT-05 | 3GPP management system shall have a capability to enable the MLT function to report to any authorized MLT MnS-C about specific ML training process and/or report about the outcomes of any such ML training process. | Managing ML training processes (see e.g., [TS28105] § 6.2.2.4) |
| REQ-ML_ERROR-01 | The 3GPP management system shall enable an authorized consumer of data services (e.g. an MLT function) to request from a producer of data services a Value Quality Score of the data, which is the numerical value that represents the dependability/quality of a given observation and measurement type. | Handling errors in data and ML decisions (see e.g., [TS28105] § 6.2.2.5) |
| REQ-ML_ERROR-02 | The 3GPP management system shall enable an authorized consumer of AI/ML decisions (e.g. a controller) to request ML decision confidence score which is the numerical value that represents the dependability/quality of a given decision generated by an AI/ML-inference function. | Handling errors in data and ML decisions (see e.g., [TS28105] § 6.2.2.5) |
| REQ-ML_ERROR-03 | The 3GPP management system shall enable a producer of data services (e.g. a gNB) to provide to an authorized consumer (e.g. an MLT function) a Value Quality Score of the data, which is the numerical value that represents the dependability/quality of a given observation and measurement type. | Handling errors in data and ML decisions (see e.g., [TS28105] § 6.2.2.5) |
| REQ-ML_ERROR-04 | The 3GPP management system shall enable a producer of ML decisions (e.g. an AI/ML inference function) to provide to an authorized consumer of ML decisions (e.g. a controller) an AI/ML decision confidence score which is the numerical value that represents the dependability/quality of a given decision generated by the inference function. | Handling errors in data and ML decisions (see e.g., [TS28105] § 6.2.2.5) |
| REQ-ML_VLD-01 | The MLT MnS-P should have a capability to validate the ML entities during the ML training process and report the performance of the ML entities on both the training data and validation data to the authorized consumer. | ML entity validation performance reporting (see e.g., [TS28105] § 6.2.1.2.7) |
| REQ-ML_VLD-02 | The MLT MnS-P should have a capability to report the ratio (in terms of quantity of data samples) of the training data and validation data used during the ML training and validation process. | ML entity validation performance reporting (see e.g., [TS28105] § 6.2.1.2.7) |

NOTE:
The performance measurements and KPIs are specific to each type (i.e., the inference type that the ML entity supports) of ML entity.

Performance Management for ML Training:

In the ML model training phase (including training and validation), the performance of ML entity needs to be evaluated. The performance is the degree to which the ML entities fulfils the objectives for which it was trained and can be evaluated for training data as training performance or for testing data as testing performance. The related performance indicators need to be collected and analyzed.

Performance Indicator Selection for ML Training and Testing:

The ML model training function may support training for single or different kinds of ML models and may support the capability to evaluate each kind of ML entity by one or more performance indicators.

The MnS-C may prefer to use some performance indicator(s) over others to evaluate one kind of ML entity. The performance indicators for training and testing may include the following aspects: ML training resource performance indicators: the performance indicators of the system that trains the ML entity (e.g., "training duration" and/or the like); and/or ML performance indicators: performance indicators of the ML entity itself (e.g., "accuracy", "precision", "F1 score", and/or any other metrics/performance indicators including any of those mentioned herein), which apply for both training and testing.

The MnS-P for ML training and testing provides the name(s) of supported performance indicator(s) for the MnS-C to query and select for ML entity performance evaluation. The MnS-C may also need to provide the performance requirements of the ML entity using the selected performance indicators.

The MnS-P for ML training and testing uses the selected performance indicators for evaluating ML training and testing, and reports with the corresponding performance score in the ML training report or ML testing report when the training or testing is completed.

ML entity performance indicators query and selection for ML training and testing:

The ML entity performance evaluation and management is needed during training and testing phase. The related performance indicators need to be collected and analyzed. metrics. Thus, depending on its use case, the AI/ML MnS-C may indicate the preferred behaviour and performance requirement that needs to be considered during training or testing of/from the ML entity by the ML MnS-P for MLT or testing. These performance requirements need not indicate the technical performance indicators used for MLT, testing or inference, such as "accuracy", "precision", "recall", "Mean Squared Error", and/or the like. The ML MnS-C for MLT or testing may not be capable enough to indicate the performance metrics to be used for training or testing.

Requirements for ML Training and Testing Performance Management:

TABLE 2

| Requirement label | Description | Related use case(s) |
|---|---|---|
| REQ-ML_TRAIN_PM-1 | The ML Training or Testing MnS-P of the 3GPP management system shall have a capability to allow an authorized consumer to get the capabilities about what kind of ML models the ML training function or ML testing function is able to train or test. | Performance indicator selection for ML training (see e.g., [TS28105] § 6.2.2.2.1) |
| REQ-ML_TRAIN_PM-2 | The ML Training or Testing MnS-P of the 3GPP management system shall have a capability to allow an authorized consumer to query what performance indicators are supported by the ML training function or ML testing function for each kind of ML entity. | Performance indicator selection for ML training (see e.g., [TS28105] § 6.2.2.2.1) |
| REQ-ML_TRAIN_PM-3 | The ML Training or Testing MnS-P of the 3GPP management system shall have a capability to allow an authorized consumer to select the performance indicators from those supported by the ML training function or ML testing function for reporting the training or testing performance for each kind of ML entity. | Performance indicator selection for ML training (see e.g., [TS28105] § 6.2.2.2.1) |
| REQ-ML_TRAIN_PM-4 | The ML Training MnS-P of the 3GPP management system shall have a capability to allow an authorized consumer to provide the performance requirements for the ML model training using the selected the performance indicators from those supported by the ML training function. | Performance indicator selection for ML training (see e.g., [TS28105] § 6.2.2.2.1) |

The MnS-P of MLT or ML testing should determine which indicators are needed, for example, select some indicators based on the use case and use these indicators for performance evaluation.

The ML MnS-C or testing may have different requests on AI/ML performance, depending on its use case and requirements, which may imply that different performance indicators may be relevant for performance evaluation. The MnS-P for MLT/testing can be queried to provide the information on supported performance indicators referring to ML entity training/testing phase. Such performance indicators in training phase may be for example accuracy/precision/recall/F1-score/MSE/MAE/confusion matrix, and in test phase may be data drift in data statistics. Based on supported performance indicators in different phase as well as based on consumer's requirements, the MnS-C for MLT or ML testing may request a sub-set of supported performance indicators to be monitored and used for performance evaluation. Management capabilities are needed to enable the MnS-C for MLT or ML testing to query the supported performance indicators and select a sub-set of performance indicators in training phase to be used for performance evaluation.

MnS consumer policy-based selection of ML entity performance indicators for ML training and testing:

ML entity performance evaluation and management is needed during MLT phase. The related performance indicators need to be collected and analysed. The MnS-P for MLT should determine which indicators are needed or may be reported, i.e., select some indicators based on the service and use these indicators for performance evaluation.

The MnS-C for MLT or testing may have differentiated levels of interest in the different performance dimensions or Ml Testing:

During ML entity training phase, after the training and validation, the ML entity needs to be tested to evaluate the performance of the ML entity when it conducts inference using the testing data. Testing may involve interaction with third parties (e.g., besides the developer of the MLTF), e.g., the operators may use the MLTF or third-party systems/functions that may rely on the inference results computed by the ML entity for testing.

If the testing performance is not acceptable or does not meet the pre-defined requirements, the consumer may request the MLT producer to re-train the ML model with specific training data and/or performance requirements.

Consumer-Requested ML Entity Testing:

After receiving an MLT report about a trained ML entity from the MLT MnS-P, the consumer may request the ML testing MnS-P to test the ML entity before applying it to the target inference function.

The ML testing is to conduct inference on the tested ML entity using the testing data as inference inputs and produce the inference output for each testing dataset example.

The ML testing MnS-P may be the same as or different from the MLT MnS-P.

After completing the ML testing, the ML testing MnS-P provides the testing report indicating the success or failure of the ML testing to the consumer. For a successful ML testing, the testing report contains the testing results, i.e., the inference output for each testing dataset example.

The ML testing MnS-P needs to have the capabilities to provide the services needed to enable the consumer to request testing and receive results on the testing of an ML entity.

Producer-Initiated ML Entity Testing:

The ML entity testing may also be initiated by the MnS-P, after the ML entity is trained and validated. A consumer (e.g., an operator) may still need to define the policies (e.g., allowed time window, maximum number of testing iterations, and/or the like) for the testing of a given ML entity. The consumer may pre-define performance requirements for the ML entity testing and allow the MnS-P to decide on whether re-training/validation need to be triggered. Re-training may be triggered by the testing MnS-P itself based on the performance requirements supplied by the MnS-C.

Joint Testing of Multiple ML Entities:

A group of ML entities may work in a coordinated manner for complex use cases. In such cases an ML entity is just one step of the inference processes of an AI/ML inference function, with the inference outputs of an ML entity as the inputs to the next ML entity.

The group of ML entities is generated by the MLT function. The group, including all contained ML entities, needs to be tested. After the ML testing of the group, the MnS-P provides the testing results to the consumer.

This use case is about the ML entities testing during the training phase and is irrelevant to the testing cases that the ML entities have been deployed.

Requirements for ML Testing:

needs to be able to control (e.g., cancel, suspend, resume) the loading process. For a completed ML entity loading, the ML entity instance loaded to each target inference function needs to be manageable individually, for instance, to be activated/deactivated individually or concurrently.

Control of Producer-Initiated ML Entity Loading:

To enable more autonomous AI/ML operations, the MnS-P is allowed to load the ML entity without the consumer's specific request.

In this case, the consumer needs to be able to set the policy for the ML loading, to make sure that ML entities loaded by the MnS-P meet the performance target. The policy could be, for example, the threshold of the testing performance of the ML entity, the threshold of the inference performance of the existing ML model, the time schedule allowed for ML entity loading, and/or the like.

ML models are typically trained and tested to meet specific requirements for inference, addressing a specific use case or task. The network conditions may change regularly, for example, the gNB providing coverage for a specific location is scheduled to accommodate different load levels and/or patterns of services at different times of the day, or on different days in a week. A dedicated ML entity may be loaded per the policy to adapt to a specific load/traffic pattern.

TABLE 3

| Requirement label | Description | Related use case(s) |
|---|---|---|
| REQ-ML_TEST-1 | The ML testing MnS-P shall have a capability to allow an authorized consumer to request the testing of a specific ML entity. | Consumer-requested ML entity testing (see e.g., [TS28105] § 6.2.3.2.1) |
| REQ-ML_TEST-2 | The ML testing MnS-P shall have a capability to trigger the testing of an ML entity and allow the MnS-C to set the policy for the testing. | Producer-initiated ML entity testing (see e.g., [TS28105] § 6.2.3.2.2) |
| REQ-ML_TEST-3 | The ML testing MnS-P shall have a capability to report the performance of the ML entity when it performs inference on the testing data. | Consumer-requested ML entity testing (see e.g., [TS28105] § 6.2.3.2.1), and producer-triggered ML entity testing (clause 6.2.3.2.2) |
| REQ-ML_TEST-4 | The ML testing MnS-P shall have a capability allowing an authorized consumer to request the testing of a group of ML entities. | Joint testing of multiple ML entities (see e.g., [TS28105] § 6.2.3.2.3) |

ML Entity Deployment Phase:

ML Entity Loading:

ML entity loading refers to the process of making an ML entity available for use in the inference function. After a trained ML entity meets the performance criteria per the ML entity testing and optionally ML emulation, the ML entity could be loaded into the target inference function(s) in the system. The way for loading the ML entity is not in scope of the present document.

Consumer Requested ML Entity Loading:

After a trained ML entity is tested and optionally emulated, if the performance of the ML entity meets the MnS-C's requirements, the MnS-C may request to load the ML entity to one or more target inference function(s) where the ML entity will be used for conducting inference. Once the ML entity loading request is accepted, the MnS-C (e.g., operator) needs to know the progress of the loading and ML Entity Registration:

After multiple iterations, there could be a large number of ML entities with different versions, deployment environments, performance levels, and functionalities. ML entity registration refers to the process of recording, tracking, controlling those trained ML entities enabling future retrieval, reproducibility, sharing and loading in the target inference functions across different environments. For example, the inference MnS-C could recall the most applicable version dealing with a sudden changed deployment environment of the target inference function by tracking the registration information.

The MLT MnS-P should register the ML entity along with its loading information, e.g., ML entity metadata and relevant information (e.g., description, version, version date, target inference function, deployment environment, and/or the like).

Requirements for ML Entity Loading:

TABLE 4

| Requirement label | Description | Related use case(s) |
|---|---|---|
| REQ- ML_LOAD-FUN-01 | The MnS-P for ML entity loading shall have a capability allowing an authorized consumer to request to trigger the ML entity loading. | Consumer requested ML entity loading (see e.g., [TS28105] § 6.4.1.2.1) |
| REQ- ML_LOAD-FUN-02 | The MnS-P for ML entity loading shall have a capability allowing an authorized consumer to provide a policy for the MnS-P to trigger the ML entity loading. | Producer-initiated ML entity loading (see e.g., [TS28105] § 6.4.1.2.2) |
| REQ- ML_LOAD-FUN-03 | The MnS-P for ML entity loading shall be able to inform an authorized consumer about the progress of ML entity loading. | Consumer requested ML entity loading (clause 6.4.1.2.1) and Producer-initiated ML entity loading (see e.g., [TS28105] § 6.4.1.2.2) |
| REQ- ML_LOAD-FUN-04 | The MnS-P for ML entity loading shall have a capability allowing an authorized consumer to control the process of ML entity loading. | Consumer requested ML entity loading (clause 6.4.1.2.1) and Producer-initiated ML entity loading (see e.g., [TS28105] § 6.4.1.2.2) |
| REQ- ML_REG-01 | The MLT MnS-P should have a capability to register an ML entity to record the relevant information that may be used for loading. | ML entity registration (see e.g., [TS28105] § 6.4.1.2.3) |
| REQ- ML_REG-02 | The MLT MnS-P should have a capability to allow an authorized consumer (e.g., an AI/ML inference function) to acquire the registration information of ML entities. | ML entity registration (see e.g., [TS28105] § 6.4.1.2.3) |

AI/ML Inference Phase:

AI/ML Inference Performance Management:

In the AI/ML inference phase, the performance of the AI/ML inference function and ML entity need to be evaluated against the MnS-C's provided performance expectations/targets, to identify and timely fix any problem. Actions to fix any problem would be e.g., to trigger the ML re-training, ML testing, or re-deployment.

AI/ML Inference Performance Evaluation:

In the AI/ML inference phase, the AI/ML inference function (including e.g., MDAF, NWDAF or RAN intelligence functions) uses one or more ML entities for inference to generate the AI/ML inference output. The performance of a running ML entity may degrade over time due to changes in network state, which will affect the related network performance and service. Thus, it is necessary to evaluate performance of the ML entity during the AI/ML inference process. If the inference output is executed, the network performance related to each AI/ML inference function also needs to be evaluated.

The consumer (e.g., a Network or Management function) may take some actions according to the AI/ML inference output provided by the AI/ML inference function. If the actions are taken accordingly, the network performance is expected to be optimized. Each AI/ML inference function has its specific focus and will impact the network performance from different perspectives.

The consumer may choose to not take any actions for various reasons, e.g., lacking confidence in the inference output, avoiding potential conflict with other actions or when no actions are needed or recommended at all according to the inference output.

For evaluating the performance of the AI/ML inference function and ML entity, the MnS-P responsible for ML inference performance management needs to be able to get the inference output generated by each AI/ML inference function. Then, the MnS-P can evaluate the performance based on the inference output and related network measurements (i.e., the actual output).

Depending on the performance evaluation results, some actions (e.g., deactivate the running entity, start retraining, change the running entity with a new one, etc) can be taken to avoid generating the inaccurate inference output.

To monitor the performance in the AI/ML inference phase, the MnS-P responsible for AI/ML inference performance management can perform evaluation periodically. The performance evaluation period may be determined based on the network change speed. Besides, a consumer (e.g., an operator) may wish to control and manage the performance evaluation capability. For example, the operator may configure the performance evaluation period of a specified ML entity.

AI/ML Performance Measurements Selection Based on MnS Consumer Policy:

Evaluation and management of the performance of an ML entity is needed during inference phase. The related performance measurements need to be collected and analysed. The MnS-P for inference should determine which measurements are needed or may be reported, i.e., select some measurements based on the service and use these measurements for performance evaluation.

The MnS-C for inference may have differentiated levels of interest in the different performance dimensions or metrics. Thus, depending on its use case, the MnS-C may indicate the preferred behaviour and performance requirement that needs to be considered during inference from the ML entity by the AI/ML inference MnS-P. The AI/ML inference MnS-C may not be capable enough to indicate the performance metrics. Instead, the AI/ML MnS-C may indicate the requirement using a policy or guidance that reflects the preferred performance characteristics of the ML entity. Based on the indicated policy/guidance, the AI/ML MnS-P may then deduce and apply the appropriate performance indicators for inference. Management capabilities are needed to enable the MnS-C to indicate the behavioural and performance policy/guidance that may be translated by the MnS-P into one or more technical performance measurements during inference.

Requirements for AI/ML Inference Performance Management:

TABLE 5

| Requirement label | Description | Related use case(s) |
|---|---|---|
| REQ-AI/ML_INF_PE-01 | The MnS-P responsible for AI/ML inference management shall have a capability enabling an authorized consumer to get the inference output provided by an AI/ML inference function (e.g., MDAF, NWDAF or RAN intelligence function). | AI/ML inference performance evaluation (see e.g., [TS28105] § 6.5.1.2.1) |
| REQ-AI/ML_INF_PE-02 | The MnS-P responsible for AI/ML inference management shall have a capability enabling an authorized consumer to get the performance evaluation of an AI/ML inference output as measured by a defined set of performance metrics | AI/ML inference performance evaluation (see e.g., [TS28105] § 6.5.1.2.1) |
| REQ-AI/ML_INF_PE-03 | The MnS-P responsible for AI/ML inference management shall have a capability enabling an authorized consumer to provide feedback about an AI/ML inference output expressing the degree to which the inference output meets the consumer's expectations. | AI/ML inference performance evaluation (see e.g., [TS28105] § 6.5.1.2.1) |
| REQ-AI/ML_INF_PE-04 | The MnS-P responsible for AI/ML inference management shall have a capability enabling an authorized consumer to be informed about the executed actions that were triggered based on the inference output provided by an AI/ML inference function (e.g., MDAF, NWDAF or RAN intelligence function). | AI/ML inference performance evaluation (see e.g., [TS28105] § 6.5.1.2.1) |
| REQ-AI/ML_INF_PE-05 | The MnS-P responsible for AI/ML inference management shall have a capability enabling an authorized consumer to obtain the performance data related to an ML entity or an AI/ML inference function (e.g., MDAF, NWDAF or RAN intelligence function). | AI/ML inference performance evaluation (see e.g., [TS28105] § 6.5.1.2.1) |
| REQ-AI/ML_PERF-SEL-1 | The MLT MnS-P shall have a capability allowing an authorized MnS-C to discover supported AI/ML performance measurements related to AI/ML inference and select some of the desired measurements based on the MnS-C's requirements. | AI/ML performance measurements selection based on MnS-C policy (see e.g., [TS28105] § 6.5.1.2.2) |
| REQ-AI/ML_PERF-POL-1 | The AI/ML MnS-P shall have a capability allowing the authorized MnS-C to indicate a performance policy related to AI/ML inference phase. | AI/ML performance measurements selection based on MnS-C policy (see e.g., [TS28105] § 6.5.1.2.2) |

AI/ML Update Control:

In many cases, network conditions change makes the capabilities of the ML entity/entities decay, or at least become inappropriate for the changed conditions. In such cases, the MnS-C should still be enabled to trigger updates, for example, when the consumer realizes that the insight or decisions generated by the function are no longer appropriate for the observed network states, when the consumer observes the inference performance of ML entity/entities is decreasing.

The MnS-C may request the AI/ML inference MnS-P to use an updated ML entity/entities for the inference with some specific performance requirements. This gives flexibility to the AI/ML inference MnS-P on how to address the requirements by for example getting ML entity/entities updated, which may be loading the already trained ML entity/entities or may lead to requesting to train/re-train the ML entity/entities by utilizing the MLT MnS.

Availability of New Capabilities or ML Entities:

Depending on their configurations, AI/ML inference functions may learn new characteristics during their utilization, for example, if they are configured to learn through reinforcement learning or if they are configured to download new versions of their constituent ML entities. In such cases, the authorized consumer of AI/ML may wish to be informed by the AI/ML Inference MnS-P (e.g., the operator, a management function, or a network function) about their new capabilities.

Triggering ML Entity Update:

When the inference capabilities of AI/ML inference functions degenerate, the typical action may be to trigger re-training of the constituent ML entities. It is possible, however, that the AI/ML inference MnS-P only offers inference capabilities and is not equipped with capabilities to update, train/re-train its constituent ML entities. Nevertheless, the authorized MnS-C may still need to request for improvements in the capabilities of the AI/ML inference function. In such cases, the authorized MnS-C may still wish to request for an improvement and may specify in its request e.g., a new version of the ML entities, i.e., to have the ML entities updated or re-trained. The corresponding internal actions taken by the AI/ML MnS inference producer may not be necessarily known by the consumer.

The AI/ML inference MnS-C needs to request the AI/ML inference MnS-P to update its capabilities or its constituent ML entities and the AI/ML MnS-P should respond accordingly. For example, the AI/ML inference MnS-P may download new software that supports the required updates, download from a remote server a file containing configurations and parameters to update one or more of its constituent ML entities, or it may trigger one or more remote or local AI/ML-related processes (including training/re-training, testing, and/or the like) needed to generate the required updates. Related notifications for update can be sent to the AI/ML inference MnS-C to indicate the information of the update process, e.g., the update is finished successfully, the maximum time taken to complete the update is reached but the performance does not achieve the requirements, and/or the like.

Besides, an AI/ML inference MnS-C may wish to manage the update process(es), for example, to define policies on how often the update may occur, suspend or restart the update or adjust the update conditions or characteristics, the requirements could include, e.g., the times when the update may be executed, the expected achievable performance for updating, the expected time taken to complete the update, and/or the like.

Requirements for AIML Update Control:

TABLE 6

| Requirement label | Description | Related use case(s) |
|---|---|---|
| REQ-AIML_UPDATE-1 | The AI/ML Inference MnS-P should have a capability to inform an authorized MnS-C of the availability of AI/ML capabilities or ML entities or versions thereof (e.g., as learned through a training process or as provided via a software update) and the readiness to update the AI/ML capabilities of the respective network function when triggered | Availability of new capabilities or ML entities (see e.g., [TS28105] § 6.5.2.2.1) |
| REQ-AIML_UPDATE-2 | The AI/ML Inference MnS-P should have a capability to inform an authorized MnS-C of the expected performance gain if/when the AI/ML capabilities or ML entities of the respective network function are updated with/to the specific set of newly available AI/ML capabilities | Availability of new capabilities or ML entities (see e.g., [TS28105] § 6.5.2.2.1) |
| REQ-AIML_UPDATE-3 | The AI/ML Inference MnS-P should have a capability to allow an authorized MnS-C to request the AI/ML MnS-P to update its ML entities using a specific version of newly available AI/ML capabilities or ML entities or using AI/ML capabilities or ML entities with requirements (e.g., the minimum achievable performance after updating, the maximum time taken to complete the update, etc).. | Triggering ML entity update (see e.g., [TS28105] § 6.5.2.2.2) |
| REQ-AIML_UPDATE-4 | The AI/ML Inference MnS-P should have a capability for the AI/ML MnS-P to inform an authorized MnS-C about of the process or outcomes related to any request for updating the AI/ML capabilities or ML entities | Triggering ML entity update (see e.g., [TS28105] § 6.5.2.2.2) |
| REQ-AIML_UPDATE-5 | The AI/ML Inference MnS-P should have a capability for the AI/ML MnS-P to inform an authorized MnS-C about of the achieved performance gain following the update of the AI/ML capabilities of a network function with/to the specific newly available ML entities or set of AI/ML capabilities | Triggering ML entity update (see e.g., [TS28105] § 6.5.2.2.2) |
| REQ-AIML_UPDATE-6 | The AI/ML Inference MnS-P should have a capability for an authorized MnS-C (e.g., an operator or the function/entity that generated the request for updating the AI/ML capabilities) to manage the request and subsequent process, e.g. to suspend, re-activate or cancel the request or process; or to adjust the characteristics of the capability update; or to define how often the update may occur, suspend, restart or cancel the request or to further adjust the requirements of the update. | Triggering ML entity update (see e.g., [TS28105] § 6.5.2.2.2) |

AI/ML Inference Capabilities Management:

A network or management function that applies AI/ML to accomplish specific tasks may be considered to have one or more ML entities, each having specific capabilities.

Different network functions, e.g., MDA Functions, may need to rely on existing AI/ML capabilities to accomplish the desired inference. However, the details of such ML-based solutions (i.e., which ML entities are applied and how) for accomplishing those inference functionalities is not obvious. The management services are required to identify the capabilities of the involved ML entities and to map those capabilities to the desired logic.

Identifying Capabilities of ML Entities:

Network functions, especially network automation functions, may need to rely on capabilities of ML entities that are not internal to those network functions to accomplish the desired automation (inference). For example, as stated in TS 28.104 [2], "An MDA Function may optionally be deployed as one or more AI/ML inference function(s) in which the relevant ML entities are used for inference per the corresponding MDA." Similarly, owing to the differences in the kinds and complexity of intents that need to be fulfilled, an intent fulfillment solution may need to employ the capabilities of existing AI/ML inference functions to fulfill the intents. In any such case, management services are required to identify the capabilities of those existing ML entities that are employed by AI/ML inference functions.

Figure 15:
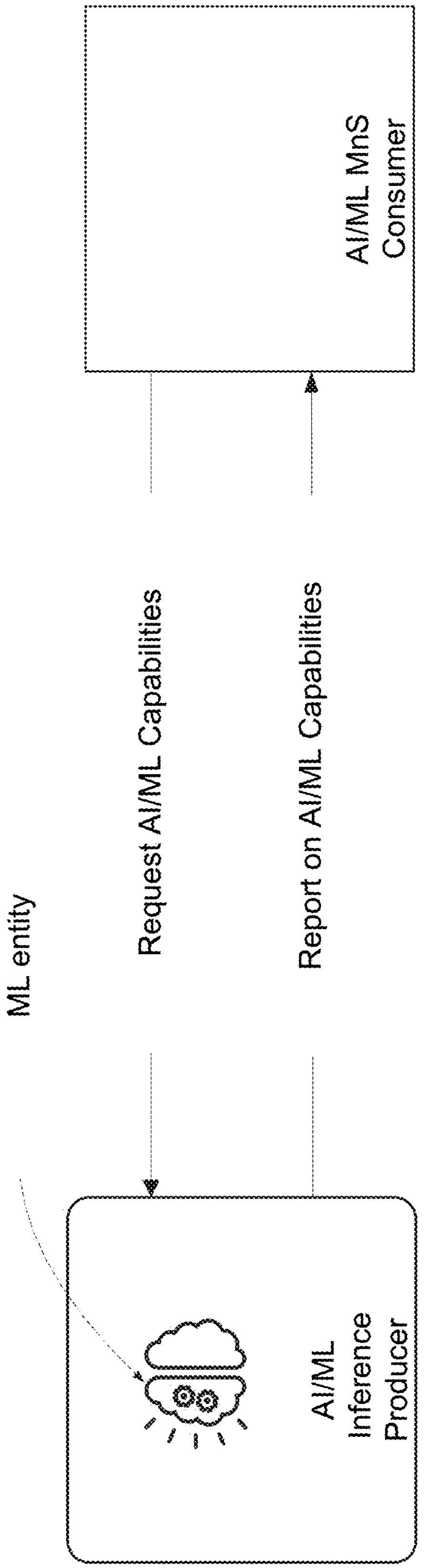
FIG. 15 illustrates a request and reporting on AI/ML inference capabilities, in accordance with one or more example embodiments of the present disclosure.

Referring to FIG. 15, there is shown a request and reporting on AI/ML inference capabilities:

FIG. 15 shows that the consumer may wish to obtain information about the available AI/ML inference capabilities to determine how to use them for the consumer's needs, e.g., for fulfillment of intent targets or other automation targets.

Mapping of the Capabilities of ML Entities:

Besides the discovery of the capabilities of ML entities, services are needed for mapping the ML entities and capabilities. In other words, instead of the consumer discovering specific capabilities, the consumer may want to know the ML entities that can be used to achieve a certain outcome. For this, the producer should be able to inform the consumer of the set of available ML entities that together achieve the consumer's automation needs.

In the case of intents for example, the complexity of the stated intents may significantly vary—from simple intents which may be fulfilled with a call to a single ML entity to complex intents that may require an intricate orchestration of multiple ML entities. For simple intents, it may be easy to map the execution logic to one or multiple ML entities. For complex intents, it may be required to employ multiple ML entities along with a corresponding functionality that manages their interrelated execution. The usage of the ML entities requires the awareness of their capabilities and interrelations.

Moreover, given the complexity of the required mapping to the multiple ML entities, services should be supported to provide the mapping of ML entities and capabilities.

Requirements for AI/ML Inference Capabilities Management:

TABLE 7

| Requirement label | Description | Related use case(s) |
|---|---|---|
| REQ-ML_CAP-01 | The AI/ML inference MnS-P shall have a capability allowing an authorized MnS-C to request the capabilities of existing ML entities available within the AI/ML inference producer. | Identifying capabilities of ML entities (see e.g., [TS28105] § 6.5.3.2.1) |
| REQ- ML_CAP-02 | The AI/ML inference MnS-P shall have a capability to report to an authorized MnS-C the capabilities of an ML entity as a decision described as a triplet <object(s), parameters, metrics> with the entries respectively indicating: the object or object types for which the ML entity can undertake optimization or control; the configuration parameters on the stated object or object types, which the ML entity optimizes or controls to achieve the desired outcomes; and the network metrics which the ML entity optimizes through its actions. | Identifying capabilities of ML entities (see e.g., [TS28105] § 6.5.3.2.1) |
| REQ-ML_CAP-03 | The AI/ML inference MnS-P shall have a capability to report to an authorized MnS-C the capabilities of an ML entity as an analysis described as a tuple <object(s), characteristics> with the entries respectively indicating: the object or object types for which the ML entity can undertake analysis; and the network characteristics (related to the stated object or object types) for which the ML entity produces analysis | Identifying capabilities of ML entities (see e.g., [TS28105] § 6.5.3.2.1) |
| REQ-ML_CAP-04 | The AI/ML inference MnS-P shall have a capability allowing an authorized MnS-C to request a mapping of the consumer's inference targets to the capabilities of one or more ML entities. | Mapping of the capabilities of ML entities (see e.g., [TS28105] § 6.5.3.2.2) |

AI/ML Inference Function Configuration Management:

Managing AI/ML-Based Distributed Network Energy Saving:

An AI/ML-based Distributed Network Energy Saving function may use one or more ML entities to derive energy saving recommendations. In some examples, this function may need to be managed.

Managing AI/ML-Based Distributed Mobility Optimization:

An AI/ML-based Distributed Mobility Optimization function may use one or more ML entities to derive handover recommendations. In some examples, this function may need to be managed.

Managing AI/ML-Based Distributed Load Balancing:

An AI/ML-based Distributed Load balancing function may use one or more ML entities to derive load balancing recommendations. In some examples, this function may need to be managed.

Requirements for AI/ML Inference Management:

TABLE 8

| Requirement label | Description | Related use case(s) |
|---|---|---|
| REQ- AI/ML_INF-01 | The MnS-P of AI/ML-based Distributed Network Energy Saving should enable an authorized MnS-C to request to manage the Energy saving inference function | Managing AI/ML-enabled for Distributed Network Energy Saving (see e.g., [TS28105] § 6.5.4.2.1) |
| REQ- AI/ML_INF-02 | The MnS-P of AI/ML-based Distributed Mobility Optimization should enable an authorized MnS-C to request to manage the Mobility Optimization inference function | Managing AI/ML-enabled for distributed Mobility Optimization (see e.g., [TS28105]§ 6.5.4.2.2) |
| REQ- AI/ML_INF-03 | The MnS-P of AI/ML-based Distributed Load balancing should enable an authorized MnS-C to request to manage the Load balancing inference function | Managing AI/ML-enabled for distributed Load balancing (see e.g., [TS28105] § 6.5.4.2.3) |

Executing AI/ML Inference:

AI/ML Inference History-Tracking Inferences and Context:

For different automation requirements in specific network domain management/automation functions (e.g., MDAS, SON) may apply ML functionality to make the appropriate inferences in different contexts. The context is the set of appropriate conditions under which the inference was made including network conditions, traffic characteristics, time of day, weather, and climate, and/or the like. And depending on the contexts, the different inferences may have different outcomes. The inference history, which is the history of such inferences and the contexts within which they are taken, may be of interest to different consumers. The AI/ML inference history includes recommendations and insights derived by the ML Entity and the contexts, e.g., network resources, time periods, traffic conditions, and/or the like under which those recommendations and insights were derived.

The inferences (need to be tracked for future reference, e.g., to evaluate the appropriateness/effectiveness of the decisions for those contexts or to evaluate degradations in the ML entity's decision-making capability. For this, the network not only needs to have the required inference capabilities but needs also to have the means to track and enable usage of the history of the inferences made by the ML entity. The MnS-P, i.e., a specific AI/ML inference function should also provide the capability for AI/ML inference history Control, the means to control the process of compiling and reporting on AI/ML inference history.

Figure 16:
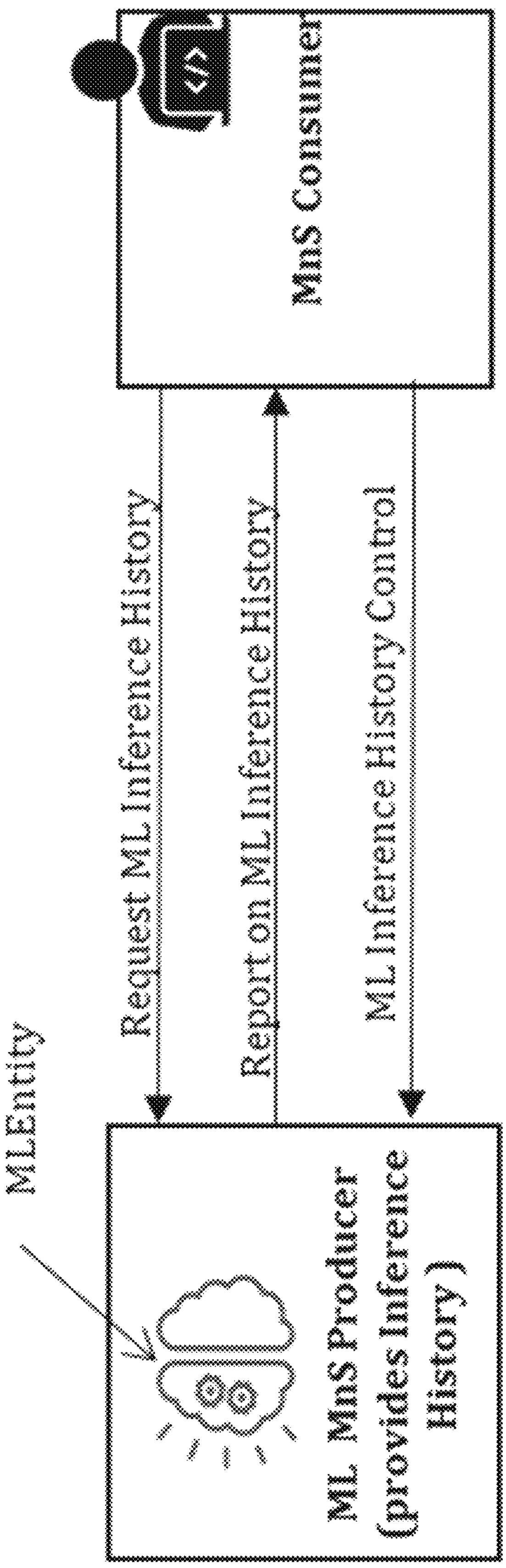
FIG. 16 illustrates an example of AI/ML inference history request and control reporting, in accordance with one or more example embodiments of the present disclosure.

Referring to FIG. 16, there is shown a sample use and control of AI/ML inference history request and reporting.

Requirements for Executing AI/ML Inference:

TABLE 9

| Requirement label | Description | Related use case(s) |
|---|---|---|
| REQ-AI/ML_INF-HIST-01 | The MnS-P for AI/ML inference management should have a capability allowing an authorized consumer to request the inference history of a specific ML entity. | AI/ML Inference History - tracking inferences and context (see e.g., [TS28105] § 6.5.5.2.1) |
| REQ-AI/ML-INF-HIST-02 | The MnS-P for AI/ML inference management should have a capability enabling an authorized consumer to define the reporting characteristics (e.g., reporting period) related to a specific instance of ML inference history or the reporting thereof. | AI/ML Inference History - tracking inferences and context (see e.g., [TS28105] § 6.5.5.2.1) |

Example AI/ML Models

Figure 17:
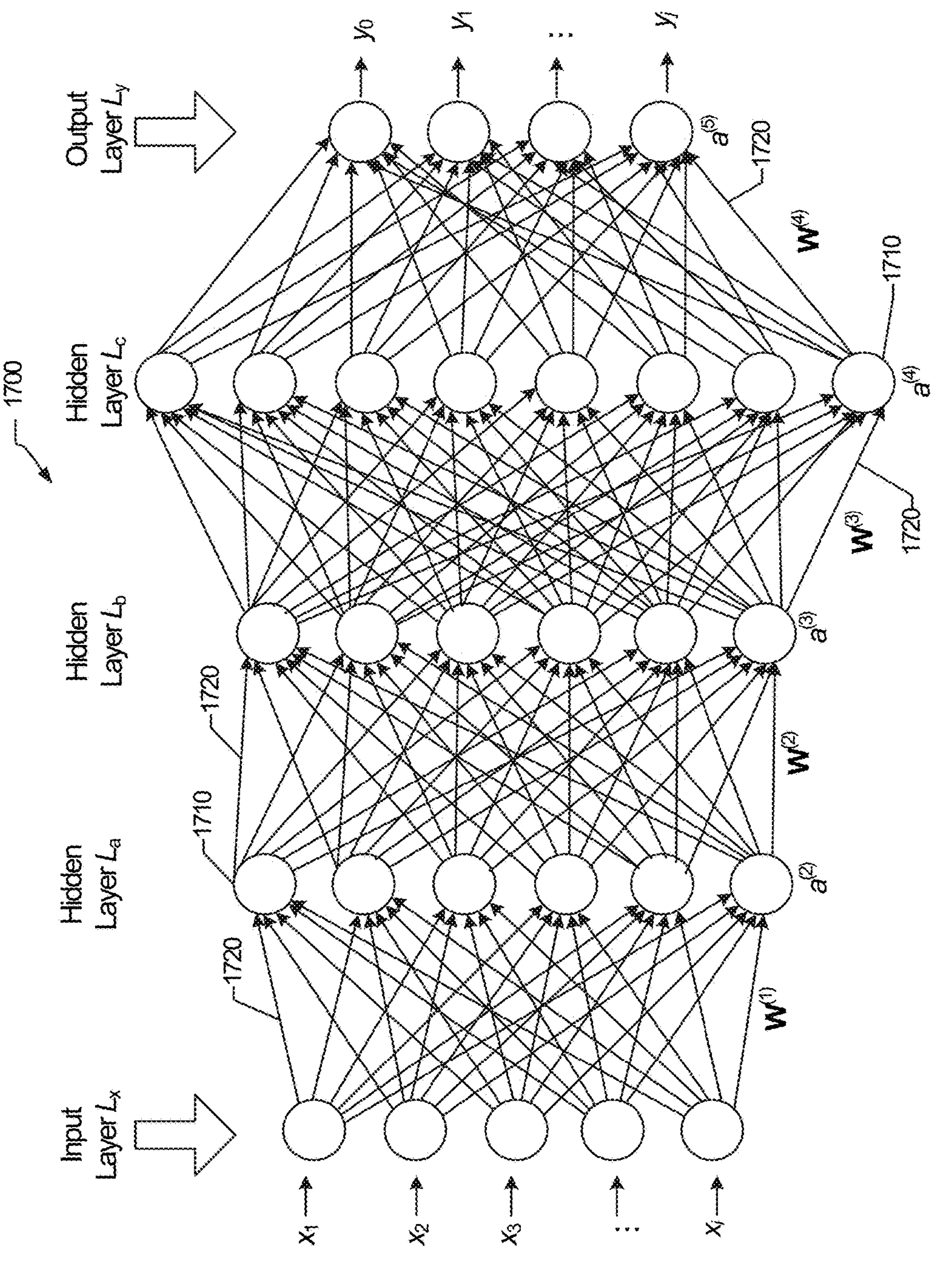
FIG. 17 illustrates an example NN, which may be suitable for use by one or more of the computing systems (or subsystems) discussed herein, in accordance with one or more example embodiments of the present disclosure.

FIG. 17 illustrates an example NN 1700, which may be suitable for use by one or more of the computing systems (or subsystems) of the various implementations discussed herein, implemented in part by a HW accelerator, and/or the like. The NN 1700 may be deep neural network (DNN) used as an artificial brain of a compute node or network of compute nodes to handle very large and complicated observation spaces. Additionally or alternatively, the NN 1700 can be some other type of topology (or combination of topologies), such as a convolution NN (CNN), deep CNN (DCN), recurrent NN (RNN), Long Short Term Memory (LSTM) network, a Deconvolutional NN (DNN), gated recurrent unit (GRU), deep belief NN, a feed forward NN (FFN), a deep FNN (DFF), deep stacking network, Markov chain, perception NN, Bayesian Network (BN) or Bayesian NN (BNN), Dynamic BN (DBN), Linear Dynamical System (LDS), Switching LDS (SLDS), Optical NNs (ONNs), an NN for reinforcement learning (RL) and/or deep RL (DRL), and/or the like. NNs are usually used for supervised learning, but can be used for unsupervised learning and/or RL.

The NN 1700 may encompass a variety of ML techniques where a collection of connected artificial neurons 1710 that (loosely) model neurons in a biological brain that transmit signals to other neurons/nodes 1710. The neurons 1710 may also be referred to as nodes 1710, processing elements (PEs) 1710, or the like. The connections 1720 (or edges 1720) between the nodes 1710 are (loosely) modeled on synapses of a biological brain and convey the signals between nodes 1710. Note that not all neurons 1710 and edges 1720 are labeled in FIG. 17 for the sake of clarity.

Each neuron 1710 has one or more inputs and produces an output, which can be sent to one or more other neurons 1710 (the inputs and outputs may be referred to as "signals"). Inputs to the neurons 1710 of the input layer L_x can be feature values of a sample of external data (e.g., input variables x_i). The input variables x_i can be set as a vector containing relevant data (e.g., observations, ML features, and the like). The inputs to hidden units 1710 of the hidden layers L_a, L_b, and L_c may be based on the outputs of other neurons 1710. The outputs of the final output neurons 1710 of the output layer L_y (e.g., output variables y_j) include predictions, inferences, and/or accomplish a desired/configured task. The output variables y_j may be in the form of determinations, inferences, predictions, and/or assessments. Additionally or alternatively, the output variables y_j can be set as a vector containing the relevant data (e.g., determinations, inferences, predictions, assessments, and/or the like).

In the context of ML, an "ML feature" (or simply "feature") is an individual measureable property or characteristic of a phenomenon being observed. Features are usually represented using numbers/numerals (e.g., integers), strings, variables, ordinals, real-values, categories, and/or the like. Additionally or alternatively, ML features are individual variables, which may be independent variables, based on observable phenomenon that can be quantified and recorded. ML models use one or more features to make predictions or inferences. In some implementations, new features can be derived from old features.

Neurons 1710 may have a threshold such that a signal is sent only if the aggregate signal crosses that threshold. A node 1710 may include an activation function, which defines the output of that node 1710 given an input or set of inputs. Additionally or alternatively, a node 1710 may include a propagation function that computes the input to a neuron 1710 from the outputs of its predecessor neurons 1710 and their connections 1720 as a weighted sum. A bias term can also be added to the result of the propagation function.

The NN 1700 also includes connections 1720, some of which provide the output of at least one neuron 1710 as an input to at least another neuron 1710. Each connection 1720 may be assigned a weight that represents its relative importance. The weights may also be adjusted as learning proceeds. The weight increases or decreases the strength of the signal at a connection 1720.

The neurons 1710 can be aggregated or grouped into one or more layers L where different layers L may perform different transformations on their inputs. In FIG. 17, the NN 1700 comprises an input layer $L_x$, one or more hidden layers $L_a$, $L_b$, and $L_c$, and an output layer Ly (where a, b, c, x, and y may be numbers), where each layer L comprises one or more neurons 1710. Signals travel from the first layer (e.g., the input layer L1), to the last layer (e.g., the output layer Ly), possibly after traversing the hidden layers $L_a$, $L_b$, and $L_c$ multiple times. In FIG. 17, the input layer $L_a$ receives data of input variables $x_i$(where i=1, . . . , p, where p is a number). Hidden layers $L_a$, $L_b$, and $L_c$ processes the inputs $x_i$, and eventually, output layer Ly provides output variables $y_j$ (where j=1, . . . , p', where p' is a number that is the same or different than p). In the example of FIG. 17, for simplicity of illustration, there are only three hidden layers $L_a$, $L_b$, and $L_c$ in the NN 1700, however, the NN 1700 may include many more (or fewer) hidden layers $L_a$, $L_b$, and $L_c$ than are shown.

Figure 18:
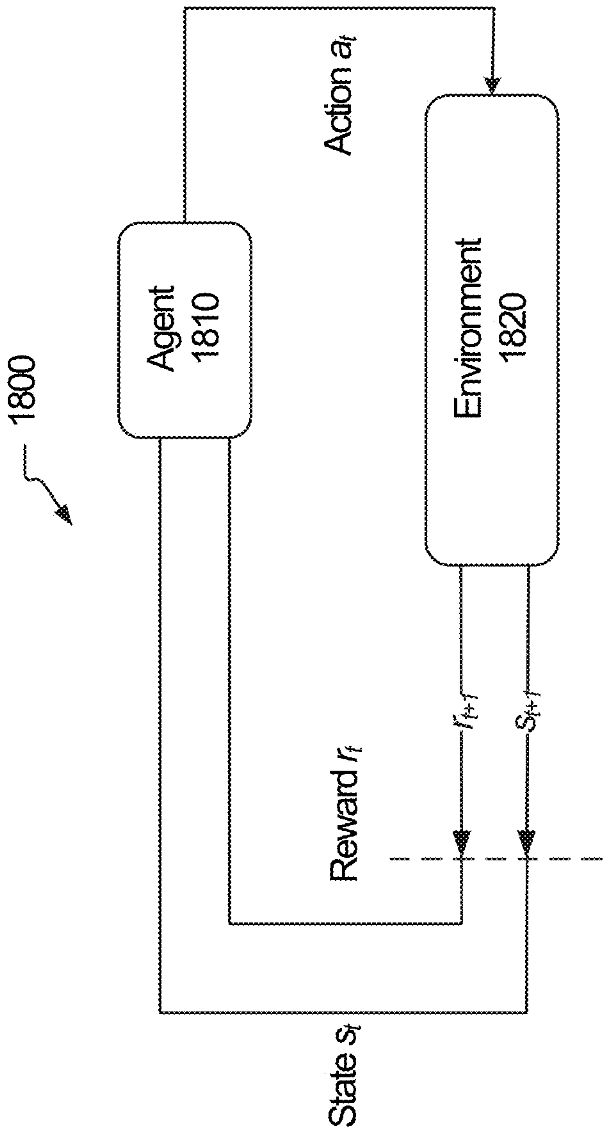
FIG. 18 shows an illustrative RL architecture, comprising an agent ar10 and an environment ar20, in accordance with one or more example embodiments of the present disclosure.

FIG. 18 shows an RL architecture 1800 comprising an agent 1810 and an environment 1820. The agent 1810 (e.g., software agent or AI agent) is the learner and decision maker, and the environment 1820 comprises everything outside the agent 1810 that the agent 1810 interacts with. The environment 1820 is typically stated in the form of a Markov decision process (MDP), which may be described using dynamic programming techniques. An MDP is a discrete-time stochastic control process that provides a mathematical framework for modeling decision making in situations where outcomes are partly random and partly under the control of a decision maker.

RL is a goal-oriented learning based on interaction with environment. RL is an ML paradigm concerned with how software agents (or AI agents) ought to take actions in an environment in order to maximize a numerical reward signal. In general, RL involves an agent taking actions in an environment that is/are interpreted into a reward and a representation of a state, which is then fed back into the agent. In RL, an agent aims to optimize a long-term objective by interacting with the environment based on a trial and error process. In many RL algorithms, the agent receives a reward in the next time step (or epoch) to evaluate its previous action. Examples of RL algorithms include Markov decision process (MDP) and Markov chains, associative RL, inverse RL, safe RL, Q-learning, multi-armed bandit learning, and deep RL.

The agent 1810 and environment 1820 continually interact with one another, wherein the agent 1810 selects actions A to be performed and the environment 1820 responds to these Actions and presents new situations (or states S) to the agent 1810. The action A comprises all possible actions, tasks, moves, and/or the like, that the agent 1810 can take for a particular context. The state S is a current situation such as a complete description of a system, a unique configuration of information in a program or machine, a snapshot of a measure of various conditions in a system, and/or the like. In some implementations, the agent 1810 selects an action A to take based on a policy π. The policy π is a strategy that the agent 1810 employs to determine next action A based on the current state S. The environment 1820 also gives rise to rewards R, which are numerical values that the agent 1810 seeks to maximize over time through its choice of actions.

The environment 1820 starts by sending a state St to the agent 1810. In some implementations, the environment 1820 also sends an initial a reward Rt to the agent 1810 with the state St. The agent 1810, based on its knowledge, takes an action At in response to that state St, (and reward Rt, if any). The action At is fed back to the environment 1820, and the environment 1820 sends a state-reward pair including a next state St+1 and reward Rt+1 to the agent 1810 based on the action At. The agent 1810 will update its knowledge with the reward Rt+1 returned by the environment 1820 to evaluate its previous action(s). The process repeats until the environment 1820 sends a terminal state S, which ends the process or episode. Additionally or alternatively, the agent 1810 may take a particular action A to optimize a value V. The value V an expected long-term return with discount, as opposed to the short-term reward R. Vπ(S) is defined as the expected long-term return of the current state S under policy T.

Q-learning is a model-free RL algorithm that learns the value of an action in a particular state. Q-learning does not require a model of an environment 1820, and can handle problems with stochastic transitions and rewards without requiring adaptations. The "Q" in Q-learning refers to the function that the algorithm computes, which is the expected reward(s) for an action A taken in a given state S. In Q-learning, a Q-value is computed using the state St and the action At time t using the function Qπ(St, At). Qπ(St, At) is the long-term return of a current state S taking action A under policy π. For any finite MDP (FMDP), Q-learning finds an optimal policy π in the sense of maximizing the expected value of the total reward over any and all successive steps, starting from the current state S. Additionally, examples of value-based deep RL include Deep Q-Network (DQN), Double DQN, and Dueling DQN. DQN is formed by substituting the Q-function of the Q-learning by an artificial neural network (ANN) such as a convolutional neural network (CNN).

Figure 19:
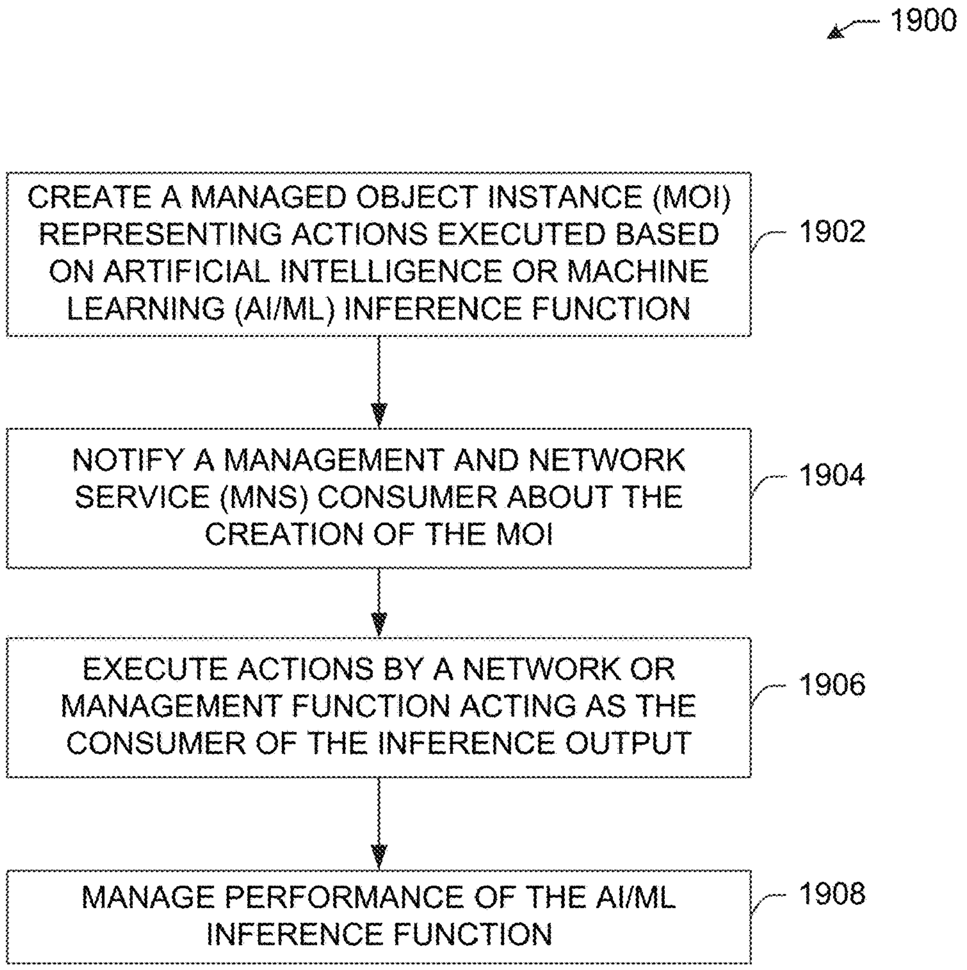
FIG. 19 illustrates a flow diagram of a process for an illustrative optimized resource technologies system, in accordance with one or more example embodiments of the present disclosure.

In some embodiments, the electronic device(s), network(s), system(s), chip(s) or component(s), or portions or implementations thereof or some other figure herein, may be configured to perform one or more processes, techniques, or methods as described herein, or portions thereof. One such process is depicted in FIG. 19.

For example, the process may include, at 1902, create a Managed Object Instance (MOI) representing actions executed based on artificial intelligence or machine learning (AI/ML) inference function.

The process further includes, at 1904, notify a management and network service (MnS) consumer about the creation of the MOI.

The process further includes, at 1906, execute actions by a network or management function acting as the consumer of the inference output.

The process further includes, at 1908, manage performance of the AI/ML inference function.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

It is understood that the above descriptions are for purposes of illustration and are not meant to be limiting.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

Additional examples of the presently described embodiments include the following, non-limiting implementations. Each of the following non-limiting examples may stand on its own or may be combined in any permutation or combination with any one or more of the other examples provided below or throughout the present disclosure.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below.

The following examples pertain to further embodiments.

Example 1 may include a device comprising processing circuitry coupled to storage, the processing circuitry configured to: create a Managed Object Instance (MOI) representing actions executed based on artificial intelligence or machine learning (AI/ML) inference function; notify a management and network service (MnS) consumer about the creation of the MOI; execute actions by a network or management function acting as the consumer of the inference output; and manage performance of the AI/ML inference function.

Example 2 may include the device of example 1 and/or some other example herein, wherein the AI/ML inference function may include an Analytics Logical Function (AnLF), management data analytics function (MDAF), AI/ML enabled Energy Saving function, AI/ML enabled MRO function, or AI/ML enabled MLB function.

Example 3 may include the device of example 2 and/or some other example herein, wherein the AI/ML inference function may be represented by an MOI.

Example 4 may include the device of example 3 and/or some other example herein, wherein the MOI representing the AnLF contains attributes indicating supported analytics ID(s).

Example 5 may include the device of example 1 and/or some other example herein, wherein the MOI representing the actions executed based on the AI/ML inference output contains at least one of the following attributes: identifier of the inference output, actions executed, or timestamp of action completion.

Example 6 may include the device of example 1 and/or some other example herein, wherein the MnS consumer may be configured to take actions based on the executed actions and resulting performance.

Example 7 may include the device of example 6 and/or some other example herein, wherein the actions taken by the MnS consumer include deactivating the AI/ML inference function.

Example 8 may include the device of example 6 and/or some other example herein, wherein the MnS consumer requests re-training of the ML model for the AI/ML inference function.

Example 9 may include the device of example 6 and/or some other example herein, wherein the MnS consumer uses a different ML model to support the AI/ML inference function.

Example 10 may include the device of example 1 and/or some other example herein, wherein an MnS producer and the MnS consumer are configured for performance management of the AI/ML inference function.

Example 11 may include a non-transitory computer-readable medium storing computer-executable instructions which when executed by one or more processors result in performing operations comprising: creating a Managed Object Instance (MOI) representing actions executed based on artificial intelligence or machine learning (AI/ML) inference function; notifying a management and network service (MnS) consumer about the creation of the MOI; executing actions by a network or management function acting as the consumer of the inference output; and managing performance of the AI/ML inference function.

Example 12 may include the non-transitory computer-readable medium of example 11 and/or some other example herein, wherein the AI/ML inference function may include an Analytics Logical Function (AnLF), management data analytics function (MDAF), AI/ML enabled Energy Saving function, AI/ML enabled MRO function, or AI/ML enabled MLB function.

Example 13 may include the non-transitory computer-readable medium of example 12 and/or some other example herein, wherein the AI/ML inference function may be represented by an MOI.

Example 14 may include the non-transitory computer-readable medium of example 13 and/or some other example herein, wherein the MOI representing the AnLF contains attributes indicating supported analytics ID(s).

Example 15 may include the non-transitory computer-readable medium of example 11 and/or some other example herein, wherein the MOI representing the actions executed based on the AI/ML inference output contains at least one of the following attributes: identifier of the inference output, actions executed, or timestamp of action completion.

Example 16 may include the non-transitory computer-readable medium of example 11 and/or some other example herein, wherein the MnS consumer may be configured to take actions based on the executed actions and resulting performance.

Example 17 may include the non-transitory computer-readable medium of example 16 and/or some other example herein, wherein the actions taken by the MnS consumer include deactivating the AI/ML inference function.

Example 18 may include the non-transitory computer-readable medium of example 16 and/or some other example herein, wherein the MnS consumer requests re-training of the ML model for the AI/ML inference function.

Example 19 may include the non-transitory computer-readable medium of example 16 and/or some other example herein, wherein the MnS consumer uses a different ML model to support the AI/ML inference function.

Example 20 may include the non-transitory computer-readable medium of example 11 and/or some other example herein, wherein an MnS producer and the MnS consumer are configured for performance management of the AI/ML inference function.

Example 21 may include a method comprising: creating a Managed Object Instance (MOI) representing actions executed based on artificial intelligence or machine learning (AI/ML) inference function; notifying a management and network service (MnS) consumer about the creation of the MOI; executing actions by a network or management function acting as the consumer of the inference output; and managing performance of the AI/ML inference function.

Example 22 may include the method of example 21 and/or some other example herein, wherein the AI/ML inference function may include an Analytics Logical Function (AnLF), management data analytics function (MDAF), AI/ML enabled Energy Saving function, AI/ML enabled MRO function, or AI/ML enabled MLB function.

Example 23 may include the method of example 22 and/or some other example herein, wherein the AI/ML inference function may be represented by an MOI.

Example 24 may include the method of example 23 and/or some other example herein, wherein the MOI representing the AnLF contains attributes indicating supported analytics ID(s).

Example 25 may include the method of example 21 and/or some other example herein, wherein the MOI representing the actions executed based on the AI/ML inference output contains at least one of the following attributes: identifier of the inference output, actions executed, or timestamp of action completion.

Example 26 may include the method of example 21 and/or some other example herein, wherein the MnS consumer may be configured to take actions based on the executed actions and resulting performance.

Example 27 may include the method of example 26 and/or some other example herein, wherein the actions taken by the MnS consumer include deactivating the AI/ML inference function.

Example 28 may include the method of example 26 and/or some other example herein, wherein the MnS consumer requests re-training of the ML model for the AI/ML inference function.

Example 29 may include the method of example 26 and/or some other example herein, wherein the MnS consumer uses a different ML model to support the AI/ML inference function.

Example 30 may include the method of example 21 and/or some other example herein, wherein an MnS producer and the MnS consumer are configured for performance management of the AI/ML inference function.

Example 31 may include an apparatus comprising means for: creating a Managed Object Instance (MOI) representing actions executed based on artificial intelligence or machine learning (AI/ML) inference function; notifying a management and network service (MnS) consumer about the creation of the MOI; executing actions by a network or management function acting as the consumer of the inference output; and managing performance of the AI/ML inference function.

Example 32 may include the apparatus of example 31 and/or some other example herein, wherein the AI/ML inference function may include an Analytics Logical Function (AnLF), management data analytics function (MDAF), AI/ML enabled Energy Saving function, AI/ML enabled MRO function, or AI/ML enabled MLB function.

Example 33 may include the apparatus of example 32 and/or some other example herein, wherein the AI/ML inference function may be represented by an MOI.

Example 34 may include the apparatus of example 33 and/or some other example herein, wherein the MOI representing the AnLF contains attributes indicating supported analytics ID(s).

Example 35 may include the apparatus of example 31 and/or some other example herein, wherein the MOI representing the actions executed based on the AI/ML inference output contains at least one of the following attributes: identifier of the inference output, actions executed, or timestamp of action completion.

Example 36 may include the apparatus of example 31 and/or some other example herein, wherein the MnS consumer may be configured to take actions based on the executed actions and resulting performance.

Example 37 may include the apparatus of example 36 and/or some other example herein, wherein the actions taken by the MnS consumer include deactivating the AI/ML inference function.

Example 38 may include the apparatus of example 36 and/or some other example herein, wherein the MnS consumer requests re-training of the ML model for the AI/ML inference function.

Example 39 may include the apparatus of example 36 and/or some other example herein, wherein the MnS consumer uses a different ML model to support the AI/ML inference function.

Example 40 may include the apparatus of example 31 and/or some other example herein, wherein an MnS producer and the MnS consumer are configured for performance management of the AI/ML inference function.

Example 41 may include an apparatus comprising means for performing any of the methods of examples 1-40.

Example 42 may include a network node comprising a communication interface and processing circuitry connected thereto and configured to perform the methods of examples 1-40.

Example 43 may include an apparatus comprising means to perform one or more elements of a method described in or related to any of examples 1-40, or any other method or process described herein.

Example 44 may include one or more non-transitory computer-readable media comprising instructions to cause an electronic device, upon execution of the instructions by one or more processors of the electronic device, to perform one or more elements of a method described in or related to any of examples 1-40, or any other method or process described herein.

Example 45 may include an apparatus comprising logic, modules, or circuitry to perform one or more elements of a method described in or related to any of examples 1-40, or any other method or process described herein.

Example 46 may include a method, technique, or process as described in or related to any of examples 1-40, or portions or parts thereof.

Example 47 may include an apparatus comprising: one or more processors and one or more computer-readable media comprising instructions that, when executed by the one or more processors, cause the one or more processors to perform the method, techniques, or process as described in or related to any of examples 1-40, or portions thereof.

Example 48 may include a signal as described in or related to any of examples 1-40, or portions or parts thereof.

Example 49 may include a datagram, packet, frame, segment, protocol data unit (PDU), or message as described in or related to any of examples 1-40, or portions or parts thereof, or otherwise described in the present disclosure.

Example 50 may include a signal encoded with data as described in or related to any of examples 1-40, or portions or parts thereof, or otherwise described in the present disclosure.

Example 51 may include a signal encoded with a datagram, packet, frame, segment, protocol data unit (PDU), or message as described in or related to any of examples 1-40, or portions or parts thereof, or otherwise described in the present disclosure.

Example 52 may include an electromagnetic signal carrying computer-readable instructions, wherein execution of the computer-readable instructions by one or more processors is to cause the one or more processors to perform the method, techniques, or process as described in or related to any of examples 1-40, or portions thereof.

Example 53 may include a computer program comprising instructions, wherein execution of the program by a processing element is to cause the processing element to carry out the method, techniques, or process as described in or related to any of examples 1-40, or portions thereof.

Example 54 may include a signal in a wireless network as shown and described herein.

Example 55 may include a method of communicating in a wireless network as shown and described herein.

Example 56 may include a system for providing wireless communication as shown and described herein.

Example 57 may include a device for providing wireless communication as shown and described herein.

An example implementation is an edge computing system, including respective edge processing devices and nodes to invoke or perform the operations of the examples above, or other subject matter described herein. Another example implementation is a client endpoint node, operable to invoke or perform the operations of the examples above, or other subject matter described herein. Another example implementation is an aggregation node, network hub node, gateway node, or core data processing node, within or coupled to an edge computing system, operable to invoke or perform the operations of the examples above, or other subject matter described herein. Another example implementation is an access point, base station, road-side unit, street-side unit, or on-premise unit, within or coupled to an edge computing system, operable to invoke or perform the operations of the examples above, or other subject matter described herein. Another example implementation is an edge provisioning node, service orchestration node, application orchestration node, or multi-tenant management node, within or coupled to an edge computing system, operable to invoke or perform the operations of the examples above, or other subject matter described herein. Another example implementation is an edge node operating an edge provisioning service, application or service orchestration service, virtual machine deployment, container deployment, function deployment, and compute management, within or coupled to an edge computing system, operable to invoke or perform the operations of the examples above, or other subject matter described herein. Another example implementation is an edge computing system operable as an edge mesh, as an edge mesh with side car loading, or with mesh-to-mesh communications, operable to invoke or perform the operations of the examples above, or other subject matter described herein. Another example implementation is an edge computing system including aspects of network functions, acceleration functions, acceleration hardware, storage hardware, or computation hardware resources, operable to invoke or perform the use cases discussed herein, with use of the examples above, or other subject matter described herein. Another example implementation is an edge computing system adapted for supporting client mobility, vehicle-to-vehicle (V2V), vehicle-to-everything (V2X), or vehicle-to-infrastructure (V2I) scenarios, and optionally operating according to ETSI MEC specifications, operable to invoke or perform the use cases discussed herein, with use of the examples above, or other subject matter described herein. Another example implementation is an edge computing system adapted for mobile wireless communications, including configurations according to an 3GPP 4G/LTE or 5G network capabilities, operable to invoke or perform the use cases discussed herein, with use of the examples above, or other subject matter described herein. Another example implementation is a computing system adapted for network communications, including configurations according to an O-RAN capabilities, operable to invoke or perform the use cases discussed herein, with use of the examples above, or other subject matter described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Terminology

The terminology used herein is for the purpose of describing particular embodiments only and is not intended to be limiting of the disclosure. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "In some embodiments," which may each refer to one or more of the same or different embodiments. Furthermore, the terms "comprising," "including," "having," and the like, as used with respect to embodiments of the present disclosure, are synonymous.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or ink, and/or the like.

The term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, and/or transferring digital data. Processing circuitry may include one or more processing cores to execute instructions and one or more memory structures to store program and data information. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. Processing circuitry may include more hardware accelerators, which may be microprocessors, programmable processing devices, or the like. The one or more hardware accelerators may include, for example, computer vision (CV) and/or deep learning (DL) accelerators. The terms "application circuitry" and/or "baseband circuitry" may be considered synonymous to, and may be referred to as, "processor circuitry."

The term "memory" and/or "memory circuitry" as used herein refers to one or more hardware devices for storing data, including RAM, MRAM, PRAM, DRAM, and/or SDRAM, core memory, ROM, magnetic disk storage mediums, optical storage mediums, flash memory devices or other machine readable mediums for storing data. The term "computer-readable medium" may include, but is not limited to, memory, portable or fixed storage devices, optical storage devices, and various other mediums capable of storing, containing or carrying instructions or data.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource. The term "element" refers to a unit that is indivisible at a given level of abstraction and has a clearly defined boundary, wherein an element may be any type of entity including, for example, one or more devices, systems, controllers, network elements, modules, etc., or combinations thereof. The term "device" refers to a physical entity embedded inside, or attached to, another physical entity in its vicinity, with capabilities to convey digital information from or to that physical entity. The term "entity" refers to a distinct component of an architecture or device, or information transferred as a payload. The term "controller" refers to an element or entity that has the capability to affect a physical entity, such as by changing its state or causing the physical entity to move.

The term "cloud computing" or "cloud" refers to a paradigm for enabling network access to a scalable and elastic pool of shareable computing resources with self-service provisioning and administration on-demand and without active management by users. Cloud computing provides cloud computing services (or cloud services), which are one or more capabilities offered via cloud computing that are invoked using a defined interface (e.g., an API or the like). The term "computing resource" or simply "resource" refers to any physical or virtual component, or usage of such components, of limited availability within a computer system or network. Examples of computing resources include usage/access to, for a period of time, servers, processor(s), storage equipment, memory devices, memory areas, networks, electrical power, input/output (peripheral) devices, mechanical devices, network connections (e.g., channels/links, ports, network sockets, etc.), operating systems, virtual machines (VMs), software/applications, computer files, and/or the like. A "hardware resource" may refer to compute, storage, and/or network resources provided by physical hardware element(s). A "virtualized resource" may refer to compute, storage, and/or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable. As used herein, the term "cloud service provider" (or CSP) indicates an organization which operates typically large-scale "cloud" resources comprised of centralized, regional, and edge data centers (e.g., as used in the context of the public cloud). In other examples, a CSP may also be referred to as a Cloud Service Operator (CSO). References to "cloud computing" generally refer to computing resources and services offered by a CSP or a CSO, at remote locations with at least some increased latency, distance, or constraints relative to edge computing.

As used herein, the term "data center" refers to a purpose-designed structure that is intended to house multiple high-performance compute and data storage nodes such that a large amount of compute, data storage and network resources are present at a single location. This often entails specialized rack and enclosure systems, suitable heating, cooling, ventilation, security, fire suppression, and power delivery systems. The term may also refer to a compute and data storage node in some contexts. A data center may vary in scale between a centralized or cloud data center (e.g., largest), regional data center, and edge data center (e.g., smallest).

As used herein, the term "edge computing" refers to the implementation, coordination, and use of computing and resources at locations closer to the "edge" or collection of "edges" of a network. Deploying computing resources at the network's edge may reduce application and network latency, reduce network backhaul traffic and associated energy consumption, improve service capabilities, improve compliance with security or data privacy requirements (especially as compared to conventional cloud computing), and improve total cost of ownership). As used herein, the term "edge compute node" refers to a real-world, logical, or virtualized implementation of a compute-capable element in the form of a device, gateway, bridge, system or subsystem, component, whether operating in a server, client, endpoint, or peer mode, and whether located at an "edge" of an network or at a connected location further within the network. References to a "node" used herein are generally interchangeable with a "device", "component", and "subsystem"; however, references to an "edge computing system" or "edge computing network" generally refer to a distributed architecture, organization, or collection of multiple nodes and devices, and which is organized to accomplish or offer some aspect of services or resources in an edge computing setting.

Additionally or alternatively, the term "Edge Computing" refers to a concept, as described in [6], that enables operator and 3rd party services to be hosted close to the UE's access point of attachment, to achieve an efficient service delivery through the reduced end-to-end latency and load on the transport network. As used herein, the term "Edge Computing Service Provider" refers to a mobile network operator or a 3rd party service provider offering Edge Computing service. As used herein, the term "Edge Data Network" refers to a local Data Network (DN) that supports the architecture for enabling edge applications. As used herein, the term "Edge Hosting Environment" refers to an environment providing support required for Edge Application Server's execution. As used herein, the term "Application Server" refers to application software resident in the cloud performing the server function.

The term "Internet of Things" or "IoT" refers to a system of interrelated computing devices, mechanical and digital machines capable of transferring data with little or no human interaction, and may involve technologies such as real-time analytics, machine learning and/or AI, embedded systems, wireless sensor networks, control systems, automation (e.g., smarthome, smart building and/or smart city technologies), and the like. IoT devices are usually low-power devices without heavy compute or storage capabilities. "Edge IoT devices" may be any kind of IoT devices deployed at a network's edge.

As used herein, the term "cluster" refers to a set or grouping of entities as part of an edge computing system (or systems), in the form of physical entities (e.g., different computing systems, networks or network groups), logical entities (e.g., applications, functions, security constructs, containers), and the like. In some locations, a "cluster" is also referred to as a "group" or a "domain". The membership of cluster may be modified or affected based on conditions or functions, including from dynamic or property-based membership, from network or system management scenarios, or from various example techniques discussed below which may add, modify, or remove an entity in a cluster. Clusters may also include or be associated with multiple layers, levels, or properties, including variations in security features and results based on such layers, levels, or properties.

The term "application" may refer to a complete and deployable package, environment to achieve a certain function in an operational environment. The term "AI/ML application" or the like may be an application that contains some AI/ML models and application-level descriptions. The term "machine learning" or "ML" refers to the use of computer systems implementing algorithms and/or statistical models to perform specific task(s) without using explicit instructions, but instead relying on patterns and inferences. ML algorithms build or estimate mathematical model(s) (referred to as "ML models" or the like) based on sample data (referred to as "training data," "model training information," or the like) in order to make predictions or decisions without being explicitly programmed to perform such tasks. Generally, an ML algorithm is a computer program that learns from experience with respect to some task and some performance measure, and an ML model may be any object or data structure created after an ML algorithm is trained with one or more training datasets. After training, an ML model may be used to make predictions on new datasets. Although the term "ML algorithm" refers to different concepts than the term "ML model," these terms as discussed herein may be used interchangeably for the purposes of the present disclosure.

The term "machine learning model," "ML model," or the like may also refer to ML methods and concepts used by an ML-assisted solution. An "ML-assisted solution" is a solution that addresses a specific use case using ML algorithms during operation. ML models include supervised learning (e.g., linear regression, k-nearest neighbor (KNN), decision tree algorithms, support machine vectors, Bayesian algorithm, ensemble algorithms, etc.) unsupervised learning (e.g., K-means clustering, principle component analysis (PCA), etc.), reinforcement learning (e.g., Q-learning, multi-armed bandit learning, deep RL, etc.), neural networks, and the like. Depending on the implementation a specific ML model could have many sub-models as components and the ML model may train all sub-models together. Separately trained ML models can also be chained together in an ML pipeline during inference. An "ML pipeline" is a set of functionalities, functions, or functional entities specific for an ML-assisted solution; an ML pipeline may include one or several data sources in a data pipeline, a model training pipeline, a model evaluation pipeline, and an actor. The "actor" is an entity that hosts an ML assisted solution using the output of the ML model inference). The term "ML training host" refers to an entity, such as a network function, that hosts the training of the model. The term "ML inference host" refers to an entity, such as a network function, that hosts model during inference mode (which includes both the model execution as well as any online learning if applicable). The ML-host informs the actor about the output of the ML algorithm, and the actor takes a decision for an action (an "action" is performed by an actor as a result of the output of an ML assisted solution). The term "model inference information" refers to information used as an input to the ML model for determining inference(s); the data used to train an ML model and the data used to determine inferences may overlap, however, "training data" and "inference data" refer to different concepts.

The terms "instantiate," "instantiation," and the like as used herein refers to the creation of an instance. An "instance" also refers to a concrete occurrence of an object, which may occur, for example, during execution of program code. The term "information element" refers to a structural element containing one or more fields. The term "field" refers to individual contents of an information element, or a data element that contains content. As used herein, a "database object", "data structure", or the like may refer to any representation of information that is in the form of an object, attribute-value pair (AVP), key-value pair (KVP), tuple, etc., and may include variables, data structures, functions, methods, classes, database records, database fields, database entities, associations between data and/or database entities (also referred to as a "relation"), blocks and links between blocks in block chain implementations, and/or the like.

An "information object," as used herein, refers to a collection of structured data and/or any representation of information, and may include, for example electronic documents (or "documents"), database objects, data structures, files, audio data, video data, raw data, archive files, application packages, and/or any other like representation of information. The terms "electronic document" or "document," may refer to a data structure, computer file, or resource used to record data, and includes various file types and/or data formats such as word processing documents, spreadsheets, slide presentations, multimedia items, webpage and/or source code documents, and/or the like. As examples, the information objects may include markup and/or source code documents such as HTML, XML, JSON, Apex®, CSS, JSP, MessagePack™, Apache® Thrift™, ASN.1, Google® Protocol Buffers (protobuf), or some other document(s)/format(s) such as those discussed herein. An information object may have both a logical and a physical structure. Physically, an information object comprises one or more units called entities. An entity is a unit of storage that contains content and is identified by a name. An entity may refer to other entities to cause their inclusion in the information object. An information object begins in a document entity, which is also referred to as a root element (or "root"). Logically, an information object comprises one or more declarations, elements, comments, character references, and processing instructions, all of which are indicated in the information object (e.g., using markup).

The term "data item" as used herein refers to an atomic state of a particular object with at least one specific property at a certain point in time. Such an object is usually identified by an object name or object identifier, and properties of such an object are usually defined as database objects (e.g., fields, records, etc.), object instances, or data elements (e.g., markup language elements/tags, etc.). Additionally or alternatively, the term "data item" as used herein may refer to data elements and/or content items, although these terms may refer to difference concepts. The term "data element" or "element" as used herein refers to a unit that is indivisible at a given level of abstraction and has a clearly defined boundary. A data element is a logical component of an information object (e.g., electronic document) that may begin with a start tag (e.g., "<element>") and end with a matching end tag (e.g., "</element>"), or only has an empty element tag (e.g., "<element/>"). Any characters between the start tag and end tag, if any, are the element's content (referred to herein as "content items" or the like).

The content of an entity may include one or more content items, each of which has an associated datatype representation. A content item may include, for example, attribute values, character values, URIs, qualified names (qnames), parameters, and the like. A qname is a fully qualified name of an element, attribute, or identifier in an information object. A qname associates a URI of a namespace with a local name of an element, attribute, or identifier in that namespace. To make this association, the qname assigns a prefix to the local name that corresponds to its namespace. The qname comprises a URI of the namespace, the prefix, and the local name. Namespaces are used to provide uniquely named elements and attributes in information objects. Content items may include text content (e.g., "<element>content item</element>"), attributes (e.g., "<element attribute=" attribute Value ">"), and other elements referred to as "child elements" (e.g., "<element1><element2>content item</element2></element1>"). An "attribute" may refer to a markup construct including a name-value pair that exists within a start tag or empty element tag. Attributes contain data related to its element and/or control the element's behavior.

The term "resource" as used herein refers to a physical or virtual device, a physical or virtual component within a computing environment, and/or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, and/or the like. A "hardware resource" may refer to compute, storage, and/or network resources provided by physical hardware element(s). A "virtualized resource" may refer to compute, storage, and/or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable. The term "channel" as used herein refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used herein refers to a connection between two devices through a RAT for the purpose of transmitting and receiving information. As used herein, the term "radio technology" refers to technology for wireless transmission and/or reception of electromagnetic radiation for information transfer. The term "radio access technology" or "RAT" refers to the technology used for the underlying physical connection to a radio based communication network. As used herein, the term "communication protocol" (either wired or wireless) refers to a set of standardized rules or instructions implemented by a communication device and/or system to communicate with other devices and/or systems, including instructions for packetizing/depacketizing data, modulating/demodulating signals, implementation of protocols stacks, and/or the like.

As used herein, the term "radio technology" refers to technology for wireless transmission and/or reception of electromagnetic radiation for information transfer. The term "radio access technology" or "RAT" refers to the technology used for the underlying physical connection to a radio based communication network. As used herein, the term "communication protocol" (either wired or wireless) refers to a set of standardized rules or instructions implemented by a communication device and/or system to communicate with other devices and/or systems, including instructions for packetizing/depacketizing data, modulating/demodulating signals, implementation of protocols stacks, and/or the like. Examples of wireless communications protocols may be used in various embodiments include a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology including, for example, 3GPP Fifth Generation (5G) or New Radio (NR), Universal Mobile Telecommunications System (UMTS), Freedom of Multimedia Access (FOMA), Long Term Evolution (LTE), LTE-Advanced (LTE Advanced), LTE Extra, LTE-A Pro, cdmaOne (2G), Code Division Multiple Access 2000 (CDMA 2000), Cellular Digital Packet Data (CDPD), Mobitex, Circuit Switched Data (CSD), High-Speed CSD (HSCSD), Universal Mobile Telecommunications System (UMTS), Wideband Code Division Multiple Access (W-CDM), High Speed Packet Access (HSPA), HSPA Plus (HSPA+), Time Division-Code Division Multiple Access (TD-CDMA), Time Division-Synchronous Code Division Multiple Access (TD-SCDMA), LTE LAA, MuLTEfire, UMTS Terrestrial Radio Access (UTRA), Evolved UTRA (E-UTRA), Evolution-Data Optimized or Evolution-Data Only (EV-DO), Advanced Mobile Phone System (AMPS), Digital AMPS (D-AMPS), Total Access Communication System/Extended Total Access Communication System (TACS/ETACS), Push-to-talk (PTT), Mobile Telephone System (MTS), Improved Mobile Telephone System (IMTS), Advanced Mobile Telephone System (AMTS), Cellular Digital Packet Data (CDPD), DataTAC, Integrated Digital Enhanced Network (iDEN), Personal Digital Cellular (PDC), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Bluetooth®, Bluetooth Low Energy (BLE), IEEE 802.15.4 based protocols (e.g., IPv6 over Low power Wireless Personal Arca Networks (6LoWPAN), WirelessHART, MiWi, Thread, 802.11a, etc.) WiFi-direct, ANT/ANT+, ZigBee, Z-Wave, 3GPP device-to-device (D2D) or Proximity Services (ProSc), Universal Plug and Play (UPnP), Low-Power Wide-Arca-Network (LPWAN), Long Range Wide Area Network (LoRA) or LoRaWAN™ developed by Semtech and the LoRa Alliance, Sigfox, Wireless Gigabit Alliance (WiGig) standard, Worldwide Interoperability for Microwave Access (WiMAX), mmWave standards in general (e.g., wireless systems operating at 10-300 GHz and above such as WiGig, IEEE 802.11ad, IEEE 802.11ay, etc.), V2X communication technologies (including 3GPP C-V2X), Dedicated Short Range Communications (DSRC) communication systems such as Intelligent-Transport-Systems (ITS) including the European ITS-G5, ITS-G5B, ITS-G5C, etc. In addition to the standards listed above, any number of satellite uplink technologies may be used for purposes of the present disclosure including, for example, radios compliant with standards issued by the International Telecommunication Union (ITU), or the European Telecommunications Standards Institute (ETSI), among others. The examples provided herein are thus understood as being applicable to various other communication technologies, both existing and not yet formulated.

The term "access network" refers to any network, using any combination of radio technologies, RATs, and/or communication protocols, used to connect user devices and service providers. In the context of WLANs, an "access network" is an IEEE 802 local area network (LAN) or metropolitan area network (MAN) between terminals and access routers connecting to provider services. The term "access router" refers to router that terminates a medium access control (MAC) service from terminals and forwards user traffic to information servers according to Internet Protocol (IP) addresses.

The term "SMTC" refers to an SSB-based measurement timing configuration configured by SSB-MeasurementTimingConfiguration. The term "SSB" refers to a synchronization signal/Physical Broadcast Channel (SS/PBCH) block, which includes a Primary Syncrhonization Signal (PSS), a Secondary Syncrhonization Signal (SSS), and a PBCH. The term "a "Primary Cell" refers to the MCG cell, operating on the primary frequency, in which the UE either performs the initial connection establishment procedure or initiates the connection re-establishment procedure. The term "Primary SCG Cell" refers to the SCG cell in which the UE performs random access when performing the Reconfiguration with Sync procedure for DC operation. The term "Secondary Cell" refers to a cell providing additional radio resources on top of a Special Cell for a UE configured with CA. The term "Secondary Cell Group" refers to the subset of serving cells comprising the PSCell and zero or more secondary cells for a UE configured with DC. The term "Serving Cell" refers to the primary cell for a UE in RRC_CONNECTED not configured with CA/DC there is only one serving cell comprising of the primary cell. The term "serving cell" or "serving cells" refers to the set of cells comprising the Special Cell(s) and all secondary cells for a UE in RRC_CONNECTED configured with CA. The term "Special Cell" refers to the PCell of the MCG or the PSCell of the SCG for DC operation; otherwise, the term "Special Cell" refers to the Pcell.

The term "A1 policy" refers to a type of declarative policies expressed using formal statements that enable the non-RT RIC function in the SMO to guide the near-RT RIC function, and hence the RAN, towards better fulfilment of the RAN intent.

The term "A1 Enrichment information" refers to information utilized by near-RT RIC that is collected or derived at SMO/non-RT RIC either from non-network data sources or from network functions themselves.

The term "A1-Policy Based Traffic Steering Process Mode" refers to an operational mode in which the Near-RT RIC is configured through A1 Policy to use Traffic Steering Actions to ensure a more specific notion of network performance (for example, applying to smaller groups of E2 Nodes and UEs in the RAN) than that which it ensures in the Background Traffic Steering.

The term "Background Traffic Steering Processing Mode" refers to an operational mode in which the Near-RT RIC is configured through O1 to use Traffic Steering Actions to ensure a general background network performance which applies broadly across E2 Nodes and UEs in the RAN.

The term "Baseline RAN Behavior" refers to the default RAN behavior as configured at the E2 Nodes by SMO The term "E2" refers to an interface connecting the Near-RT RIC and one or more O-CU-CPs, one or more O-CU-UPs, one or more O-DUs, and one or more O-eNBs.

The term "E2 Node" refers to a logical node terminating E2 interface. In this version of the specification, ORAN nodes terminating E2 interface are: for NR access: O-CU-CP, O-CU-UP, O-DU or any combination; and for E-UTRA access: O-eNB.

The term "Intents", in the context of O-RAN systems/implementations, refers to declarative policy to steer or guide the behavior of RAN functions, allowing the RAN function to calculate the optimal result to achieve stated objective.

The term "O-RAN non-real-time RAN Intelligent Controller" or "non-RT RIC" refers to a logical function that enables non-real-time control and optimization of RAN elements and resources, AI/ML workflow including model training and updates, and policy-based guidance of applications/features in Near-RT RIC.

The term "Near-RT RIC" or "O-RAN near-real-time RAN Intelligent Controller" refers to a logical function that enables near-real-time control and optimization of RAN elements and resources via fine-grained (e.g., UE basis, Cell basis) data collection and actions over E2 interface.

The term "O-RAN Central Unit" or "O-CU" refers to a logical node hosting RRC, SDAP and PDCP protocols.

The term "O-RAN Central Unit-Control Plane" or "O-CU-CP" refers to a logical node hosting the RRC and the control plane part of the PDCP protocol.

The term "O-RAN Central Unit-User Plane" or "O-CU-UP" refers to a logical node hosting the user plane part of the PDCP protocol and the SDAP protocol The term "O-RAN Distributed Unit" or "O-DU" refers to a logical node hosting RLC/MAC/High-PHY layers based on a lower layer functional split.

The term "O-RAN eNB" or "O-eNB" refers to an eNB or ng-eNB that supports E2 interface.

The term "O-RAN Radio Unit" or "O-RU" refers to a logical node hosting Low-PHY layer and RF processing based on a lower layer functional split. This is similar to 3GPP's "TRP" or "RRH" but more specific in including the Low-PHY layer (FFT/iFFT, PRACH extraction).

The term "O1" refers to an interface between orchestration & management entities (Orchestration/NMS) and O-RAN managed elements, for operation and management, by which FCAPS management, Software management, File management and other similar functions shall be achieved.

The term "RAN UE Group" refers to an aggregations of UEs whose grouping is set in the E2 nodes through E2 procedures also based on the scope of A1 policies. These groups can then be the target of E2 CONTROL or POLICY messages.

The term "Traffic Steering Action" refers to the use of a mechanism to alter RAN behavior. Such actions include E2 procedures such as CONTROL and POLICY.

The term "Traffic Steering Inner Loop" refers to the part of the Traffic Steering processing, triggered by the arrival of periodic TS related KPM (Key Performance Measurement) from E2 Node, which includes UE grouping, setting additional data collection from the RAN, as well as selection and execution of one or more optimization actions to enforce Traffic Steering policies.

The term "Traffic Steering Outer Loop" refers to the part of the Traffic Steering processing, triggered by the near-RT RIC setting up or updating Traffic Steering aware resource optimization procedure based on information from A1 Policy setup or update, A1 Enrichment Information (EI) and/or outcome of Near-RT RIC evaluation, which includes the initial configuration (preconditions) and injection of related A1 policies, Triggering conditions for TS changes.

The term "Traffic Steering Processing Mode" refers to an operational mode in which either the RAN or the Near-RT RIC is configured to ensure a particular network performance. This performance includes such aspects as cell load and throughput, and can apply differently to different E2 nodes and UEs. Throughout this process, Traffic Steering Actions are used to fulfill the requirements of this configuration.

The term "Traffic Steering Target" refers to the intended performance result that is desired from the network, which is configured to Near-RT RIC over O1.

Furthermore, any of the disclosed embodiments and example implementations can be embodied in the form of various types of hardware, software, firmware, middleware, or combinations thereof, including in the form of control logic, and using such hardware or software in a modular or integrated manner. Additionally, any of the software components or functions described herein can be implemented as software, program code, script, instructions, etc., operable to be executed by processor circuitry. These components, functions, programs, etc., can be developed using any suitable computer language such as, for example, Python, PyTorch, NumPy, Ruby, Ruby on Rails, Scala, Smalltalk, Java™, C++, C#, "C", Kotlin, Swift, Rust, Go (or "Golang"), EMCAScript, JavaScript, TypeScript, Jscript, ActionScript, Server-Side JavaScript (SSJS), PHP, Pearl, Lua, Torch/Lua with Just-In Time compiler (LuaJIT), Accelerated Mobile Pages Script (AMPscript), VBScript, JavaServer Pages (JSP), Active Server Pages (ASP), Node.js, ASP.NET, JAMscript, Hypertext Markup Language (HTML), extensible HTML (XHTML), Extensible Markup Language (XML), XML User Interface Language (XUL), Scalable Vector Graphics (SVG), RESTful API Modeling Language (RAML), wiki markup or Wikitext, Wireless Markup Language (WML), Java Script Object Notion (JSON), Apache® MessagePack™, Cascading Stylesheets (CSS), extensible stylesheet language (XSL), Mustache template language, Handlebars template language, Guide Template Language (GTL), Apache® Thrift, Abstract Syntax Notation One (ASN.1), Google® Protocol Buffers (protobuf), Bitcoin Script, EVM® bytecode, Solidity™, Vyper (Python derived), Bamboo, Lisp Like Language (LLL), Simplicity provided by Blockstream™, Rholang, Michelson, Counterfactual, Plasma, Plutus, Sophia, Salesforce® Apex®, and/or any other programming language or development tools including proprietary programming languages and/or development tools. The software code can be stored as a computer- or processor-executable instructions or commands on a physical non-transitory computer-readable medium. Examples of suitable media include RAM, ROM, magnetic media such as a hard-drive or a floppy disk, or an optical medium such as a compact disk (CD) or DVD (digital versatile disk), flash memory, and the like, or any combination of such storage or transmission devices.

Abbreviations

Unless used differently herein, terms, definitions, and abbreviations may be consistent with terms, definitions, and abbreviations defined in 3GPP TR 21.905 v16.0.0 (2019-06). For the purposes of the present document, the following abbreviations may apply to the examples and embodiments discussed herein.

TABLE 10

| Abbreviations: | |
|---|---|
| 3GPP | Third Generation Partnership Project |
| 4G | Fourth Generation |
| 5G | Fifth Generation |
| 5GC | 5G Core network |
| AC | Application Client |
| ACK | Acknowledgement |
| ACID | Application Client Identification |
| AF | Application Function |
| AM | Acknowledged Mode |
| AMBR | Aggregate Maximum Bit Rate |
| AMF | Access and Mobility Management Function |
| AN | Access Network |
| ANR | Automatic Neighbour Relation |
| AP | Application Protocol, Antenna Port, Access Point |
| API | Application Programming Interface |
| APN | Access Point Name |
| ARP | Allocation and Retention Priority |
| ARQ | Automatic Repeat Request |
| AS | Access Stratum |
| ASN.1 | Abstract Syntax Notation One |
| AUSF | Authentication Server Function |
| AWGN | Additive White Gaussian Noise |
| BAP | Backhaul Adaptation Protocol |
| BCH | Broadcast Channel |
| BER | Bit Error Ratio |
| BFD | Beam Failure Detection |
| BLER | Block Error Rate |
| BPSK | Binary Phase Shift Keying |
| BRAS | Broadband Remote Access Server |
| BSS | Business Support System |
| BS | Base Station |
| BSR | Buffer Status Report |
| BW | Bandwidth |
| BWP | Bandwidth Part |
| C-RNTI | Cell Radio Network Temporary Identity |
| CA | Carrier Aggregation, Certification Authority |
| CAPEX | CAPital EXpenditure |
| CBRA | Contention Based Random Access |
| CC | Component Carrier, Country Code, Cryptographic Checksum |
| CCA | Clear Channel Assessment |
| CCE | Control Channel Element |
| CCCH | Common Control Channel |
| CE | Coverage Enhancement |
| CDM | Content Delivery Network |
| CDMA | Code-Division Multiple Access |
| CFRA | Contention Free Random Access |
| CG | Cell Group |
| CGF | Charging Gateway Function |
| CHF | Charging Function |
| CI | Cell Identity |
| CID | Cell-ID (e g., positioning method) |
| CIM | Common Information Model |
| CIR | Carrier to Interference Ratio |
| CK | Cipher Key |
| CM | Connection Management, Conditional Mandatory |
| CMAS | Commercial Mobile Alert Service |
| CMD | Command |
| CMS | Cloud Management System |
| CO | Conditional Optional |
| CoMP | Coordinated Multi-Point |
| CORESET | Control Resource Set |
| COTS | Commercial Off-The-Shelf |
| CP | Control Plane, Cyclic Prefix, Connection Point |
| CPD | Connection Point Descriptor |
| CPE | Customer Premise Equipment |
| CPICH | Common Pilot Channel |
| CQI | Channel Quality Indicator |
| CPU | CSI processing unit, Central Processing Unit |
| C/R | Command/Response field bit |
| CRAN | Cloud Radio Access Network, Cloud RAN |
| CRB | Common Resource Block |
| CRC | Cyclic Redundancy Check |
| CRI | Channel-State Information Resource Indicator, CSI-RS Resource Indicator |
| C-RNTI | Cell RNTI |
| CS | Circuit Switched |
| CSAR | Cloud Service Archive |
| CSI | Channel-State Information |

TABLE 10-continued

| Abbreviations: | |
|---|---|
| CSI-IM | CSI Interference Measurement |
| CSI-RS | CSI Reference Signal |
| CSI-RSRP | CSI reference signal received power |
| CSI-RSRQ | CSI reference signal received quality |
| CSI-SINR | CSI signal-to-noise and interference ratio |
| CSMA | Carrier Sense Multiple Access |
| CSMA/CA | CSMA with collision avoidance |
| CSS | Common Search Space, Cell-specific Search Space |
| CTF | Charging Trigger Function |
| CTS | Clear-to-Send |
| CW | Codeword |
| CWS | Contention Window Size |
| D2D | Device-to-Device |
| DC | Dual Connectivity, Direct Current |
| DCI | Downlink Control Information |
| DF | Deployment Flavour |
| DL | Downlink |
| DMTF | Distributed Management Task Force |
| DPDK | Data Plane Development Kit |
| DM-RS, DMRS | Demodulation Reference Signal |
| DN | Data network |
| DNN | Data Network Name |
| DNAI | Data Network Access Identifier |
| DRB | Data Radio Bearer |
| DRS | Discovery Reference Signal |
| DRX | Discontinuous Reception |
| DSL | Domain Specific Language. Digital Subscriber Line |
| DSLAM | DSL Access Multiplexer |
| DwPTS | Downlink Pilot Time Slot |
| E-LAN | Ethernet Local Area Network |
| E2E | End-to-End |
| ECCA | extended clear channel assessment, extended CCA |
| ECCE | Enhanced Control Channel Element, Enhanced CCE |
| ED | Energy Detection |
| EDGE | Enhanced Datarates for GSM Evolution (GSM Evolution) |
| EAS | Edge Application Server |
| EASID | Edge Application Server Identification |
| ECS | Edge Configuration Server |
| ECSP | Edge Computing Service Provider |
| EDN | Edge Data Network |
| EEC | Edge Enabler Client |
| EECID | Edge Enabler Client Identification |
| EES | Edge Enabler Server |
| EESID | Edge Enabler Server Identification |
| EHE | Edge Hosting Environment |
| EGMF | Exposure Governance tableManagement Function |
| EGPRS | Enhanced GPRS |
| EIR | Equipment Identity Register |
| eLAA | enhanced Licensed Assisted Access, enhanced LAA |
| EM | Element Manager |
| eMBB | Enhanced Mobile Broadband |
| EMS | Element Management System |
| eNB | evolved NodeB, E-UTRAN Node B |
| EN-DC | E-UTRA-NR Dual Connectivity |
| EPC | Evolved Packet Core |
| EPDCCH | enhanced PDCCH, enhanced Physical Downlink Control Cannel |
| EPRE | Energy per resource element |
| EPS | Evolved Packet System |
| EREG | enhanced REG, enhanced resource element groups |
| ETSI | European Telecommunications Standards Institute |
| ETWS | Earthquake and Tsunami Warning System |
| eUICC | embedded UICC, embedded Universal Integrated Circuit Card |
| E-UTRA | Evolved UTRA |
| E-UTRAN | Evolved UTRAN |
| EV2X | Enhanced V2X |
| F1AP | F1 Application Protocol |
| F1-C | F1 Control plane interface |
| F1-U | F1 User plane interface |
| FACCH | Fast Associated Control CHannel |
| FACCH/F | Fast Associated Control Channel/Full rate |
| FACCH/H | Fast Associated Control Channel/Half rate |
| FACH | Forward Access Channel |
| FAUSCH | Fast Uplink Signalling Channel |
| FB | Functional Block |
| FBI | Feedback Information |
| FCC | Federal Communications Commission |

TABLE 10-continued

| Abbreviations: | |
|---|---|
| FCCH | Frequency Correction CHannel |
| FDD | Frequency Division Duplex |
| FDM | Frequency Division Multiplex |
| FDMA | Frequency Division Multiple Access |
| FE | Front End |
| FEC | Forward Error Correction |
| FFS | For Further Study |
| FFT | Fast Fourier Transformation |
| feLAA | further enhanced Licensed Assisted Access, further enhanced LAA |
| FN | Frame Number |
| FPGA | Field-Programmable Gate Array |
| FR | Frequency Range |
| FQDN | Fully Qualified Domain Name |
| G-RNTI | GERAN Radio Network Temporary Identity |
| GERAN | GSM EDGE RAN, GSM EDGE Radio Access Network |
| GGSN | Gateway GPRS Support Node |
| GLONASS | GLObal'naya NAvigatsionnaya Sputnikovaya Sistema (Engl.: Global Navigation Satellite System) |
| gNB | Next Generation NodeB |
| gNB-CU | gNB-centralized unit, Next Generation NodeB centralized unit |
| gNB-DU | gNB-distributed unit, Next Generation NodeB distributed unit |
| GNSS | Global Navigation Satellite System |
| GPRS | General Packet Radio Service |
| GPSI | Generic Public Subscription Identifier |
| GSM | Global System for Mobile Communications, Groupe Spécial Mobile |
| GTP | GPRS Tunneling Protocol |
| GTP-U | GPRS Tunnelling Protocol for User Plane |
| GTS | Go To Sleep Signal (related to WUS) |
| GUMMEI | Globally Unique MME Identifier |
| GUTI | Globally Unique Temporary UE Identity |
| HARQ | Hybrid ARQ, Hybrid Automatic Repeat Request |
| HANDO | Handover |
| HFN | HyperFrame Number |
| HHO | Hard Handover |
| HLR | Home Location Register |
| HN | Home Network |
| HO | Handover |
| HPLMN | Home Public Land Mobile Network |
| HSDPA | High Speed Downlink Packet Access |
| HSN | Hopping Sequence Number |
| HSPA | High Speed Packet Access |
| HSS | Home Subscriber Server |
| HSUPA | High Speed Uplink Packet Access |
| HTTP | Hyper Text Transfer Protocol |
| HTTPS | Hyper Text Transfer Protocol Secure (https is http/1.1 over SSL, i.e. port 443) |
| I-Block | Information Block |
| ICCID | Integrated Circuit Card Identification |
| IAB | Integrated Access and Backhaul |
| ICIC | Inter-Cell Interference Coordination |
| ID | Identity, identifier |
| IDFT | Inverse Discrete Fourier Transform |
| IE | Information element |
| IBE | In-Band Emission |
| IEEE | Institute of Electrical and Electronics Engineers |
| IEI | Information Element Identifier |
| IEIDL | Information Element Identifier Data Length |
| IETF | Internet Engineering Task Force |
| IF | Infrastructure |
| IM | Interference Measurement, Intermodulation, IP Multimedia |
| IMC | IMS Credentials |
| IMEI | International Mobile Equipment Identity |
| IMGI | International mobile group identity |
| IMPI | IP Multimedia Private Identity |
| IMPU | IP Multimedia PUblic identity |
| IMS | IP Multimedia Subsystem |
| IMSI | International Mobile Subscriber Identity |
| IoT | Internet of Things |
| IP | Internet Protocol |
| Ipsec | IP Security, Internet Protocol Security |
| IP-CAN | IP-Connectivity Access Network |
| IP-M | IP Multicast |
| IPv4 | Internet Protocol Version 4 |
| IPv6 | Internet Protocol Version 6 |
| IR | Infrared |
| IS | In Sync |
| IRP | Integration Reference Point |
| ISDN | Integrated Services Digital Network |
| ISIM | IM Services Identity Module |

TABLE 10-continued

| Abbreviations: | |
|---|---|
| ISO | International Organisation for Standardisation |
| ISP | Internet Service Provider |
| IWF | Interworking-Function |
| I-WLAN | Interworking WLAN |
| | Constraint length of the convolutional code, USIM Individual key |
| kB | Kilobyte (1000 bytes) |
| kbps | kilo-bits per second |
| Kc | Ciphering key |
| Ki | Individual subscriber authentication key |
| KPI | Key Performance Indicator |
| KQI | Key Quality Indicator |
| KSI | Key Set Identifier |
| ksps | kilo-symbols per second |
| KVM | Kernel Virtual Machine |
| L1 | Layer 1 (physical layer) |
| L1-RSRP | Layer 1 reference signal received power |
| L2 | Layer 2 (data link layer) |
| L3 | Layer 3 (network layer) |
| LAA | Licensed Assisted Access |
| LAN | Local Area Network |
| LADN | Local Area Data Network |
| LBT | Listen Before Talk |
| LCM | LifeCycle Management |
| LCR | Low Chip Rate |
| LCS | Location Services |
| LCID | Logical Channel ID |
| LI | Layer Indicator |
| LLC | Logical Link Control, Low Layer Compatibility |
| LPLMN | Local PLMN |
| LPP | LTE Positioning Protocol |
| LSB | Least Significant Bit |
| LTE | Long Term Evolution |
| LWA | LTE-WLAN aggregation |
| LWIP | LTE/WLAN Radio Level Integration with IPsec Tunnel |
| LTE | Long Term Evolution |
| M2M | Machine-to-Machine |
| MAC | Medium Access Control (protocol layering context) |
| MAC | Message authentication code (security/encryption context) |
| MAC-A | MAC used for authentication and key agreement (TSG T WG3 context) |
| MAC-I | MAC used for data integrity of signalling messages (TSG T WG3 context) |
| MANO | Management and Orchestration |
| MBMS | Multimedia Broadcast and Multicast Service |
| MBSFN | Multimedia Broadcast multicast service Single Frequency Network |
| MCC | Mobile Country Code |
| MCG | Master Cell Group |
| MCOT | Maximum Channel Occupancy Time |
| MCS | Modulation and coding scheme |
| MDAF | Management Data Analytics Function |
| MDAS | Management Data Analytics Service |
| MDT | Minimization of Drive Tests |
| ME | Mobile Equipment |
| MeNB | master eNB |
| MER | Message Error Ratio |
| MGL | Measurement Gap Length |
| MGRP | Measurement Gap Repetition Period |
| MIB | Master Information Block, Management Information Base |
| MIMO | Multiple Input Multiple Output |
| MLC | Mobile Location Centre |
| MM | Mobility Management |
| MME | Mobility Management Entity |
| MN | Master Node |
| MNO | Mobile Network Operator |
| MO | Measurement Object, Mobile Originated |
| MPBCH | MTC Physical Broadcast CHannel |
| MPDCCH | MTC Physical Downlink Control CHannel |
| MPDSCH | MTC Physical Downlink Shared CHannel |
| MPRACH | MTC Physical Random Access CHannel |
| MPUSCH | MTC Physical Uplink Shared Channel |
| MPLS | MultiProtocol Label Switching |
| MS | Mobile Station |
| MSB | Most Significant Bit |
| MSC | Mobile Switching Centre |
| MSI | Minimum System Information, MCH Scheduling Information |
| MSID | Mobile Station Identifier |
| MSIN | Mobile Station Identification Number |
| MSISDN | Mobile Subscriber ISDN Number |
| MT | Mobile Terminated, Mobile Termination |

TABLE 10-continued

| Abbreviations: | |
|---|---|
| MTC | Machine-Type Communications |
| mMTC | massive MTC, massive Machine-Type Communications |
| MU-MIMO | Multi User MIMO |
| MWUS | MTC wake-up signal, MTC WUS |
| NACK | Negative Acknowledgement |
| NAI | Network Access Identifier |
| NAS | Non-Access Stratum, Non-Access Stratum layer |
| NCT | Network Connectivity Topology |
| NC-JT | Non-Coherent Joint Transmission |
| NEC | Network Capability Exposure |
| NE-DC | NR-E-UTRA Dual Connectivity |
| NEF | Network Exposure Function |
| NF | Network Function |
| NFP | Network Forwarding Path |
| NFPD | Network Forwarding Path Descriptor |
| NFV | Network Functions Virtualization |
| NFVI | NFV Infrastructure |
| NFVO | NFV Orchestrator |
| NG | Next Generation, Next Gen |
| NGEN-DC | NG-RAN E-UTRA-NR Dual Connectivity |
| NM | Network Manager |
| NMS | Network Management System |
| N-PoP | Network Point of Presence |
| NMIB, N-MIB | Narrowband MIB |
| NPBCH | Narrowband Physical Broadcast CHannel |
| NPDCCH | Narrowband Physical Downlink Control CHannel |
| NPDSCH | Narrowband Physical Downlink Shared CHannel |
| NPRACH | Narrowband Physical Random Access CHannel |
| NPUSCH | Narrowband Physical Uplink Shared CHannel |
| NPSS | Narrowband Primary Synchronization Signal |
| NSSS | Narrowband Secondary Synchronization Signal |
| NR | New Radio, Neighbour Relation |
| NRF | NF Repository Function |
| NRS | Narrowband Reference Signal |
| NS | Network Service |
| NSA | Non-Standalone operation mode |
| NSD | Network Service Descriptor |
| NSR | Network Service Record |
| NSSAI | Network Slice Selection Assistance Information |
| S-NNSAI | Single-NSSAI |
| NSSF | Network Slice Selection Function |
| NW | Network |
| NWUS | Narrowband wake-up signal, Narrowband WUS |
| NZP | Non-Zero Power |
| O&M | Operation and Maintenance |
| ODU2 | Optical channel Data Unit - type 2 |
| OFDM | Orthogonal Frequency Division Multiplexing |
| OFDMA | Orthogonal Frequency Division Multiple Access |
| OOB | Out-of-band |
| OOS | Out of Sync |
| OPEX | OPerating EXpense |
| OSI | Other System Information |
| OSS | Operations Support System |
| OTA | over-the-air |
| PAPR | Peak-to-Average Power Ratio |
| PAR | Peak to Average Ratio |
| PBCH | Physical Broadcast Channel |
| PC | Power Control, Personal Computer |
| PCC | Primary Component Carrier, Primary CC |
| PCell | Primary Cell |
| PCI | Physical Cell ID, Physical Cell Identity |
| PCEF | Policy and Charging Enforcement Function |
| PCF | Policy Control Function |
| PCRF | Policy Control and Charging Rules Function |
| PDCP | Packet Data Convergence Protocol, Packet Data Convergence Protocol layer |
| PDCCH | Physical Downlink Control Channel |
| PDCP | Packet Data Convergence Protocol |
| PDN | Packet Data Network, Public Data Network |
| PDSCH | Physical Downlink Shared Channel |
| PDU | Protocol Data Unit |
| PEI | Permanent Equipment Identifiers |
| PFD | Packet Flow Description |
| P-GW | PDN Gateway |
| PHICH | Physical hybrid-ARQ indicator channel |
| PHY | Physical layer |
| PLMN | Public Land Mobile Network |
| PIN | Personal Identification Number |
| PM | Performance Measurement |

TABLE 10-continued

| Abbreviations: | |
|---|---|
| PMI | Precoding Matrix Indicator |
| PNF | Physical Network Function |
| PNFD | Physical Network Function Descriptor |
| PNFR | Physical Network Function Record |
| POC | PTT over Cellular |
| PP, PTP | Point-to-Point |
| PPP | Point-to-Point Protocol |
| PRACH | Physical RACH |
| PRB | Physical resource block |
| PRG | Physical resource block group |
| ProSe | Proximity Services, Proximity-Based Service |
| PRS | Positioning Reference Signal |
| PRR | Packet Reception Radio |
| PS | Packet Services |
| PSBCH | Physical Sidelink Broadcast Channel |
| PSDCH | Physical Sidelink Downlink Channel |
| PSCCH | Physical Sidelink Control Channel |
| PSSCH | Physical Sidelink Shared Channel |
| PSCell | Primary SCell |
| PSS | Primary Synchronization Signal |
| PSTN | Public Switched Telephone Network |
| PT-RS | Phase-tracking reference signal |
| PTT | Push-to-Talk |
| PUCCH | Physical Uplink Control Channel |
| PUSCH | Physical Uplink Shared Channel |
| QAM | Quadrature Amplitude Modulation |
| QCI | QoS class of identifier |
| QCL | Quasi co-location |
| QFI | QoS Flow ID, QoS Flow Identifier |
| QoS | Quality of Service |
| QPSK | Quadrature (Quaternary) Phase Shift Keying |
| QZSS | Quasi-Zenith Satellite System |
| RA-RNTI | Random Access RNTI |
| RAB | Radio Access Bearer, Random Access Burst |
| RACH | Random Access Channel |
| RADIUS | Remote Authentication Dial In User Service |
| RAN | Radio Access Network |
| RAND | RANDom number (used for authentication) |
| RAR | Random Access Response |
| RAT | Radio Access Technology |
| RAU | Routing Area Update |
| RB | Resource block, Radio Bearer |
| RBG | Resource block group |
| REG | Resource Element Group |
| Rel | Release |
| REQ | REQuest |
| RF | Radio Frequency |
| RI | Rank Indicator |
| RIV | Resource indicator value |
| RL | Radio Link |
| RLC | Radio Link Control, Radio Link Control layer |
| RLC AM | RLC Acknowledged Mode |
| RLC UM | RLC Unacknowledged Mode |
| RLF | Radio Link Failure |
| RLM | Radio Link Monitoring |
| RLM-RS | Reference Signal for RLM |
| RM | Registration Management |
| RMC | Reference Measurement Channel |
| RMSI | Remaining MSI, Remaining Minimum System Information |
| RN | Relay Node |
| RNC | Radio Network Controller |
| RNL | Radio Network Layer |
| RNTI | Radio Network Temporary Identifier |
| ROHC | RObust Header Compression |
| RRC | Radio Resource Control, Radio Resource Control layer |
| RRM | Radio Resource Management |
| RS | Reference Signal |
| RSRP | Reference Signal Received Power |
| RSRQ | Reference Signal Received Quality |
| RSSI | Received Signal Strength Indicator |
| RSU | Road Side Unit |
| RSTD | Reference Signal Time difference |
| RTP | Real Time Protocol |
| RTS | Ready-To-Send |
| RTT | Round Trip Time |
| Rx | Reception, Receiving, Receiver |
| S1AP | S1 Application Protocol |
| S1-MME | S1 for the control plane |

TABLE 10-continued

| Abbreviations: | |
|---|---|
| S1-U | S1 for the user plane |
| S-GW | Serving Gateway |
| S-RNTI | SRNC Radio Network Temporary Identity |
| S-TMSI | SAE Temporary Mobile Station Identifier |
| SA | Standalone operation mode |
| SAE | System Architecture Evolution |
| SAP | Service Access Point |
| SAPD | Service Access Point Descriptor |
| SAPI | Service Access Point Identifier |
| SCC | Secondary Component Carrier, Secondary CC |
| SCell | Secondary Cell |
| SCEF | Service Capability Exposure Function |
| SC-FDMA | Single Carrier Frequency Division Multiple Access |
| SCG | Secondary Cell Group |
| SCM | Security Context Management |
| SCS | Subcarrier Spacing |
| SCTP | Stream Control Transmission Protocol |
| SDAP | Service Data Adaptation Protocol, Service Data Adaptation Protocol layer |
| SDL | Supplementary Downlink |
| SDNF | Structured Data Storage Network Function |
| SDP | Session Description Protocol |
| SDSF | Structured Data Storage Function |
| SDU | Service Data Unit |
| SEAF | Security Anchor Function |
| SeNB | secondary eNB |
| SEPP | Security Edge Protection Proxy |
| SFI | Slot format indication |
| SFTD | Space-Frequency Time Diversity, SFN and frame timing difference |
| SFN | System Frame Number |
| SgNB | Secondary gNB |
| SGSN | Serving GPRS Support Node |
| S-GW | Serving Gateway |
| SI | System Information |
| SI-RNTI | System Information RNTI |
| SIB | System Information Block |
| SIM | Subscriber Identity Module |
| SIP | Session Initiated Protocol |
| SiP | System in Package |
| SL | Sidelink |
| SLA | Service Level Agreement |
| SM | Session Management |
| SMF | Session Management Function |
| SMS | Short Message Service |
| SMSF | SMS Function |
| SMTC | SSB-based Measurement Timing Configuration |
| SN | Secondary Node, Sequence Number |
| SoC | System on Chip |
| SON | Self-Organizing Network |
| SpCell | Special Cell |
| SP-CSI-RNTI | Semi-Persistent CSIR NTI |
| SPS | Semi-Persistent Scheduling |
| SQN | Sequence number |
| SR | Scheduling Request |
| SRB | Signalling Radio Bearer |
| SRS | Sounding Reference Signal |
| SS | Synchronization Signal |
| SSB | Synchronization Signal Block |
| SSID | Service Set Identifier |
| SS/PBCH | Block |
| SSBRI | SS/PBCH Block Resource Indicator, Synchronization Signal Block Resource Indicator |
| SSC | Session and Service Continuity |
| SS-RSRP | Synchronization Signal based Reference Signal Received Power |
| SS-RSRQ | Synchronization Signal based Reference Signal Received Quality |
| SS-SINR | Synchronization Signal based Signal to Noise and Interference Ratio |
| SSS | Secondary Synchronization Signal |
| SSSG | Search Space Set Group |
| SSSIF | Search Space Set Indicator |
| SST | Slice/Service Types |
| SU-MIMO | Single User MIMO |
| SUL | Supplementary Uplink |
| TA | Timing Advance, Tracking Area |
| TAC | Tracking Area Code |
| TAG | Timing Advance Group |
| TAI | Tracking Area Identity |
| TAU | Tracking Area Update |
| TB | Transport Block |
| TBS | Transport Block Size |
| TBD | To Be Defined |

TABLE 10-continued

| Abbreviations: | |
|---|---|
| TCI | Transmission Configuration Indicator |
| TCP | Transmission Communication Protocol |
| TDD | Time Division Duplex |
| TDM | Time Division Multiplexing |
| TDMA | Time Division Multiple Access |
| TE | Terminal Equipment |
| TEID | Tunnel End Point Identifier |
| TFT | Traffic Flow Template |
| TMSI | Temporary Mobile Subscriber Identity |
| TNL | Transport Network Layer |
| TPC | Transmit Power Control |
| TPMI | Transmitted Precoding Matrix Indicator |
| TR | Technical Report |
| TRP, TRxP | Transmission Reception Point |
| TRS | Tracking Reference Signal |
| TRx | Transceiver |
| TS | Technical Specifications, Technical Standard |
| TTI | Transmission Time Interval |
| Tx | Transmission, Transmitting, Transmitter |
| U-RNTI | UTRAN Radio Network Temporary Identity |
| UART | Universal Asynchronous Receiver and Transmitter |
| UCI | Uplink Control Information |
| UE | User Equipment |
| UDM | Unified Data Management |
| UDP | User Datagram Protocol |
| UDSF | Unstructured Data Storage Network Function |
| UICC | Universal Integrated Circuit Card |
| UL | Uplink |
| UM | Unacknowledged Mode |
| UML | Unified Modelling Language |
| UMTS | Universal Mobile Telecommunications System |
| UP | User Plane |
| UPF | User Plane Function |
| URI | Uniform Resource Identifier |
| URL | Uniform Resource Locator |
| URLLC | Ultra-Reliable and Low Latency |
| USB | Universal Serial Bus |
| USIM | Universal Subscriber Identity Module |
| USS | UE-specific search space |
| UTRA | UMTS Terrestrial Radio Access |
| UTRAN | Universal Terrestrial Radio Access Network |
| UwPTS | Uplink Pilot Time Slot |
| V2I | Vehicle-to-Infrastruction |
| V2P | Vehicle-to-Pedestrian |
| V2V | Vehicle-to-Vehicle |
| V2X | Vehicle-to-everything |
| VIM | Virtualized Infrastructure Manager |
| VL | Virtual Link, |
| VLAN | Virtual LAN, Virtual Local Area Network |
| VM | Virtual Machine |
| VNF | Virtualized Network Function |
| VNFFG | VNF Forwarding Graph |
| VNFFGD | VNF Forwarding Graph Descriptor |
| VNFM | VNF Manager |
| VoIP | Voice-over-IP, Voice-over-Internet Protocol |
| VPLMN | Visited Public Land Mobile Network |
| VPN | Virtual Private Network |
| VRB | Virtual Resource Block |
| WiMAX | Worldwide Interoperability for Microwave Access |
| WLAN | Wireless Local Area Network |
| WMAN | Wireless Metropolitan Area Network |
| WPAN | Wireless Personal Area Network |
| X2-C | X2-Control plane |
| X2-U | X2-User plane |
| XML | eXtensible Markup Language |
| XRES | EXpected user RESponse |
| XOR | eXclusive OR |
| ZC | Zadoff-Chu |
| ZP | Zero Po |

The description above illustrates various example embodiments without limiting the scope to the specific forms disclosed. Modifications and variations may arise from the teachings or practical application of these embodiments. Where specific details are provided, it should be apparent to those skilled in the art that the disclosure may be practiced with or without these details. The intention is to cover all modifications, equivalents, and alternatives consistent with this disclosure and the appended claims.

What is claimed is:

1. An apparatus, the apparatus comprising processing circuitry coupled to storage, the processing circuitry configured to:
- create a Managed Object Instance (MOI) representing actions executed based on artificial intelligence or machine learning (AI/ML) inference function;
- notify a management and network service (MnS) consumer about the creation of the MOI;
- execute actions by a network or management function acting as the consumer of the inference output; and
- manage performance of the AI/ML inference function.

2. The apparatus of claim 1, wherein the AI/ML inference function includes an Analytics Logical Function (AnLF), management data analytics function (MDAF), AI/ML enabled Energy Saving function, AI/ML enabled MRO function, or AI/ML enabled MLB function.

3. The apparatus of claim 2, wherein the AI/ML inference function is represented by an MOI.

4. The apparatus of claim 3, wherein the MOI representing the AnLF contains attributes indicating supported analytics ID(s).

5. The apparatus of claim 1, wherein the MOI representing the actions executed based on the AI/ML inference output contains at least one of the following attributes: identifier of the inference output, actions executed, or timestamp of action completion.

6. The apparatus of claim 1, wherein the MnS consumer is configured to take actions based on the executed actions and resulting performance.

7. The apparatus of claim 6, wherein the actions taken by the MnS consumer include deactivating the AI/ML inference function.

8. The apparatus of claim 6, wherein the MnS consumer requests re-training of the ML model for the AI/ML inference function.

9. The apparatus of claim 6, wherein the MnS consumer uses a different ML model to support the AI/ML inference function.

10. The apparatus of claim 1, wherein an MnS producer and the MnS consumer are configured for performance management of the AI/ML inference function.

11. A non-transitory computer-readable medium storing computer-executable instructions which when executed by one or more processors result in performing operations comprising:
- creating a Managed Object Instance (MOI) representing actions executed based on artificial intelligence or machine learning (AI/ML) inference function;
- notifying a management and network service (MnS) consumer about the creation of the MOI;
- executing actions by a network or management function acting as the consumer of the inference output; and
- managing performance of the AI/ML inference function.

12. The non-transitory computer-readable medium of claim 11, wherein the AI/ML inference function includes an Analytics Logical Function (AnLF), management data analytics function (MDAF), AI/ML enabled Energy Saving function, AI/ML enabled MRO function, or AI/ML enabled MLB function.

13. The non-transitory computer-readable medium of claim 12, wherein the AI/ML inference function is represented by an MOI.

14. The non-transitory computer-readable medium of claim 13, wherein the MOI representing the AnLF contains attributes indicating supported analytics ID(s).

15. The non-transitory computer-readable medium of claim 11, wherein the MOI representing the actions executed based on the AI/ML inference output contains at least one of the following attributes: identifier of the inference output, actions executed, or timestamp of action completion.

16. The non-transitory computer-readable medium of claim 11, wherein the MnS consumer is configured to take actions based on the executed actions and resulting performance.

17. The non-transitory computer-readable medium of claim 16, wherein the actions taken by the MnS consumer include deactivating the AI/ML inference function.

18. The non-transitory computer-readable medium of claim 16, wherein the MnS consumer requests re-training of the ML model for the AI/ML inference function.

19. The non-transitory computer-readable medium of claim 16, wherein the MnS consumer uses a different ML model to support the AI/ML inference function.

20. A method comprising:
- creating a Managed Object Instance (MOI) representing actions executed based on artificial intelligence or machine learning (AI/ML) inference function;
- notifying a management and network service (MnS) consumer about the creation of the MOI;
- executing actions by a network or management function acting as the consumer of the inference output; and
- managing performance of the AI/ML inference function.

* * * * *